United States Patent
Tajika et al.

[11] Patent Number: 6,089,697
[45] Date of Patent: *Jul. 18, 2000

[54] INK-JET HEAD, INK-JET CARTRIDGE, PRINTING APPARATUS, AND INK-JET PRINTING METHOD

[75] Inventors: Hiroshi Tajika; Hiromitsu Hirabayashi, both of Yokohama; Jiro Moriyama, Kawasaki; Toshiharu Inui; Hitoshi Sugimoto, both of Yokohama; Shin'ichi Sato, Kawasaki; Masao Kato; Minako Kato, both of Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/582,111

[22] Filed: Jan. 2, 1996

[30] Foreign Application Priority Data

Feb. 13, 1995 [JP] Japan ................................. 7-023909
Dec. 21, 1995 [JP] Japan ................................. 7-333832

[51] Int. Cl.⁷ .......................................................... B41J 2/21
[52] U.S. Cl. .......................................................... 347/43
[58] Field of Search ................................ 347/43, 41, 96, 347/98

[56] References Cited

U.S. PATENT DOCUMENTS

| | | | |
|---|---|---|---|
| 4,313,124 | 1/1982 | Hara ................................. | 347/57 |
| 4,345,262 | 8/1982 | Shirato et al. ................... | 347/10 |
| 4,459,600 | 7/1984 | Sato et al. ....................... | 347/47 |
| 4,463,359 | 7/1984 | Ayata et al. ..................... | 347/56 |
| 4,528,576 | 7/1985 | Komura et al. ................. | 347/43 X |
| 4,538,160 | 8/1985 | Uchiyama . | |
| 4,558,333 | 12/1985 | Sugitani et al. ................. | 347/65 |
| 4,599,627 | 7/1986 | Vollert . | |
| 4,608,577 | 8/1986 | Hori ................................. | 347/66 |
| 4,723,129 | 2/1988 | Endo et al. ..................... | 347/56 |
| 4,740,796 | 4/1988 | Endo et al. ..................... | 347/56 |
| 5,162,817 | 11/1992 | Tajika et al. ................... | 347/86 X |
| 5,181,045 | 1/1993 | Shields et al. . | |
| 5,455,610 | 10/1995 | Harrington ..................... | 347/43 |
| 5,477,246 | 12/1995 | Hirabayashi et al. ......... | 347/43 X |
| 5,614,931 | 3/1997 | Koike et al. ................... | 347/43 |
| 5,635,969 | 6/1997 | Allen ............................... | 347/96 |
| 5,650,807 | 7/1997 | Abe et al. ....................... | 347/43 |

FOREIGN PATENT DOCUMENTS

| | | |
|---|---|---|
| 0 137 313 | 4/1985 | European Pat. Off. . |
| 53-024486 | 3/1978 | Japan . |
| 54-043733 | 4/1979 | Japan . |
| 54-056847 | 5/1979 | Japan . |
| 55-150396 | 11/1980 | Japan . |
| 58-128862 | 8/1983 | Japan . |
| 59-123670 | 7/1984 | Japan . |
| 59-138461 | 8/1984 | Japan . |
| 60-071260 | 4/1985 | Japan . |
| 61-249755 | 11/1986 | Japan . |
| 63-299971 | 12/1988 | Japan ................................ B41J 3/04 |

Primary Examiner—N. Le
Assistant Examiner—Judy Nguyen
Attorney, Agent, or Firm—Fitzpatrick, Cella, Harper & Scinto

[57] ABSTRACT

In an ink jet head having an ink discharge head for discharging an ink, and a liquid discharge head for discharging a print improving liquid given to a printing medium for improving printability in ink jet printing, the liquid discharge head 2002 is disposed to be sandwiched between colored discharge heads 2001 and 2003 for discharging at least one set of colored inks with respect to a scanning direction. This provides an ink jet head for optimally utilizing a pre-feed technique and/or a follow feed technique in ink jet printing.

27 Claims, 35 Drawing Sheets

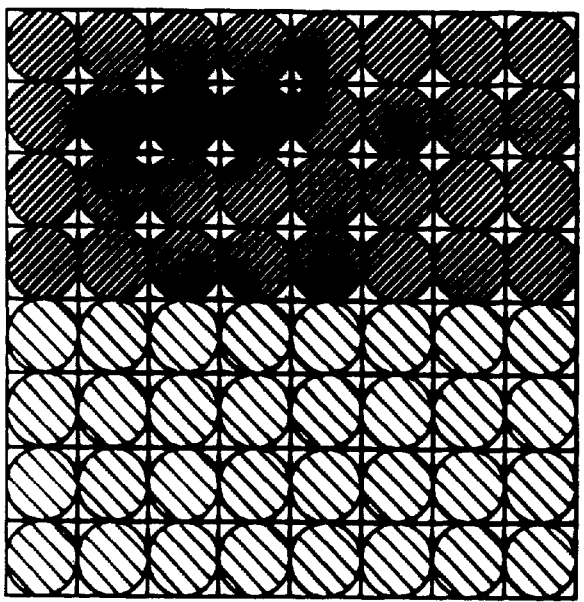
INK APPLICATION ORDER
3101
 S → K
HEAD SCANNING DIRECTION
INK APPLICATION ORDER
3102
 K → S
HEAD SCANNING DIRECTION
FIG. 11A
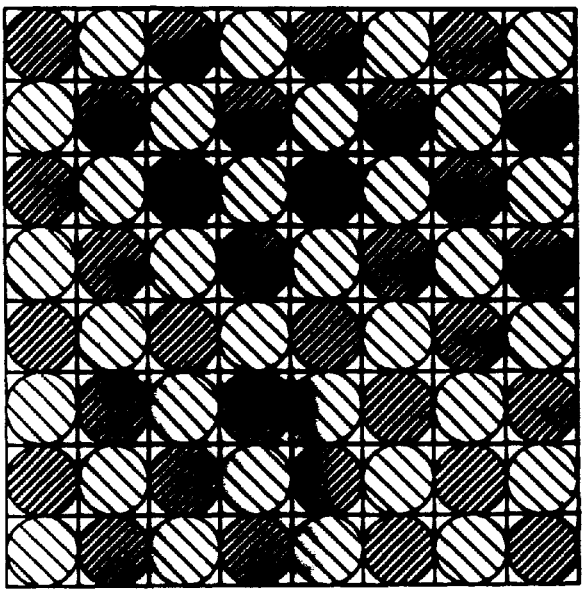
INK APPLICATION ORDER
3101
 S → K
HEAD SCANNING DIRECTION
INK APPLICATION ORDER
3102
 K → S
HEAD SCANNING DIRECTION
FIG. 11B

<BRIEF DESCRIPTION OF PRINT (LARGE, MIDDLE AND SMALL)/(LARGE, MIDDLE AND SMALL)>
<MODE DISCHARGE AMOUNT (DISCHARGE AMOUNT RATIOS)/(DISCHARGE AMOUNT RATIOS)>
RATIO =40:25:15 =70:45:25

IN EMBODIMENT 4
(Bk×1 HEAD)
FOR 5 HEADS

WHEN THE NUMBER OF
HEADS IS 5 TO 6

| PRINT MODE | PRINT PASS | | DOT ARRANGEMENT | |
|---|---|---|---|---|
| | Bk | Col | Bk | Col |
| FAST | 1-PASS UNIDIRECTIONAL | 1-PASS UNIDIRECTIONAL | 70 / 360×360 | 40 / 360×360 |
| NORM. 300dpi | 2-PASS UNIDIRECTIONAL | 2-PASS BIDIRECTIONAL | 70 / 360×360 | 40 / 360×360 |
| 720dpi | 2-PASS BIDIRECTIONAL (SHIFTED BY HALF PICTURE ELEMENT) | 2-PASS BIDIRECTIONAL (SHIFTED BY HALF PICTURE ELEMENT) | 45,45 / 720×720-h | 25,25 / 720×720-h |
| HQ | 4-PASS UNIDIRECTIONAL (SHIFTED BY HALF PICTURE ELEMENT) (4-PASS PRINT) | 4-PASS UNIDIRECTIONAL (SHIFTED BY HALF PICTURE ELEMENT) (4-PASS PRINT) | 25,25,25,25 / 720×720-f | 15,15,15,15 / 720×720-f |

FIG. 25

MAIN SCANNING DIRECTION 
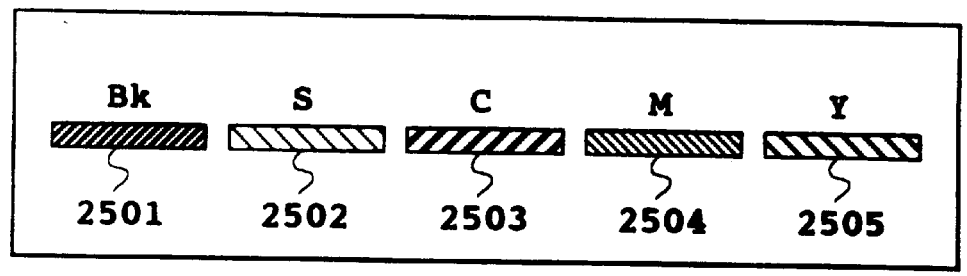
FIG. 28
MAIN SCANNING DIRECTION 
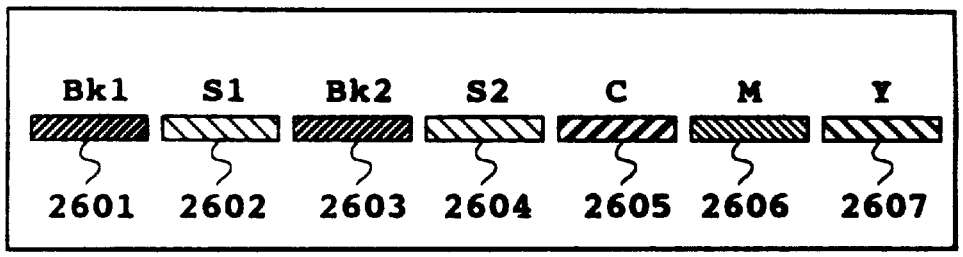
FIG. 29

MAIN SCANNING DIRECTION 
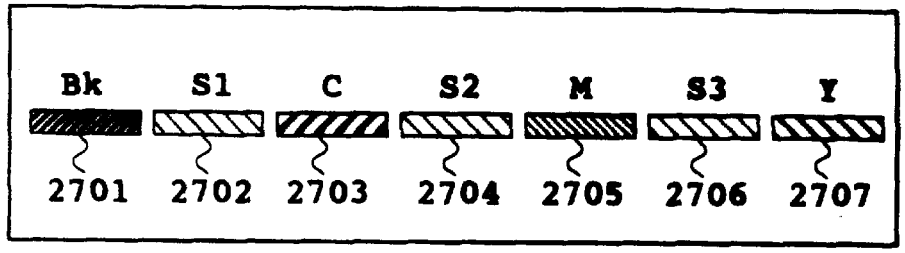
FIG. 30
MAIN SCANNING DIRECTION 
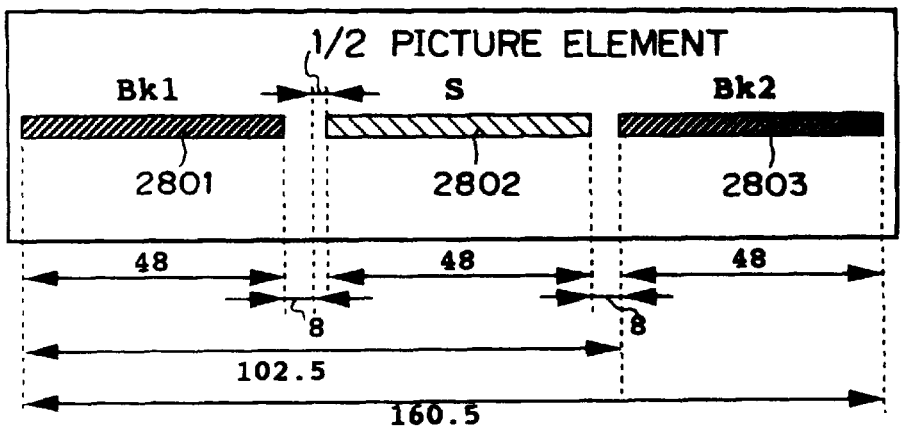
FIG. 31

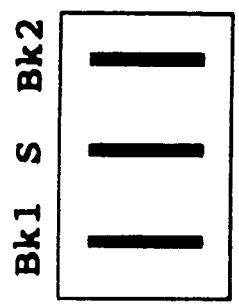
FIG.32A 3-CHIP INTEGRAL TYPE (EMBODIMENT 1)
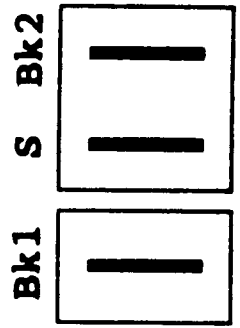
FIG.32B 2-CHIP INTEGRAL TYPE +1 CHIP
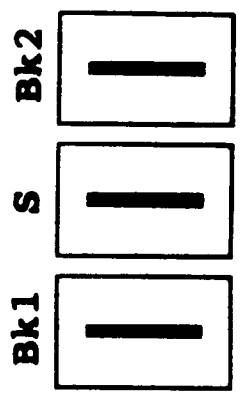
FIG.32C 3-CHIP INDEPENDENT TYPE

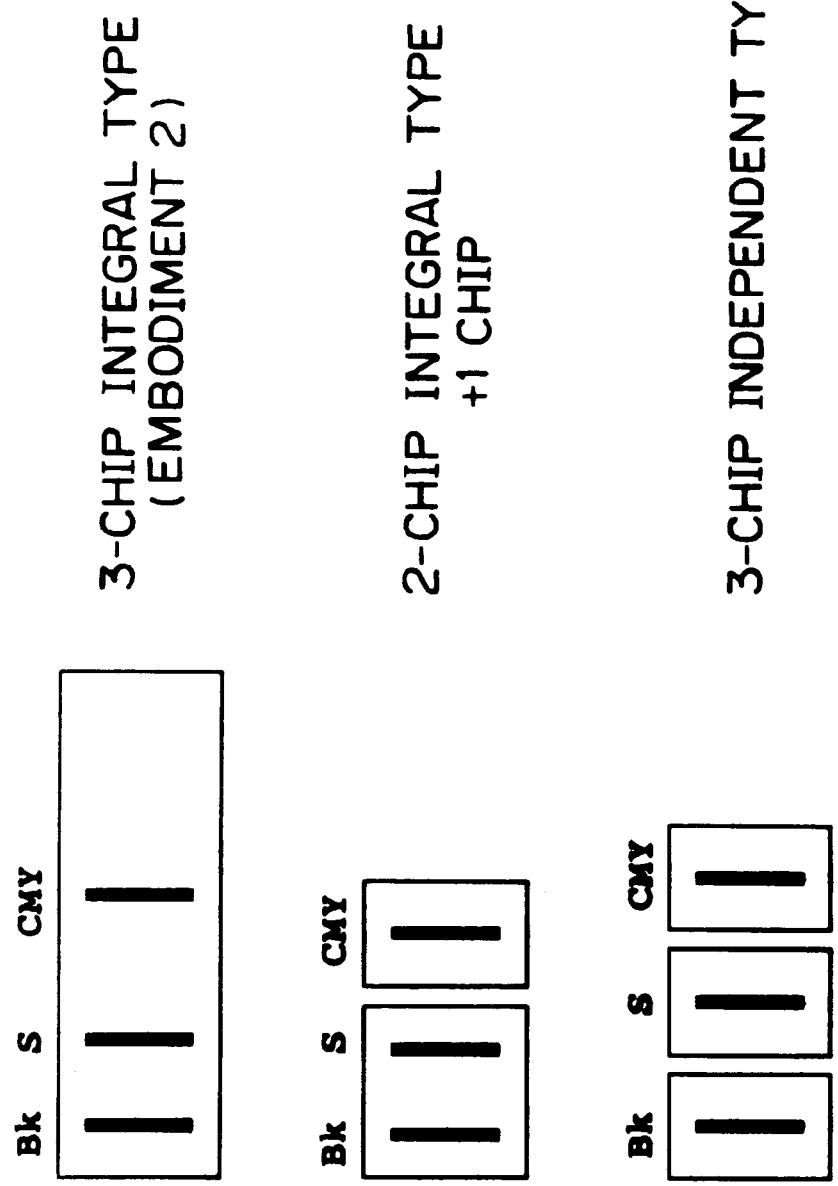
FIG.33A  3-CHIP INTEGRAL TYPE (EMBODIMENT 2)
FIG.33B  2-CHIP INTEGRAL TYPE +1 CHIP
FIG.33C  3-CHIP INDEPENDENT TYPE

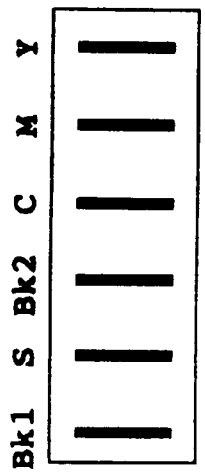
FIG. 34A 6-CHIP INTEGRAL TYPE (EMBODIMENT 2)
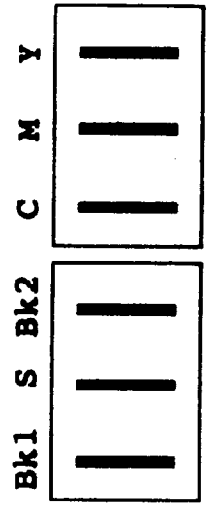
FIG. 34B 3-CHIP INTEGRAL TYPE +3-CHIP INTEGRAL TYPE
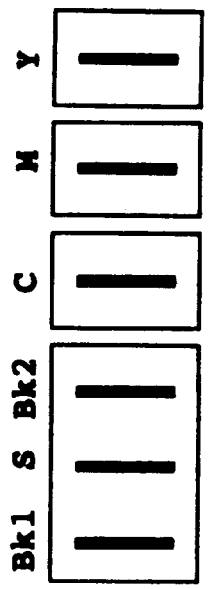
FIG. 34C 3-CHIP INTEGRAL TYPE +3-CHIP INDEPENDENT TYPE
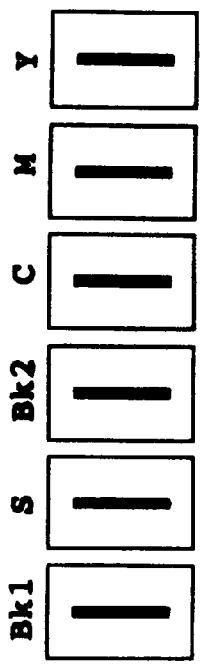
FIG. 34D 6-CHIP INDEPENDENT TYPE

INK-JET HEAD, INK-JET CARTRIDGE, PRINTING APPARATUS, AND INK-JET PRINTING METHOD

BACKGROUND OF THE INVENTION

1. Field of the Invention

This invention relates to an ink-jet head, an ink-jet cartridge, and an ink-jet printing apparatus using the devices, and an ink-jet printing method, more specifically, applied to ink-jet printing for discharging a printing ink and a print improving liquid for insolubilizing and coagulating a color material in the printing ink.

The present invention can be applied to all types of devices using printing media such as paper, cloth, leather, non-woven fabrics, OHP sheets, metals, or the like. Practical examples of applicable devices include office machines such as printers, copiers, and facsimiles, and industrial production apparatuses.

2. Description of the Prior Art

Heretofore, ink-jet printing method has been utilized in printers and copiers for its low-noise, low running cost, and compact design features, and ease to be applied to color printing.

However, when obtaining an image on a printing material, which is so-called plain paper, by these printing devices using the ink-jet printing method, the image tends to be insufficient in water resistance, and when a color image is obtained, it is impossible to obtain a high-density image with no feathering nor blotting between colors, and a high quality color image with good fastness has not been obtained.

To improve the water resistance of the image, recently an ink containing a water-resistant color material has been practically used. However, its water resistance is yet insufficient, and since the ink in principle becomes water-insoluble after drying, the print head nozzle tends to be clogged, it is insufficient to solve the problem simply by improving the structure of the conventional head or ink-jet printing apparatus, and the apparatus capable of using the print improving liquid tends to be complex in structure.

Further, a number of techniques for improving the fastness of the printed matter have been disclosed. Japanese Patent Application Laid-open No. 24486/1978 discloses a technology in which a dyed matter is treated to convert the dye into a lake for fixing to improve the wet fastness of the dyed matter.

Still further, Japanese Patent Application Laid-open No. 43733/1979 discloses a method using an ink-jet printing system which uses two or more ingredients increasing in film-forming ability at room temperature or when heated, wherein the individual ingredients contact with each other on the printed matter to form a securely fixed film.

Japanese Patent Application Laid-open No. 150396/1980 discloses a method which uses an aqueous dye ink and a water-resistant agent to form a lake with the dye after ink-jet printing.

Yet further, Japanese Patent Application Laid-open No. 128862/1983 discloses an ink-jet printing method in which the position of image to be printed is previously determined and the printing ink and a treatment ink are overlappingly printed, and also discloses a method in which an image is depicted with the treatment ink before the printing ink, the treatment ink is overlapped on the printing ink previously depicted, or the printing ink is overlapped on the previously depicted treatment ink and further depicted with the treatment ink.

However, these patents do not disclose recovery means, head structure, or tank structure for reliability of constructing the ink-jet printing apparatus, nor head structure and print mode for improving the quality of the print image. Further, they do not describe the head structure or printing method for reducing the cost of the printing apparatus, nor printing method for reducing the running cost.

Specifically, the above prior art does not disclose the coating method of the print improving liquid, that is, the coating method by the ink-jet print head in detail, for example, it does not describe a problem of uneven coating due to the coating amount distribution by spray coating over the entire surface before or after printing, and unevenness over time due to a difference in penetration or fixing over time after printing by serial printing specific to ink-jet printing.

The method for printing the treatment ink by ink-jet printing only describes the relationship between the print improving liquid and the ink on the printed image, but does not describe detailed printing method (head structure, print mode, and devices) nor describe problems specific to ink-jet printing occurring in the method.

Any of the above patents does not describe bleeding between colors, bleeding due to difference in ink composition by letter quality and colors to achieve both letter quality and color printing, and white fogging as problems in color printing on plain paper by ink-jet printing, and problems with color printing (color difference due to the application order of color inks: dye distribution in the printing medium) by bidirectional printing to increase the printing speed.

Still further, on the construction of the ink-jet printing apparatus, there is no description of securing the reliability and means for reducing the apparatus cost by simplifying and reducing the structure and device size as possible.

Yet further, there is no description of a printing method for reducing the consumption of the print improving liquid, reducing the running cost, and improving degradation of image quality caused by application position deviation in multibus printing due to cockling.

As described above, with the conventional head structure, it is impossible to reduce the consumption of the print improving liquid, achieve the effect of the print improving liquid, and improve the printing speed in a pre-feed as a combination of a head for the print improving liquid with the conventional printing method (that is, the print improving liquid is applied before the ink), and/or a follow feed (that is, the print improving liquid is applied over the previously applied ink). In particular, it is impossible to forecast the effects of the pre-feed and/or follow feed (penetration control, bleed reduction, reduction of unevenness/stripes), head structure, printing method, and condition of ink immediately after printing (the time to contact of the print improving liquid with colored ink, and penetration condition of the individual ink on the printing medium) and achieve the sufficient effects, and to maintain the effects to an extent, the printing speed must be reduced (including low-speed control of the drive frequency, and temporary interruption of printing), resulting in a reduction of printing throughput.

With a view to solve the above problems, a first object of the present invention is to provide an ink-jet head for optimally utilizing the pre-feed and/or follow feed in ink-jet printing.

A second object of the present invention is to provide a print control method (including image quality improving technique applying head control/image processing) for optimally utilizing the pre-feed and/or follow feed techniques.

Further, a third object of the present invention is to provide an optimal combination of ink (CMY/K/print improving liquid) for optimally utilizing the pre-feed and/or follow feed techniques in ink-jet printing and an ink composition thereof.

Still further, a fourth object of the present invention is to provide an ink-jet printing apparatus which achieves high-precision application of pre-feed and/or follow feed, thereby achieving both high-speed/high quality at a low cost and a low running cost.

SUMMARY OF THE INVENTION

In accordance with the present invention, which attains the above object, there is provided an ink-jet head that at least comprises a first discharge head for discharging an ink, a liquid discharge head for discharging a liquid containing at least a print improving liquid for endowing a printing medium with an improved printability in ink-jet printing, and second ink discharge head for discharging an ink, and the discharge heads being arranged in the above order in the predetermined direction.

In the above construction, the first ink discharge head and the second ink discharge head may discharge inks of the same color, or the first ink discharge head and the second ink discharge head may discharge inks of different colors. In this case, as to the scanning direction, the first discharge head may be a first black ink discharge head, the second discharge head may be a print improving liquid discharge head, and the third discharge head may be a second black ink discharge head.

Further, with respect to the scanning direction, the first discharge head may be a black ink discharge head, the second discharge head may be a print improving liquid discharge head, and the third discharge head may be a discharge head which integrates a plurality of inks differing in color from black, or with respect to the scanning direction, the first discharge head may be a first black ink discharge head, the second discharge head may be a print improving liquid discharge head, the third discharge head may be a second black ink discharge head, and the fourth discharge head may be a discharge head which integrates a plurality of inks other than black, or with respect to the scanning direction, the first discharge head may be a black ink discharge head, the second discharge head may be a print improving liquid discharge head, the third discharge head may be a cyan ink discharge head, the fourth discharge head may be a magenta ink head, and the fifth discharge head may be a yellow ink discharge head, or with respect to the scanning direction, the first discharge head may be a first black ink discharge head, the third discharge head may be a second black ink discharge head, the fourth discharge head may be a cyan ink discharge head, the fifth discharge head may be a magenta ink discharge head, and the sixth discharge head may be a yellow ink discharge head.

Further, in the above construction, the liquid discharge portion having a head construction including two or more liquid discharge heads for discharging the same color and having the same colors may be shiftedly arranged from each other in the main scanning direction, the sub-scanning direction, or both the main and sub-scanning directions by an odd number times of ½ the nozzle pitch of the discharge portion, or the liquid discharge portion having the same colors may be shiftedly arranged from each other in the sub-scanning direction by about ½ the nozzle pitch of the discharge portion.

Still further, the ink-jet head may have a unit structure in which head chips constituting the individual discharge head are incorporated in an integrated frame, or a plurality of types of the head unit structures of the head chips constituting the individual discharge head incorporated in an integrated frame may be combined.

Yet further, the ink-jet head may have an electrothermal converter as an energy generation element for generating heat energy to cause film boiling of the ink or the print improving liquid.

Yet further, the print improving liquid may contain a cationic substance comprising a low molecular weight component and a high molecular weight component, and the ink may contain an anionic dye, the print improving liquid may contain a cationic substance comprising a low molecular weight component and a high molecular weight component, and the ink may contain an anionic dye or at least an anionic compound and a pigment.

To attain the above object, the ink-jet printing apparatus of the present invention is one which uses an ink-jet head having a plurality of discharge heads in a predetermined direction to achieve printing, wherein the ink-jet head at least comprises a first ink discharge portion for discharging the ink, a liquid discharge portion for discharging a liquid containing at least a print improving liquid for endowing the printing medium with improved printability in ink-jet printing, and a second ink discharge portion for discharging the ink, arranged in this order in the predetermined direction.

Further, another aspect of the ink-jet printing apparatus of the present invention is one which uses an ink discharge portion for discharging the ink, and a liquid discharge portion for discharging a print improving liquid for endowing the printing medium with improved printability in ink-jet printing, to achieve printing, wherein the liquid discharge portion discharges the print improving liquid in an outward way of the main scanning direction of printing, then the ink discharge portion discharges the ink, the liquid discharge portion discharges the print improving liquid in a return way of the main scanning direction, then the ink discharge portion discharges the ink, and having discharge control means for forming an image so that the print improving liquid is sandwiched between ink layers on the printing medium with respect to a direction vertical to the surface of the medium.

A further aspect of the ink-jet printing apparatus of the present invention is one which uses an ink discharge portion for discharging the ink, and a liquid discharge portion for discharging a print improving liquid for endowing the printing medium with improved printability in ink-jet printing, to achieve printing, wherein the ink discharge portion discharges the ink in an outward way of the main scanning direction of printing, then the liquid discharge portion discharges the print improving liquid, the ink discharge portion discharges the ink in a return way of the main scanning direction, then the liquid discharge portion discharges the print improving liquid, and having discharge control means for forming an image so that the print improving liquid is sandwiched between ink layers on the printing medium with respect to a direction vertical to the surface of the medium.

A further aspect of the ink-jet printing apparatus of the present invention is one which uses an ink discharge portion for discharging the ink, and a liquid discharge portion for discharging a print improving liquid for endowing the printing medium with improved printability in ink-jet printing, to achieve printing, wherein in an outward way of the main scanning direction of printing, the liquid discharge portion discharges the print improving liquid, then the ink discharge portion discharges the ink, and further the liquid discharge portion discharges the print improving liquid, and in a return way of the main scanning direction, the liquid discharge portion discharges the print improving liquid, then the ink discharge portion discharges the ink, and further the liquid discharge portion discharges the print improving liquid, and having discharge control means for forming an image so that the print improving liquid is sandwiched between ink layers on the printing medium with respect to a direction vertical to the surface of the medium.

A further aspect of the ink-jet printing apparatus of the present invention is one which uses an ink discharge portion for discharging the ink, and a liquid discharge portion for discharging a print improving liquid for endowing the printing medium with improved printability in ink-jet printing, to achieve printing, wherein in the main scanning direction of printing, the liquid discharge portion discharges the print improving liquid, then the ink discharge portion discharges the ink, and further the liquid discharge portion discharges the print improving liquid, and having discharge control means for forming an image so that the print improving liquid is sandwiched between ink layers on the printing medium with respect to a direction vertical to the surface of the medium.

In the apparatus of the above construction, an element for a facsimile may further be provided, an element for a copier may further be provided, or an element for a personal computer may further be provided.

Further, in the apparatus of the above construction, the ink-jet head having the plurality of discharge portions may be detachably provided from the apparatus main unit.

Still further, in the apparatus of the above construction, a plurality of types of the head unit structures of the head chips constituting the individual discharge head incorporated in an integrated frame may be combined and detachably provided on the same carriage, so that the individual head units are identified to achieve optimized control.

Yet further, the apparatus of the above construction may have print control means for forming an image in which the print improving liquid discharged from the liquid discharge portion is sandwiched between the inks discharged from at least one set of the colored ink discharge portions on the printing medium with respect to a direction vertical to the surface of the medium.

Yet further, in the apparatus of the above construction, the print improving liquid discharged from the liquid discharge portion may be placed at a position shifted by ½ picture element in the main scanning direction, or the sub-scanning direction, or both to the ink picture element on the printing medium. In this case, the print control means may be printable in 1-pass bidirectional printing, in 1-pass unidirectional printing, 2-pass bidirectional printing, 2-pass unidirectional printing, in N-pass (N is a positive number) bidirectional printing, or in N-pass (N is a positive number) unidirectional printing.

Yet further, in the apparatus of the above construction, the one set of colored inks sandwiching the print improving liquid may be the same or different in color.

Yet further, in the apparatus of the above construction, the one set of colored inks sandwiching the print improving liquid may have different compositions. In this case, in the different compositions, one may be a high-penetration type solvent composition which momentarily penetrates into the printing medium, and one may be an overlay type solvent composition which slowly penetrates into the printing medium.

Yet further, the print improving liquid may contain a cationic substance comprising a low molecular weight component and a high molecular weight component, and the ink may contain an anionic dye, and a cationic substance comprising a low molecular weight component and a high molecular weight component, and the ink may contain an anionic dye or at least an anionic compound and a pigment.

To attain the above object, the ink-jet printing method of the present invention uses an ink-jet discharge portion for discharging a colored ink, and an ink-jet head having a liquid discharge portion for discharging a print improving liquid for endowing the printing medium with improved printability in ink-jet printing, to form an image, wherein the print improving liquid discharged from the liquid discharge portion is sandwiched between the inks discharged from at least one set of the colored ink discharge portions on the printing medium with respect to a direction vertical to the surface of the medium.

In the printing method of the above arrangement, the print improving liquid discharged from the liquid discharge portion may be placed at a position shifted by ½ the picture element in the main scanning direction, or the sub-scanning direction, or both to the ink picture element on the printing medium.

Further, in the printing method of the above arrangement, the colored inks may be the same or different in color.

Still further, another aspect of the ink-jet printing method of the present invention uses an ink-jet head having an ink discharge portion for discharging the ink, a liquid discharge portion for discharging a print improving liquid for endowing the printing medium with improved printability in ink-jet printing, wherein in an outward way of the main scanning direction of printing, the liquid discharge portion discharges the print improving liquid, then the ink discharge portion discharges the ink, and in a return way of the main scanning direction, the liquid discharge portion discharges the print improving liquid, then the ink discharge portion discharges the ink, for forming an image so that the print improving liquid is sandwiched between ink layers on the printing medium with respect to a direction vertical to the surface of the medium.

A further aspect of the ink-jet printing method of the present invention uses an ink-jet head having an ink discharge portion for discharging the ink, a liquid discharge portion for discharging a print improving liquid for endowing the printing medium with improved printability in ink-jet printing, wherein in an outward way of the main scanning direction of printing, the ink discharge portion discharges the ink, then the liquid discharge portion discharges the print improving liquid, and in a return way of the main scanning direction, the ink discharge portion discharges the ink, then the liquid discharge portion discharges the print improving liquid, for forming an image so that the print improving liquid is sandwiched between ink layers on the printing medium with respect to a direction vertical to the surface of the medium.

A further aspect of the ink-jet printing method of the present invention uses an ink-jet head having an ink discharge portion for discharging the ink and a liquid discharge portion for discharging a print improving liquid for endowing the printing medium with improved printability in ink-jet printing, wherein in an outward way of the main scanning direction of printing, the liquid discharge portion discharges the print improving liquid, then the ink discharge portion discharges the ink, further the liquid discharge portion discharges the print improving liquid, and in a return way of the main scanning direction, the liquid discharge portion discharges the print improving liquid, then the ink discharge portion discharges the ink, further the liquid discharge portion discharges a print improving liquid, for forming an image so that the print improving liquid is sandwiched between ink layers on the printing medium with respect to a direction vertical to the surface of the medium.

A further aspect of the ink-jet printing method of the present invention uses an ink-jet head having an ink-jet head unit for discharging the ink, and a liquid discharge portion for discharging a print improving liquid for endowing the printing medium with improved printability in ink-jet printing, wherein in the main scanning direction of printing, the liquid discharge portion discharges the print improving liquid, then the ink discharge portion discharges the ink, further the liquid discharge portion discharges the print improving liquid, for forming an image so that the print improving liquid is sandwiched between ink layers on the printing medium with respect to a direction vertical to the surface of the medium.

To attain the above object, the ink-jet cartridge of the present invention comprises the ink-jet head of the above construction, and an ink tank provided detachably from the ink-jet head.

Further, to attain the above object, the printed matter of the present invention is one which has an image formed of the ink provided from the ink-jet head and the print improving liquid provided on the printing medium for improving the printability in ink-jet printing, characterized in that the image is formed so that the print improving liquid discharged from the liquid discharge portion is sandwiched between the inks discharged from at least one set of the colored ink discharge portions on the printing medium.

In the printed matter of the above arrangement, he print improving liquid discharged from the liquid discharge portion may be placed at a position shifted by ½ the picture element in the main scanning direction, or the sub-scanning direction, or both relative to the ink picture element on the printing medium.

Further, in the printed matter of the above arrangement, the colored inks may be the same or different in color.

Still further, in the printed matter of the above arrangement, the amount of component of the print improving liquid present at the center may be more than the component amount of the individual inks sandwiching the print improving liquid.

The improvement of printability in the present invention includes improvement of the density, color saturation, edge sharpness, quality of dot diameter, ink fixing, and weather resistance such as water resistance, light resistance, and the like, that is, the improvement of image preservability. The print improving liquid is not necessarily discharged separately from the ink, but may be discharged by mixing with an ink which does not interact with the print improving liquid among a plurality of inks.

The discharge portion (or discharge portion) in the present invention means a discharge nozzle array such as for the ink or the print improving liquid. Further, the head chip is a chip where the discharge portion is provided on a single substrate to form a discharge nozzle group, and a plurality of head chips are combined to form a head unit.

Further, the discharge portion is not necessarily formed on a single head chip, but includes one which is formed over different chips.

Still further, the ink jet head of the present invention is so-called an aggregate of discharge portions in the ink jet printing apparatus, which may be integral with or separate from the apparatus. When they are separate from the apparatus, the head unit is included, and the number of head chips in this case is not specifically limited.

With the above construction, the optimum head construction and printing method can be provided which achieve the full effects of the pre-feed/follow feed techniques. In particular, the printing method due to the head construction of pre-feed/follow feed combining the head construction and printing method can provide sufficient effects of pre-feed/follow feed techniques (penetration control, blotting prevent, improvement of fixing, feathering prevention, reduction of bleeding, reduction of irregularity/stripes, and the like), enables high-speed, high-quality printing with a low-cost apparatus structure, obtains a sufficient effect at a minimum consumption of the conventional print improving liquid, thereby reducing the running cost and the apparatus size.

The above and other objects, effects, features and advantages of the present invention will become more apparent from the following description of embodiments thereof taken in conjunction with the accompanying drawings.

BRIEF DESCRIPTION OF THE DRAWINGS

FIG. 11A and 11B are schematic views comparing bidirectional printing made by using the print head of the embodiment 2 with a conventional one;

FIG. 25 is a schematic view showing an example of color printing method of the embodiment 5;

FIG. 28 is a schematic view showing an example of integral type nozzle structure of another embodiment;

FIG. 29 is a schematic view showing an example of integral type nozzle structure of another embodiment;

FIG. 30 is a schematic view showing an example of integral type nozzle structure of another embodiment;

FIG. 31 is a schematic view showing an example of integral type nozzle structure of another embodiment;

FIG. 32A, FIG. 32B and FIG. 32C are schematic views showing examples of separate type nozzle structure of another embodiment;

FIG. 33A, FIG. 33B and FIG. 33C are schematic views showing examples of separate type nozzle structure of another embodiment;

FIG. 34A, FIG. 34B, FIG. 34C and FIG. 34D are schematic views showing examples of separate type nozzle structure of another embodiment;

DETAILED DESCRIPTION OF PREFERRED EMBODIMENTS

Preferred embodiments of the present invention will now be described in detail with reference to the drawings.
(Embodiment 1)
Monochromatic head unit (Bk+S+Bk)
Achieving both Bk high-speed printing and high-speed printing of print improving liquid
(Head structure)
The structure of an ink jet head according to an embodiment of the present invention will be described.

Figure 1:
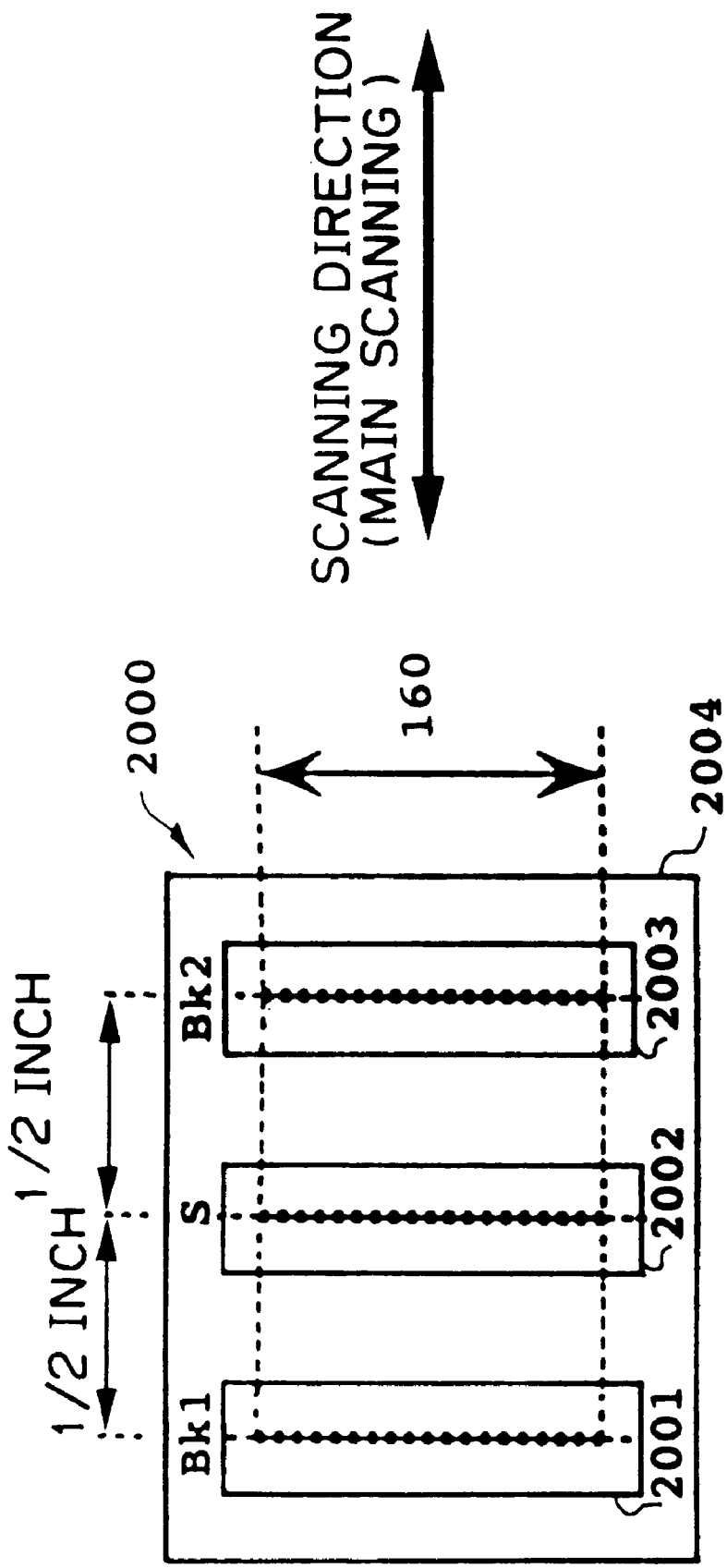
FIG. 1 is a schematic plan view showing a print head unit according to an embodiment 1 of the present invention.

FIG. 1 shows the structure of a monochromatic head unit 2000 used in the present embodiment. The head unit comprises a Bk1 chip 2001 for black ink, an S chip for a print improving liquid, and a Bk2 chip 2003 for black ink. These chips are inclined (tan θ=1/160) relative to a frame 2004 so that they can be corrected according to the drive timing, and the pitch between the individual chips is set to ½ inch. The chips are the same for Bk1/S/Bk2, and the discharge characteristics are shown below.
<Bk1/S/Bk2>
(Discharge characteristics)
Number of nozzles: 160 (number of divided blocks: 16 blocks sequentially driven)
Reliquid: 360 dpi
Drive frequency: 8.0 (kHz)
Discharge amount: Vd=80±4 (pl/dot)
Discharge speed: 15±0.5 (m/s)
(Drive condition)
Drive voltage: Vop=24.0 (V)
Drive pulse width: Pw=5.5 ($\mu$s)
Release time per block: Tb=7.5 ($\mu$s)

Figure 2:
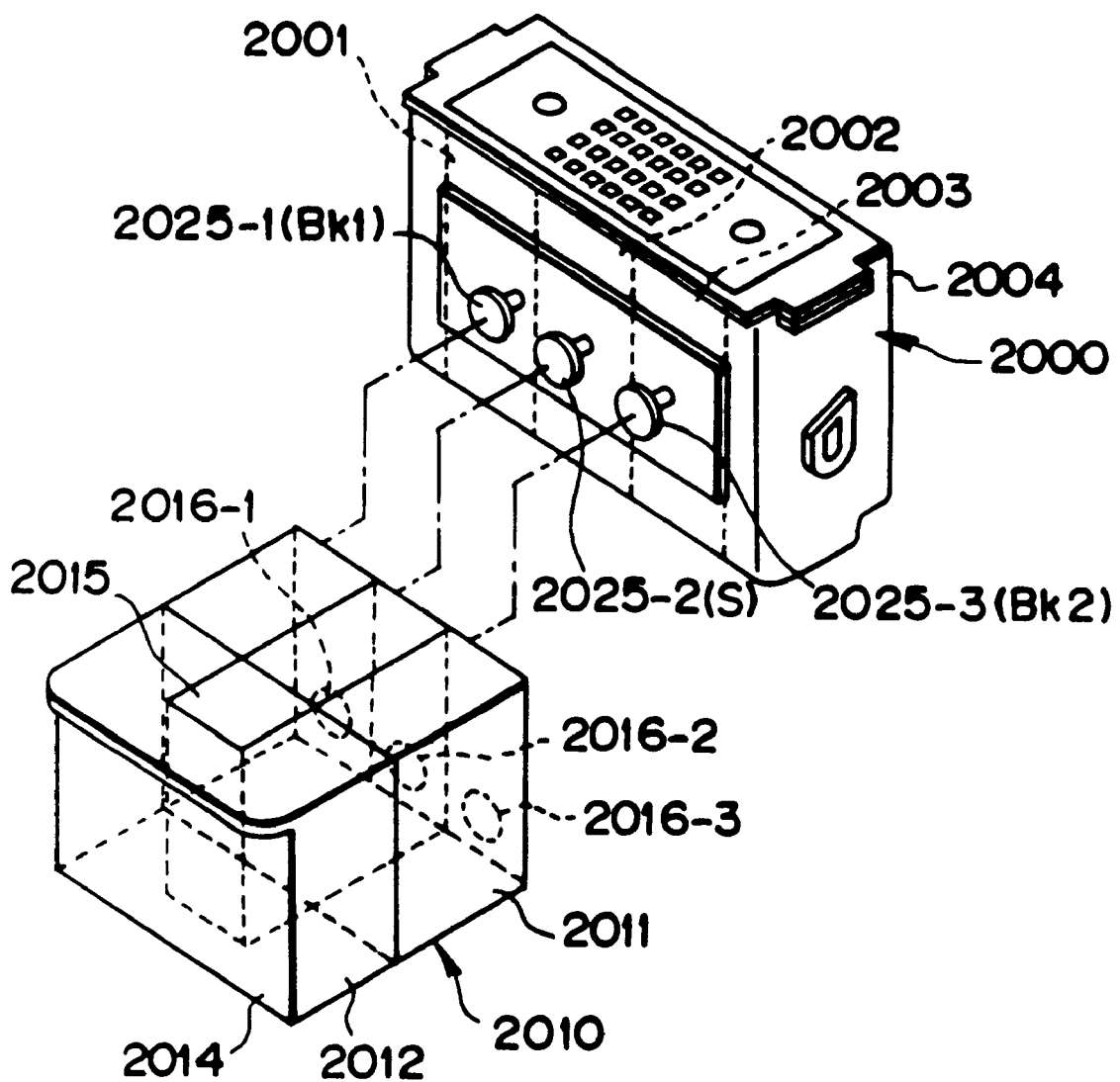
FIG. 2 is a schematic perspective view showing a monochromatic print head unit 1 used in the embodiment 1.

FIG. 2 is a perspective view of an ink jet cartridge (head unit and ink tank). The head unit 2000 and a tank 2010 are detachably provided. When the ink is exhausted, a remaining ink detection mechanism (not shown) prompts the user to replace it.

Figure 3:
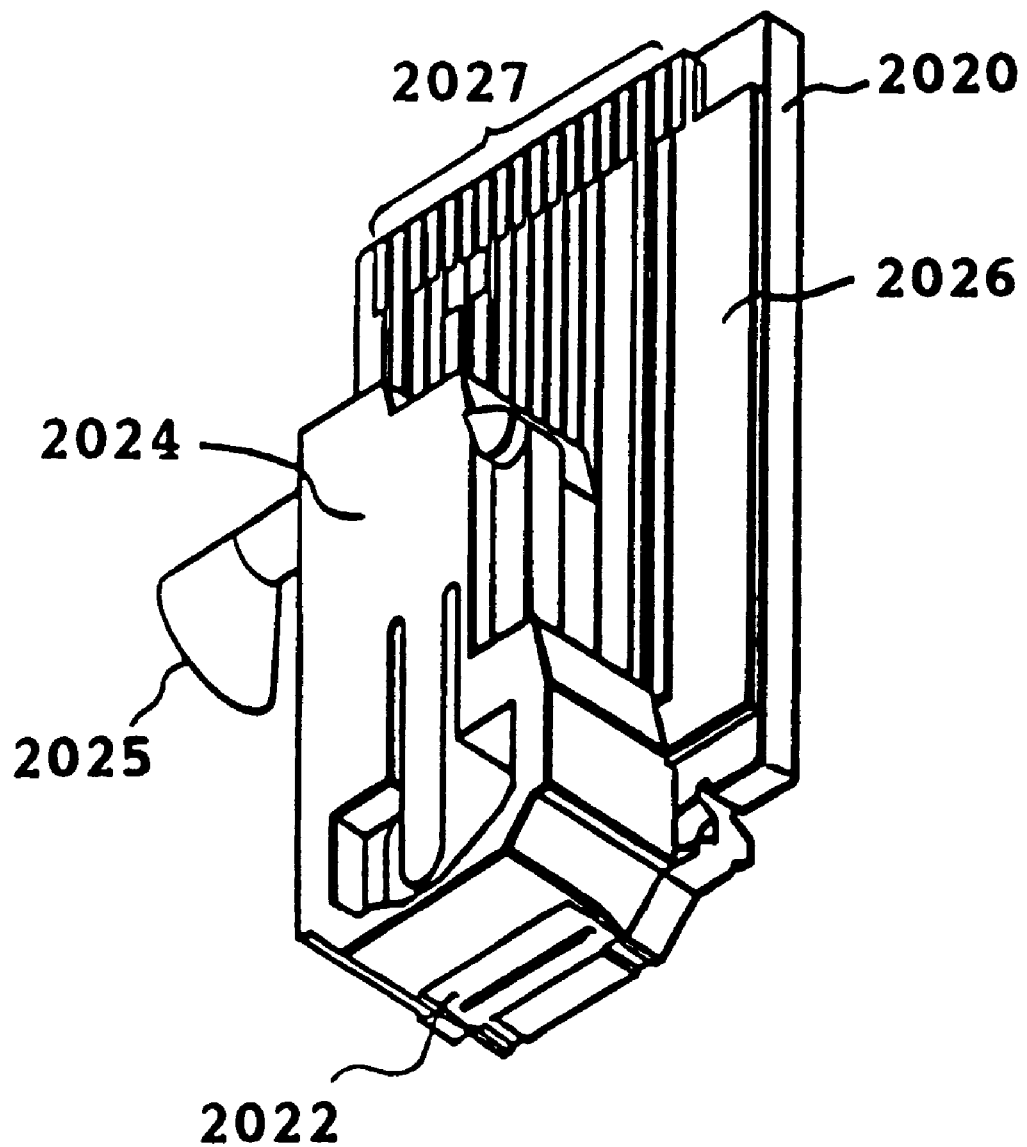
FIG. 3 is a schematic perspective view showing an example of print head chip.

The head unit 2000 comprises the Bk1 chip 2001, the S chip 2002, and the Bk2 chip 2003, which are incorporated in the frame 2004. As shown in FIG. 3, each of the head chips 2001, 2002, and 2003 is stuck with a heater board (HB) (not shown) on the Al base plate 2020, a molded polysulfone (PSF) grooved top plate 2022 is placed on top, sealed with a sealing agent (not shown), and the grooved top plate 2022 is mounted to the base plate 2020. These chips are provided with a chip tank 2024 having a mesh filter 2025, and with a printed circuit board (PCB) 2026 for connecting a signal line to a flexible cable of the main unit, and the PCB 2026 is provided with a signal line terminal 2027. The mesh filter 2025 of each chip tank 2024 is protruded from the frame, as shown in FIG. 2, and the individual mesh filters are indicated as 2025-1, 2025-2, and 2025-3.

The tank 2010 connected to the head unit 2000, as shown in FIG. 2, is divided into a plurality of parts, one is a room 2011 which incorporates a sponge, and another is a room 2012 which incorporates a liquid ink, as is. The room 2011 has a buffer room communicating with the atmosphere, which is filled with air rather than the sponge. Further, the liquid ink incorporated in the ink storage room 2012 is hereinafter referred to as "a raw ink". In the single tank 2010, two types of liquids, that is, a black ink 2014 and the print improving liquid 2015 can be integrally incorporated. The black ink 2014 is incorporated at both sides of the tank, symmetrically about the tank center, and the print improving liquid 2015 is incorporated at the tank center. The tank 2010 has three ink feed ports 2016-1, 2016-2, and 2016-3 communicating with the room 2011 containing the sponge, and each feed port 2016-1, 2, 3 is inserted with a mesh filter 2025-1, 2, 3. Therefore, the filter 2025-1, 2, 3 of the head 2000 is inserted from the feed port 2016-1, 2, 3, the chip is contacted close to the sponge portion of the tank 2010, and sequentially or simultaneously suctioned by main unit recovery means (not shown), thereby feeding the individual inks.

(Print mode)
Print mode with the head structure of the present embodiment will be described.

There are basically the following three print modes, which are selectable according to the image quality and print speed required by the user.

1. Fast mode: 1-pass bidirectional 360×360 dpi (with/without print improving liquid)
2. Normal mode: 2-pass bidirectional 360×360 dpi (with/without print improving liquid)
3. High quality mode: 4-pass unidirectional 720×360 dpi (with/without print improving liquid).

While the print mode can be selected by a printer driver incorporated in the host computer (not shown), it can also be selected by a printer select switch (SW) (not shown).

(Fast mode: without print improving liquid)

When the print improving liquid is not used, print is made in 1-pass bidirectional mode using both of the two Bk chips 2001 and 2003. Print uses all 160 nozzles of Bk1 and Bk3. The carriage is driven at a high speed with a drive frequency 16 (kHz)/360 dpi/about 1129 (mm/s), twice the head drive frequency of 8 (kHz). Discharge is made from the heads with timing shifted by 1 dot by so that the image is interpolated on the medium to be printed. Using this method, an image of 360 dpi can be printed at an ultra-high speed. In the present embodiment, print is made at an ultra-high speed using the 2 heads, however, alternatively, a mode for making print using normal 1 head may be provided according to the load of the power supply or the motor of the main unit.

(Fast mode: with print improving liquid)

An example of printing method using the print improving liquid in the present embodiment will be described.

When 1-pass bidirectional printing is made using the head structure of the present embodiment, depending on the scanning direction of the print head unit, one of the two Bk chips 2001 and 2003 is selected so that the print improving liquid can be printed always before or after. Printing is made using all of the 160 nozzles of Bk1, 2, and S, with a carriage frequency of 8 (kHz)/360 dpi/about 564 (mm/s). While the carriage is driven at a drive frequency of 8 (kHz), same as the head drive frequency, an image of the print improving liquid and the Bk ink is formed on the medium to be printed. In the present embodiment, the Bk heads are used in alternation between the outward and return way during 1-pass bidirectional printing, so that the print improving liquid is always printed before on the printing medium, and then the Bk ink is printed. In this case, the print improving liquid dot and the Bk dot are discharged and applied so that they are perfectly overlapped with each other to enable high speed printing of a 360 dpi image even when using the print improving liquid.

This can prevent the occurrence of uneven density (uneven band) caused by a difference in density due to a difference in application order (S→Bk or Bk→S) of the print improving liquid and the ink occurring in 1-pass bidirectional printing with a conventional 2 head structure of one Bk head and one print improving liquid head.

(Normal mode: without print improving liquid)

When the print improving liquid is not used, print is made in 2-pass bidirectional fine mode (mask pattern is zigzag or reverse zigzag) using both of the two Bk chips 2001 and 2003. In the printing method, using all of 160 nozzles of Bk1 and Bk2, in the first outward scanning, the carriage is driven at a high speed with a drive frequency of 16 (kHz)/360 dpi/about 129 (mm/s). While driving the carriage at twice the head drive frequency of 8 (kHz), the individual head is masked in zigzag or revere zigzag so that the image is interpolated on the medium to be printed. This enables high speed 2-dot fine printing of a 360 dpi image when the print improving liquid is not used. In the present embodiment, though 2 heads are used to achieve high speed fine printing, a fine mode may be provided to print using a normal 1 head according to the load of the power supply or the motor of the main unit. The present embodiment uses a zigzag or reverse zigzag pattern of 1 dot for the mask pattern in fine printing, however, alternatively, a conventional method may be used which is optimum for the printing medium, image quality, and ink, such as a plurality of dots, or a deformed pattern with vertical and horizontal lengths varied.

(Normal mode: with print improving liquid)

An example of printing method when the print improving liquid is used in the present embodiment will be described below.

When 2-pass bidirectional printing is made using the head structure of the present embodiment, depending on the scanning direction of the print head unit, one of the two Bk chips 2001 and 2003 is selected so that the print improving liquid can be printed always before or after. When printing the first pass in the outward direction, using 80 nozzles at the lower half of 160 nozzles of Bk1 and Bk2. the carriage is driven with a drive frequency of 8 (kHz)/360 dpi/about 564 (mm/s). While the carriage is driven with the same drive frequency as that of the head of 8 (kHz), an image of the print improving liquid (S) and Bk ink (Bk2) is formed on the printing medium. When printing the second pass in the return direction, after the printing medium is fed by 80 nozzles, using all 160 nozzles of Bk1 and Bk2, the carriage is driven with a drive frequency of 8 (kHz)/about 564 (mm/s) and the head is driven with the same drive frequency of 8 (kHz) to form an image of the print improving liquid (S) and Bk ink (Bk1) on the printing medium. After the third pass, printing is made while feeding the paper similarly by 80 nozzles. In this case, in the present embodiment, the Bk heads are used in alternation in the outward and return ways during 2-pass bidirectional printing, so that the print improving liquid (S) is printed on the printing medium always before the Bk ink is printed. In this case, the print improving liquid dot and the Bk dot are discharged and applied so that they are perfectly overlapped with each other to enable high speed printing of a 360 dpi image even when using the print improving liquid.

This can prevent the occurrence of uneven density (uneven band) caused by a difference in density due to a difference in application order (S→Bk or Bk→S) of the print improving liquid and the ink occurring in 2-pass bidirectional printing with a conventional 2-head structure of one Bk head and one print improving liquid head.

(High quality mode: without print improving liquid)

When the print improving liquid is not used, print is made in 4-pass unidirectional mode using both of the two Bk chips. In the printing method, using 40 nozzles, that is, a quarter of 160 nozzles of Bk1 and Bk2 for the first pass, the carriage is driven at a high speed with a drive frequency of 16 (kHz)/720 dpi/about 564 (mm/s) during printing. While driving the carriage at twice the head drive frequency of 8 (kHz), the heads are caused to discharge while developing the print data by a data development unit (not shown) so that the heads are interpolated with each other during 4-pass printing on the medium to be printed. This enables high speed printing of a 720 dpi image when the print improving liquid is not used. When printing the second pass, after the printing medium is fed by 40 nozzles, printing is similarly made while developing the image using all of 160 nozzles of Bk1 and Bk2. After the third pass, paper is similarly fed by 40 nozzles each to achieve printing. In this case, the drive pulse width of Bk1 and Bk2 is narrowed to adjust the discharge amount according to the 720 dpi image, reducing the discharge amount from 80 pl to 40 pl. Further, during the back-scanning, carriage is driven at an ultra-high speed with a drive frequency of 16 (kHz)/360 dpi/about 1128 (mm/s) to return the carriage, and during this period, paper feed 40 nozzles is completed. In the present embodiment, high speed printing is achieved using two heads, however, alternatively, a mode for making print using normal 1 head may be provided according to the load of the power supply or the motor of the main unit.

(High quality mode: with print improving liquid)

An example of printing method when the print improving liquid is used in the present embodiment will be described below.

When 4-pass bidirectional printing is made using the head structure of the present embodiment, depending on the scanning direction of the print head unit, one of the two Bk chips is selected so that the print improving liquid can be printed always before or after. When printing in the outward direction of the first pass, using 40 nozzles of the lower quarter of 160 nozzles of Bk1 and Bk2, the carriage is driven with a drive frequency of 8 (kHz)/720 dpi/about 282 (mm/s). While driving the carriage with the same drive frequency as the head drive frequency of 8 (kHz), an image of the print improving liquid (S) and the Bk ink (Bk2) is formed on the medium to be printed. When printing in the return direction of the second pass, after the printing medium is fed by 40 nozzles, using 80 nozzles at the lower half of Bk1, 2, the carriage is driven with a drive frequency of 8 (kHz)/about 282 (mm/s), and while driving the head with the same drive frequency of 8 (kHz), an image of the print improving liquid (S) and the Bk ink (Bk1) is formed on the medium to be printed. After the third pass, paper is similarly fed by 40 nozzles each to achieve printing. In the present embodiment, the Bk heads are used in alternation in the outward and return ways during 2-pass bidirectional printing, so that the print improving liquid (S) is printed on the printing medium always before the Bk ink is printed. In this case, the print improving liquid dot and the Bk dot are discharged and applied so that they are perfectly overlapped with each other to enable high speed printing of a 720 dpi image even when using the print improving liquid.

This can prevent the occurrence of uneven density (uneven band) caused by a difference in density due to a difference in application order (S→Bk or Bk→S) of the print improving liquid and the ink occurring in 4-pass bidirectional printing with a conventional 2-head structure of one Bk head and one print improving liquid head. The present embodiment uses a zigzag or reverse zigzag pattern of 1 dot for the mask pattern in fine printing, however, alternatively, a conventional method may be used which is optimum for the printing medium, image quality, and ink, such as a plurality of dots, or a deformed pattern with vertical and horizontal lengths varied.

Figure 4A:
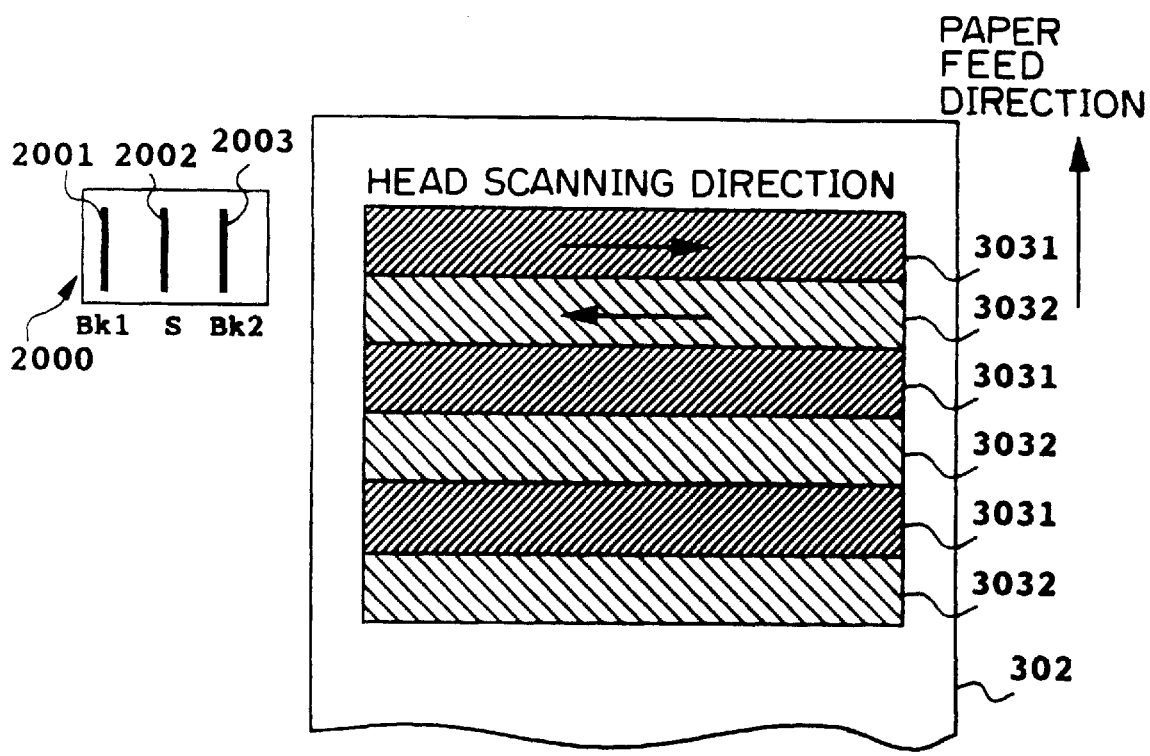
FIG. 4A, FIG. 4B and FIG. 4C are schematic views explaining the conventional printing method.
Figure 4B:
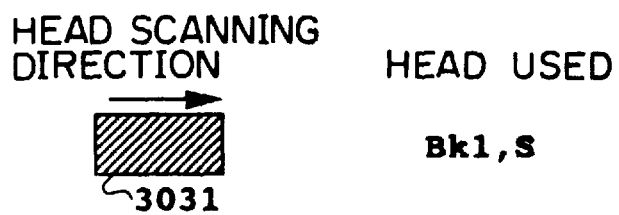
Figure 4C:
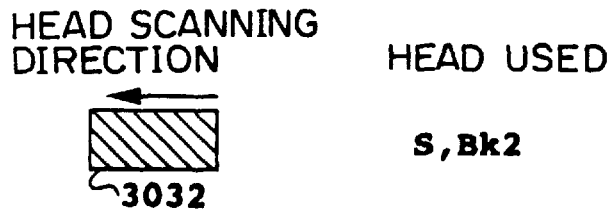

FIG. 4 shows a case where the print improving liquid is applied before. The numeral 302 indicates a printing medium, 3031 indicates an outward direction area where printing is made when the carriage scanning direction is from the left to right (outward direction) on the printing medium, and 3032 indicates a return direction area where printing is made when the carriage scanning direction is reverse from the right to left (return direction) on the printing medium.

In the present embodiment, for 1-pass bidirectional printing, the outward direction area 3031 and the return direction area have 360 dpi with a width of 160 picture elements. In the print area 3031, printing is made using the print improving liquid chip 2002 and the Bk chip 2001.

Similarly, in the print area 3032, printing is made using the print improving liquid chip 2002 and the Bk chip 2003 so that the print improving liquid can be applied always before the Bk ink in both the outward and return directions to achieve printing without uneven density. FIG. 4 shows 1-pass high-speed printing mode as bidirectional printing. For multi-pass printing, by selectively using the chips for picture elements for printing in the outward direction and picture elements for printing in the return direction, the application order of the print improving liquid and the ink can be always the same, and printing is possible while reducing the operation frequency of the print head and preventing an increase in temperature, thereby forming a uniform image due to the above described principle.

In this case, in order that the nozzle used of the print head are not fixed, it is preferable to change the nozzles used (mask pattern) of the individual chips of Bk1/2 at every page or scanning. This can increase the service life of the head and reduce uneven density (variation in discharge) due to operation frequency of the nozzles.

As described above, with the present embodiment, Bk can be printed at a high speed, when the print improving liquid is used, water resistance and improved letter quality (improved sharpness/line density/feathering) can be obtained, and uneven density when printing a monochromatic image at a high speed can be improved.

(Description of the apparatus)

An ink jet printing apparatus equipped with the above monochromatic head unit will be briefly described.

Figure 5:
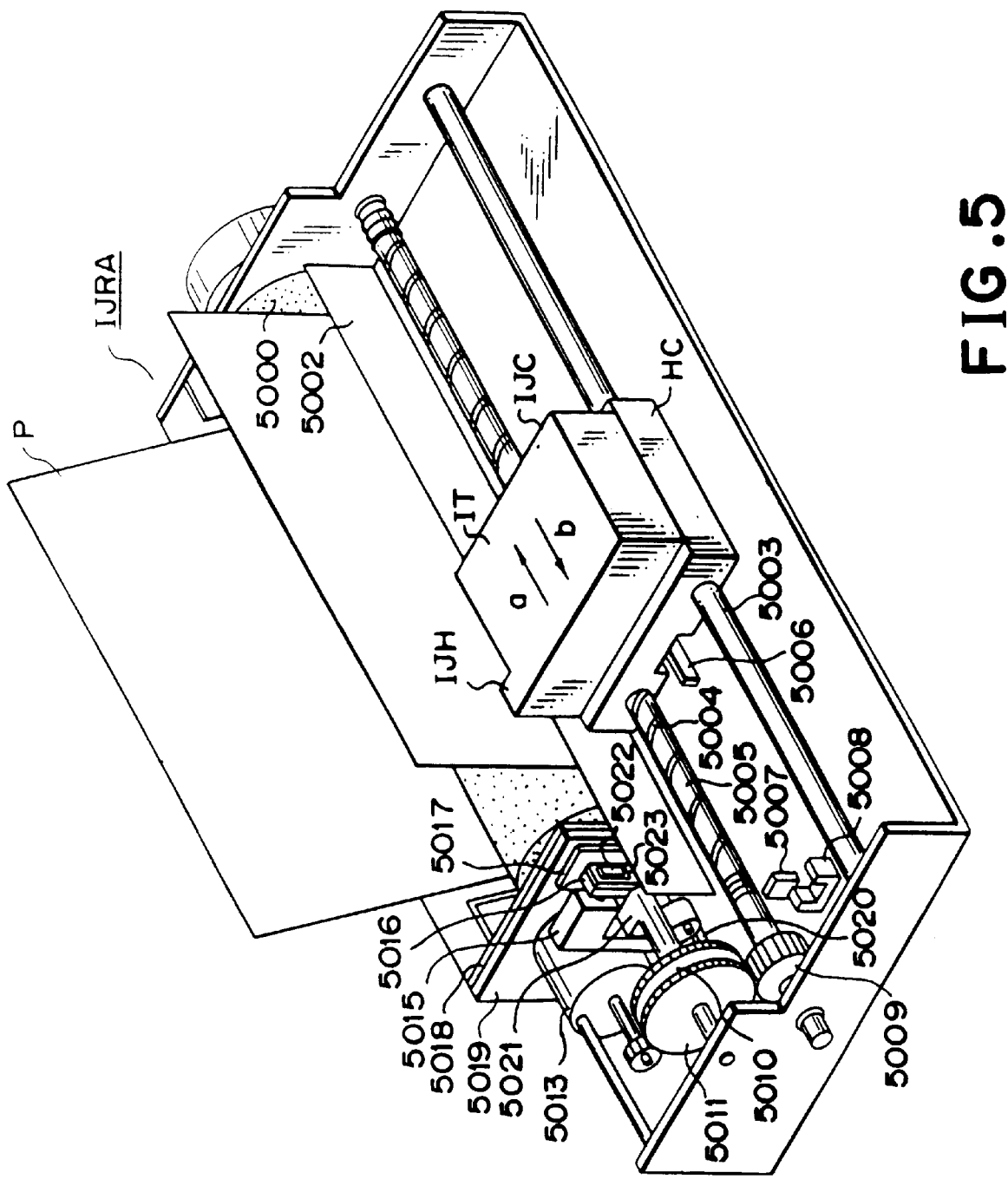
FIG. 5 is a schematic perspective view showing an ink jet printing apparatus used in the embodiment 1 of the present invention.

FIG. 5 is a schematic perspective view of an ink jet printing apparatus IJRA according to an embodiment. Referring to the Figure, a carriage HC engaged with a spiral structure 5004 of a lead screw 5005 rotating through drive force transmission gears 5011 and 5009 according to the forward and reverse rotation of a drive motor 5013 has a pin (not shown), and is reciprocally moved in directions of arrows a and b. The carriage HC is provided thereon with an ink jet head unit 2001. The numeral 5002 indicates a paper holding plate, which presses paper against a platen 5000 over the moving direction of the carriage. The numerals 5007 and 5008 indicate home position detection means for selecting the rotational direction of the motor 5013, the numeral 5016 indicates a member for supporting a cap member 5022 for capping the front surface of the print head, the numeral 5015 is suction means for sucking the inside the cap, which makes suction recovery of the print head through a cap opening 5023. The cap member 5022 and the support member 5016 are provided individually according to the above three head chips, and the cap opening 2023 and the suction means 5016 are also provided according to the individual chips. In this case, the sucked print improving liquid S and the Bk ink are carried such that they are not mixed up with each other, and separately stored in waste ink reservoirs (not shown). The numeral 5017 indicates a cleaning blade, and those for colored ink and for the print improving liquid are separately provided. Further, the numeral 5019 indicates members for moving the blade in the front and rear direction, and these are supported on the main unit support plate 5018. The blades may be constructed so that the print improving liquid and the colored ink are not contacted with each other, and the conventional method known in the art can be used. These capping, cleaning, and suction recovery actions are arranged so that a desired treatment is made as necessary at the corresponding position by a selecting action of the lead screw 5005 and a clutch (not shown).

(Embodiment 2)
Color head unit (Bk+S+CMY)
(Head structure)

Figure 6:
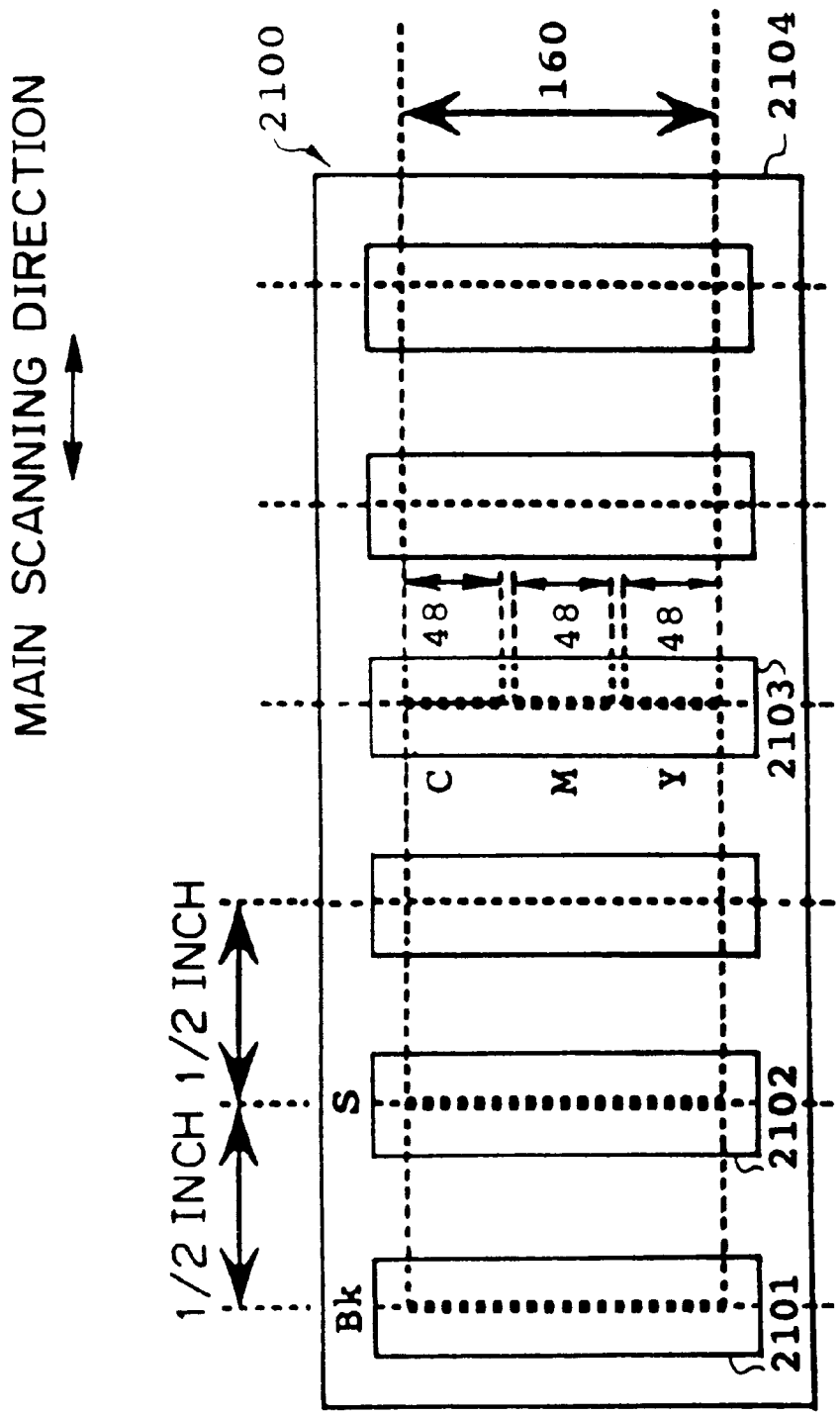
FIG. 6 is a schematic plan view showing a color print head unit used in an embodiment 2.

FIG. 6 shows the structure of a color head unit 2100 used in the present embodiment. The head unit comprises a Bk chip 2101, an S chip 2102 (for print improving liquid), and a CMY color integral chip 2103. The individual chips are inclined relative to a frame 2104 so that they can be corrected for the drive timing, and the pitch between the individual chips is set to ½ inch. In this case, only the pitch between the S2102 and CMY 2103 is set to 1 inch. This is for common use of the ink tank 2010 used in the embodiment 1. The same Bk chip (discharge amount Vd=80 pl) as in the embodiment 1 is used. Discharge characteristics of S and CMY are shown below.

(Discharge characteristics of S)

Number of nozzles: 160 (number of divided blocks: 16 blocks)

Reliquid: 360 dpi

Drive frequency: 8.0 (kHz)

Discharge amount: Vd=40±4 (pl/dot)

Discharge speed: 12±0.5 (m/s)

(Drive condition)

Drive voltage: Vop=24.0 (V)

Drive pulse width: Pw=4.5 ($\mu$s)

Release time per block: Tb=7.5 ($\mu$s)

(Discharge characteristics of CMY)

Number of nozzles: corresponding to 160 nozzles, 48 nozzles for each color (48×3)/sealing between colors 8 nozzles (8×2) (number of divided blocks: 16 blocks)

Reliquid: 360 dpi

Drive frequency: 8.0 (kHz)

Discharge amount: Vd=40±4 (pl/dot)

Discharge speed: 12±0.5 (m/s)

(Drive condition)

Drive voltage: Vop=24.0 (V)

Drive pulse width: Pw=4.5 ($\mu$s)

Release time per block: Tb=7.5 ($\mu$s)

Figure 7:
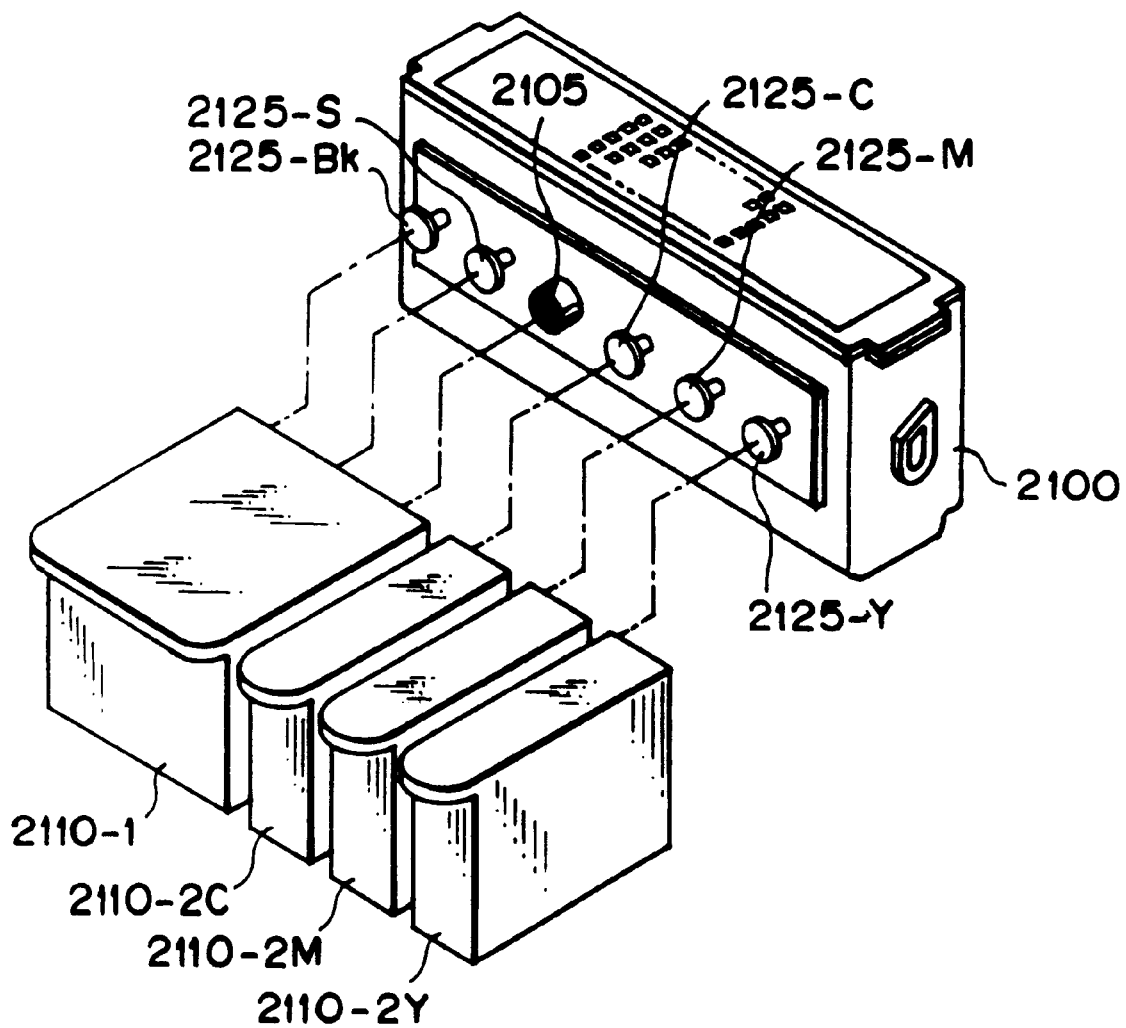
FIG. 7 is a schematic perspective view showing the color print head unit used in the embodiment 2.
Figure 8:
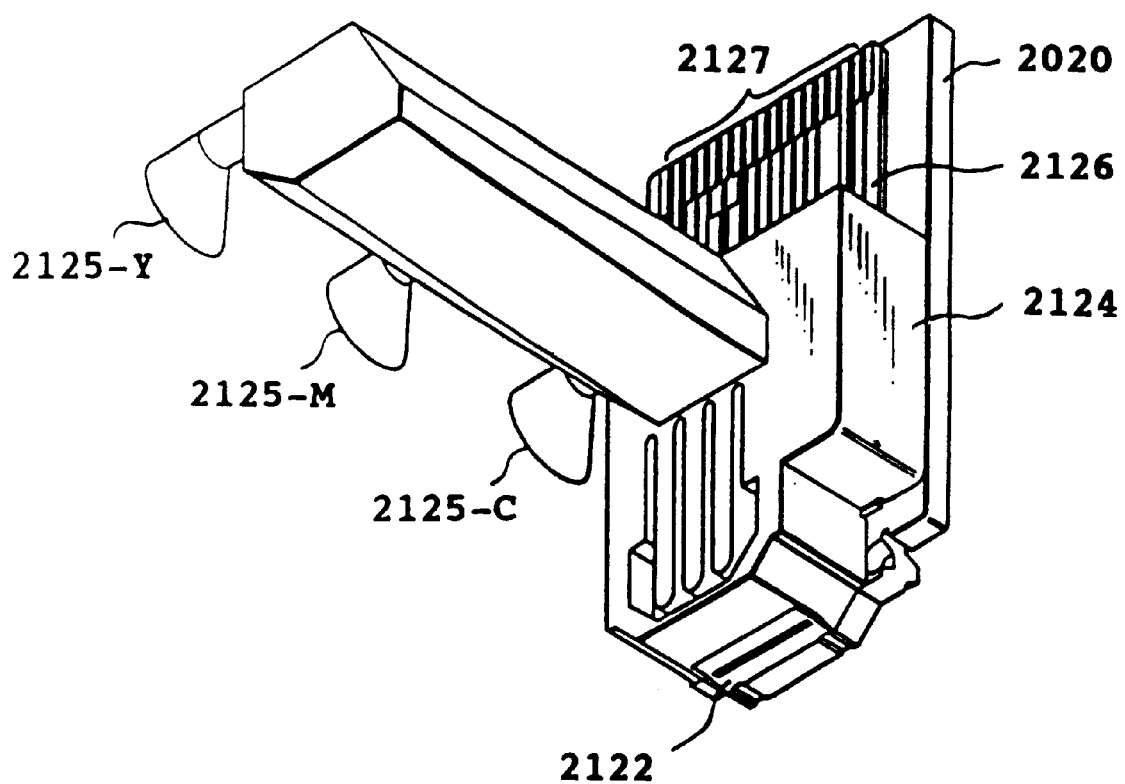
FIG. 8 is a schematic perspective view showing an example of print head chip.
Figure 9:
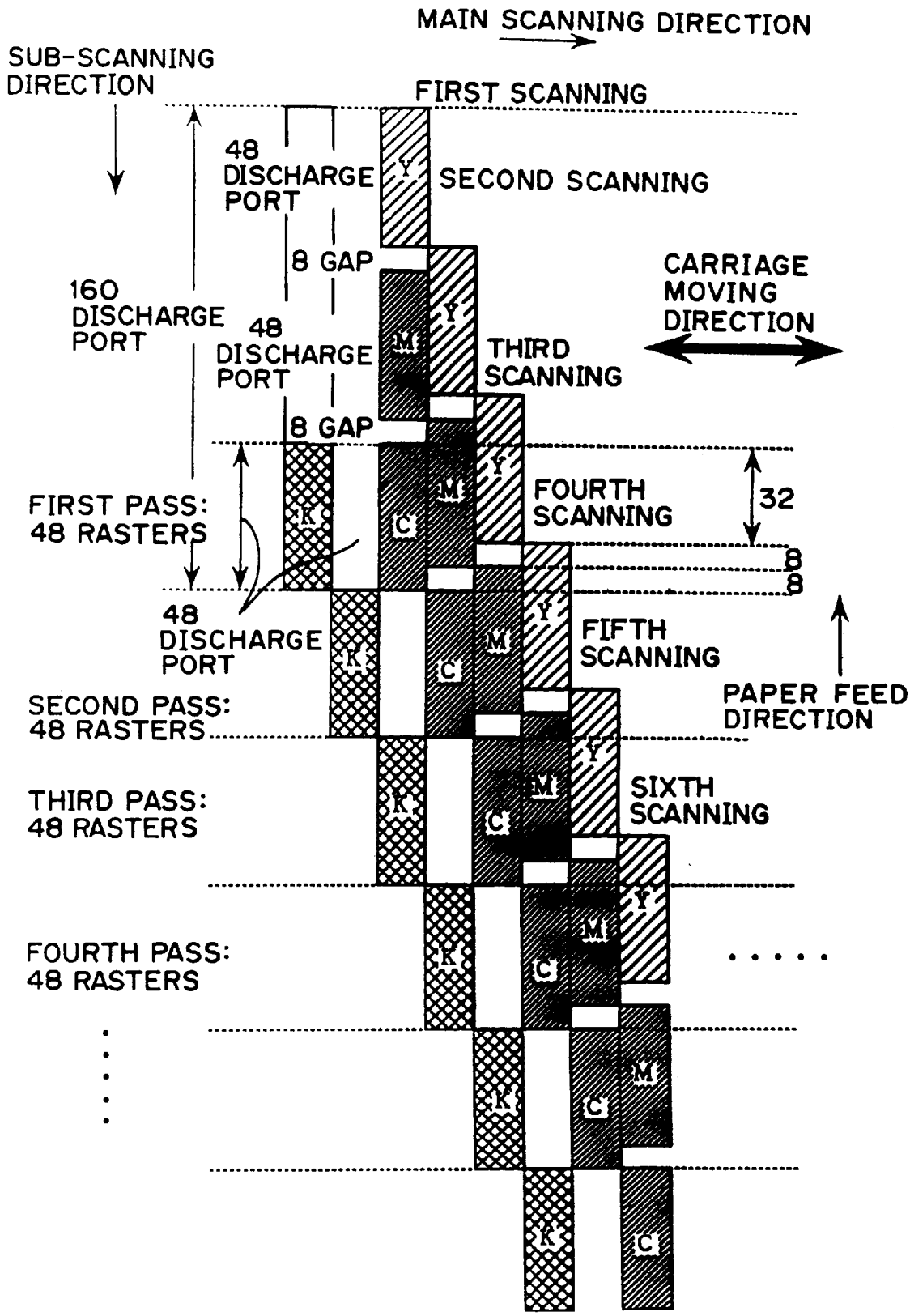
FIG. 9 is a schematic view for explaining the color printing method of the embodiment 2.

FIG. 7 is a perspective view of a color ink jet cartridge (head unit and tank). The head unit 2100, a tank 2110-1 which is the same as the tank in the embodiment 1, and tanks 2100-2C, 2M, 2Y (color ink tanks) detachably structured. When an ink is exhausted, a remaining ink detection mechanism (not shown) prompts the user to replace it through the main unit for each color. The head chips 2101 and 2102, as shown in FIG. 3, are the same as those described in the embodiment 1. The head chip 2103 is able to print three color inks (C, M, Y) by a single chip, in which, as shown in FIG. 8, a heater board (not shown) is stuck to the Al base plate 2020, a grooved top plate 2122 separated into three liquid chambers by a single polysulfone (PSF) is placed on top, sealed by a sealant, retained with a retaining spring (not shown), and a chip tank 2124, which can independently supply three color inks, is mounted. The grooved top plate 2122 is provided with partitions between colors corresponding to 8 nozzles.

The tank 2110-1 (for Bk+S) is the same as in the embodiment 1 and detailed description thereof is omitted. However, because there are three ink supply ports for two chips, the right side Bk2 ink supply port remains as an extra, from which ink leakage or vapor tends to generate. To prevent this, the head unit 2100 is provided with a cover 2105 for closing the hole. In the present embodiment, the color 2105 is attached to the head unit 2100 to prevent vaporization of ink, however, alternatively, the tank side and the filter side may be structured in which a communication hole is provided only at the portion contacting with the filter unit when the tank is mounted so that the ink is supplied through the hole.

The tanks 2110-2C, 2M, 2Y are the same in structure, and divided into a plurality of chambers; one is a chamber 2111 where the sponge is incorporated, and another is a chamber 2112 where the raw ink is incorporated. The chamber 2111 has a buffer chamber. One color uses a tank 2110-2. To supply each ink, the sponge portion of the tank 2110-1 and the tanks 2110-2C, 2M, or 2Y is contacted close to the filter 2124-Bk, and 2124-C, M, Y of the head 2100, and sucked sequentially or simultaneously by the main unit recovery means (not shown).

(Print mode)

Color print mode with the head structure of the present embodiment will be described. Since the Bk printing method is the same as prior art, it will be briefly described here.

There are basically the following three print modes, which are selectable according to the image quality and print speed required by the user.

1. Fast mode: 1-pass bidirectional 360×360 dpi (with/without print improving liquid)

2. Normal mode: 2-pass bidirectional 360×360 dpi (with/without print improving liquid)

3. High quality mode: 4-pass uni/bidirectional 720×360 dpi (with/without print improving liquid).

While the print mode can be selected by a printer driver incorporated in the host computer (not shown), it can also be selected by a printer select SW (not shown).

For simplicity, here the color printing method using the above head structure, and the printing method of the print improving liquid at the boundary portion for preventing white fogging occurring at the boundary between colored ink portion and Bk ink portion will be mainly described here.

(Bk print mode)

With the head of the present embodiment, when the printed matter has an image of Bk ink only, there are provided High speed print mode (print mode—Bk1) in which the print improving liquid is printed in alternation in the pre-feed condition and the follow feed condition in bidirectional printing mode using 160 nozzles each of the Bk chip 2101 and the print improving liquid chip 2102:

However, when an uneven band is generated due to penetration condition of pre-feed/follow feed, A print mode (print mode—Bk2) in which fine printing is made with the mask applied for every scanning while feeding paper by 80 nozzles in 160 nozzles each of the Bk chip 2101 and the print improving liquid chip 2102, wherein printing is made in bidirectional printing while making mask treatment so that Bk and the print improving liquid are individually applied in about halves in area for the pre-feed condition and the follow feed condition, and the difference in density between the pre-feed condition and the follow feed condition is distributed to be invisible to human eyes as an average density, thereby preventing occurrence of uneven density and enabling high speed printing without uneven density in bidirectional printing, and A print mode (print mode—Bk3) in which the print improving liquid is always fixed to the pre-feed condition or the follow feed condition by making printing in unidirectional printing using individual 160 nozzles of the Bk chip 2101 and the print improving liquid chip 2102 (conventional printing method) thereby achieving positive printing, though being low in speed.

<Color print mode>

On the other hand, when the printed matter has a color image, the Bk chip 2101 and the print improving liquid chip 2102 are printed using only (cyan side) 48 nozzles which is first printed among 160 nozzles, according to the number of nozzles of one color (C) of the color chip 2103. An example of color image formation method is shown below.

During the outward direction printing of the first scan, using only 48 nozzles of 160 nozzles of Bk, the first line is printed using 48 nozzles of the color integral type head C. During the return direction printing of the second scan, the first line is printed using 40 nozzles of M. At this moment, Bk and C of the second line are also printed using 48 nozzles. Then, the printing medium is carried by 48 nozzles, during the outward direction printing of the third scan, the first line is printed using 32 nozzles of Y. At this moment, printing is made using 8 nozzles of M of the second line and 48 nozzles of Bk and C of the third line. Further, the printing medium is carried by 48 nozzles, during the return direction printing of the fourth scan, the first line is printed using 16 nozzles of Y. At this moment, printing is made using 8 nozzles of M and 32 nozzles of Y, and 40 nozzles of M of the third line. Thereafter, the image is formed similarly, and in the last line, while making printing in reverse of the above, formation of image is completed.

As described above, printing is made while completing color print of one line by 4 scans.

Figure 10A:
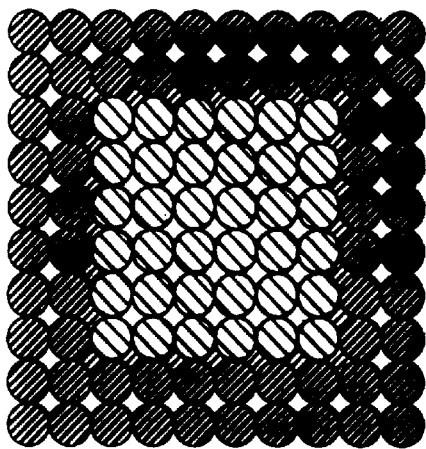
FIG. 10A, 10B, 10C and 10D are schematic views showing an example of printing method at a boundary portion when the print head of the embodiment is used.
Figure 10B:
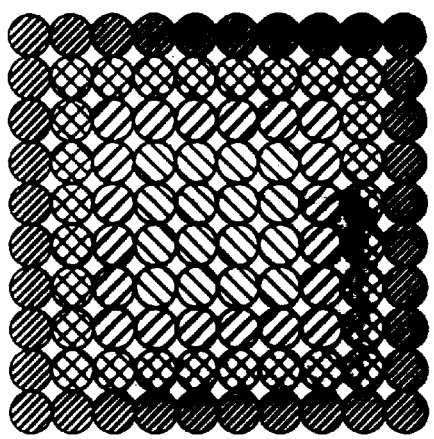
Figure 10C:
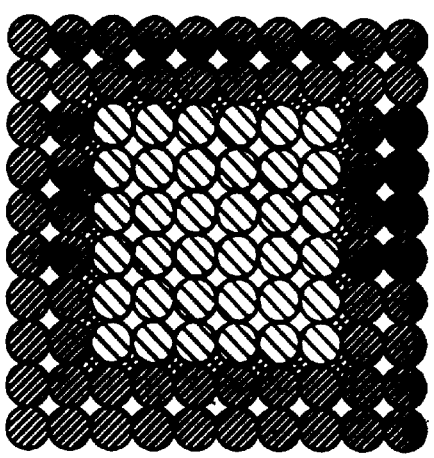
Figure 10D:
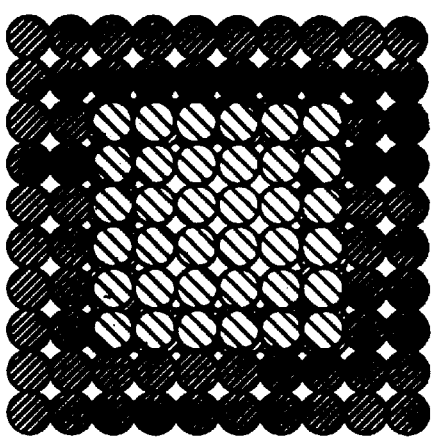

Next, using the present head structure, an example of printing method of the print improving liquid at the boundary in 1-pass bidirectional printing will be described with reference to FIG. 10A. FIG. 10B—FIG. 10D will be described later.

In the present embodiment, the Bk ink used (HS Ink: High Solid) is one which is low in penetration, high in printing density, and good in sharpness, but slightly inferior in fixing, and the color ink (common for C, M, Y/QS Ink: Quick Set) is one which is high in penetration, with no blotting between colors, and good in fixing, but slightly inferior in feathering. Therefore, blotting or white fogging (ink dye is partly diluted and looks white) tends to occur at the boundary between the Bk ink and color ink depending on a difference in properties between the Bk ink and color ink.

In the head structure of the present embodiment, the print improving liquid chip 2102 is disposed between the Bk chip 2101 and the color chip 2103. Therefore, in the outward direction printing, the ink and the print improving liquid are applied in the order of C ink→print improving liquid→Bk ink→M→Y ink, when printing the Bk ink, the print improving liquid is already applied to the printing medium, and the color ink and C/K ink do not directly contact at the boundary. If contact, since the color material of C ink reacts with the print improving liquid (insolubilize or coagulate), the print improving liquid on the C ink reacts with the Bk ink (insolubilize or coagulate), and movement of the color material of the Bk ink does not occur, bleeding or white fogging does not generate. Further, in the return direction printing, print is made in the order of Bk ink→print improving liquid→C ink→M ink→Y ink. On the contrary, in the outward direction printing, when printing the color ink, since the print improving liquid is already applied to the printing medium, and the color material of the Bk ink reacts with the print improving liquid (insolubilize or coagulate) at the boundary, there is no problem. If contact, since it is after the color material of the Bk ink reacts with the print improving liquid (insolubilize or coagulate), no movement of the color material of C/Bk ink occurs, and bleeding or white fogging does not generate. Therefore, with the print head structure of the present embodiment, color materials of the Bk ink and color ink do not directly contact at the boundary, and the prior art problems can be eliminated. In printing the print improving liquid at the boundary in the present embodiment, printing is made in dot-on-dot at the Bk side, and in 2-picture element width at the color side.

The print width of the print improving liquid at the boundary at this moment must be printed at least 1 picture element each for both colored inks in dot-on-dot, preferably, 2 picture elements or more. Further, it is preferable to increase the ink application amount of the print improving liquid for ink of high dye concentration and at the side of ink where penetration is slow. Limitation of printing width and application amount of the print improving liquid, that is, reduction of the amount of print improving liquid by thinning out from the dot-on-dot, types of the ink and printing medium used, printing method (number of buses/bidirectional/unidirectional) may be flexibly determined according to the desired image quality and printing speed. When the amount of the print improving liquid is increased, an increase in running cost and a degradation of print quality due to the occurrence of cockling are generated.

In general printing media, the application amount to the medium is 16 (nl) per square mm, and 20 (nl) at the maximum. If the level is exceeded, it will lead to head friction/image staining/head malfunction due to the occurrence of cockling of the printing medium, and various troubles may occur such as slow ink penetration, deteriorated fixing, back copying of image and smear.

In the head structure of the present embodiment, when making bi-directional printing, print is carried out as shown in FIG. 11A and FIG. 11B. In the Figure, for simple understanding of the Bk ink and print improving liquid, an example of 4 nozzle head structure is shown. The numeral 3101 indicates a picture element printed in the outward direction where the ink jet head moved from the left to the right, applied in the order of print improving liquid→ink to the printing medium. Further, the numeral 3102 indicates a picture element printed in the return direction from the right to the left, applied in the order of ink→print improving liquid. In the conventional printing method, the picture element 3101 and the picture element 3102 become bands at every nozzle width in 1-pass bidirectional printing, and an uneven density is conspicuous (FIG. 11A). On the other hand, in the present embodiment, the individual picture elements are arranged in zigzag or reverse zigzag, and the same area must be printed in more than 2 passes, so that while both are mixed microscopically, a macaroscopically uniform image can be formed (FIG. 11B).

(Description of the apparatus)

Figure 12A:
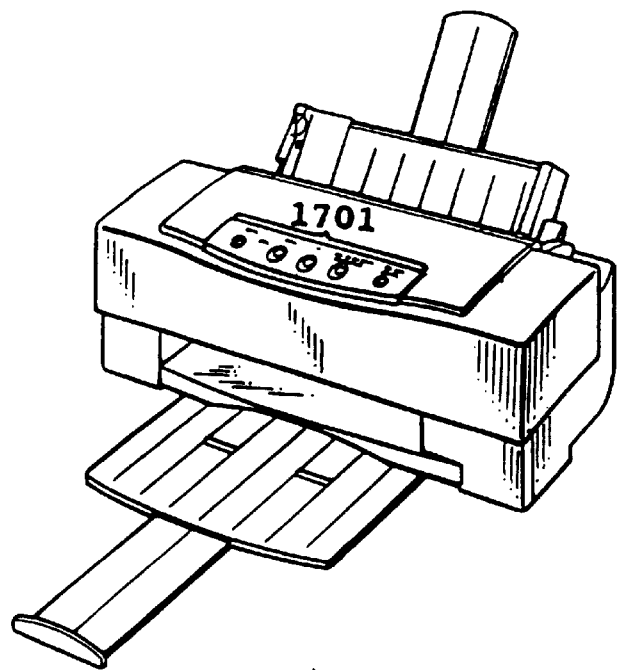
FIG. 12A is a schematic perspective view showing an example of color ink jet printing apparatus used in the embodiment 2.
Figure 12B:
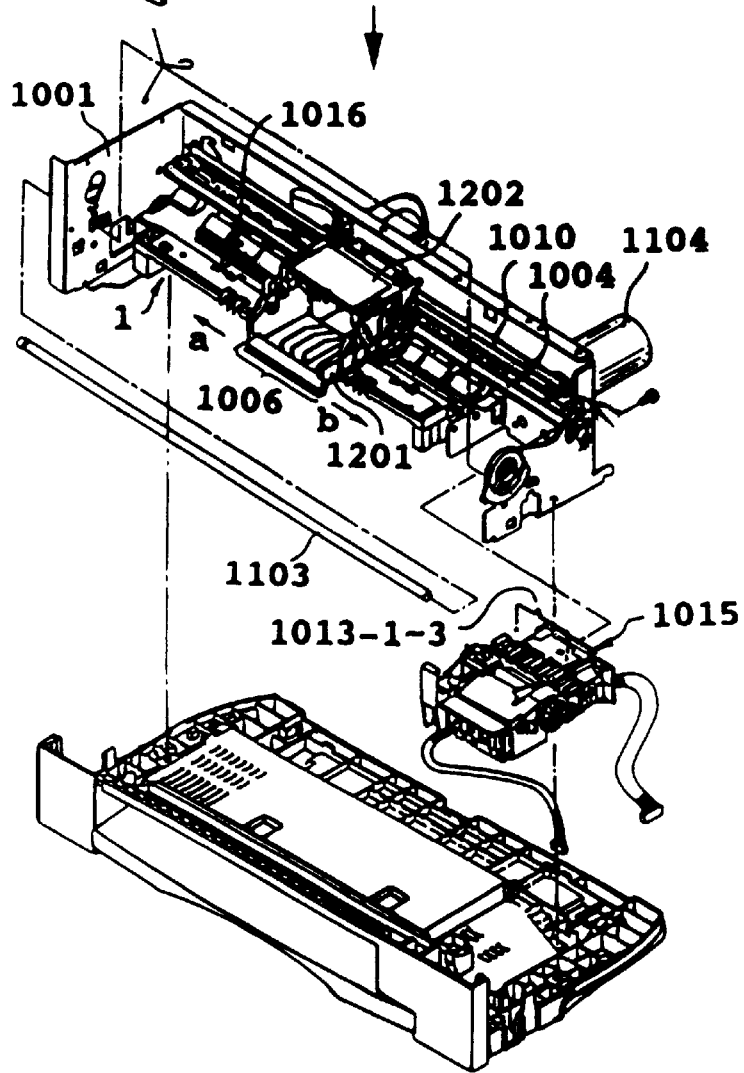
FIG. 12B is a schematic exploded perspective view showing an example of color ink jet printing apparatus used in the embodiment 2.
Figure 13:
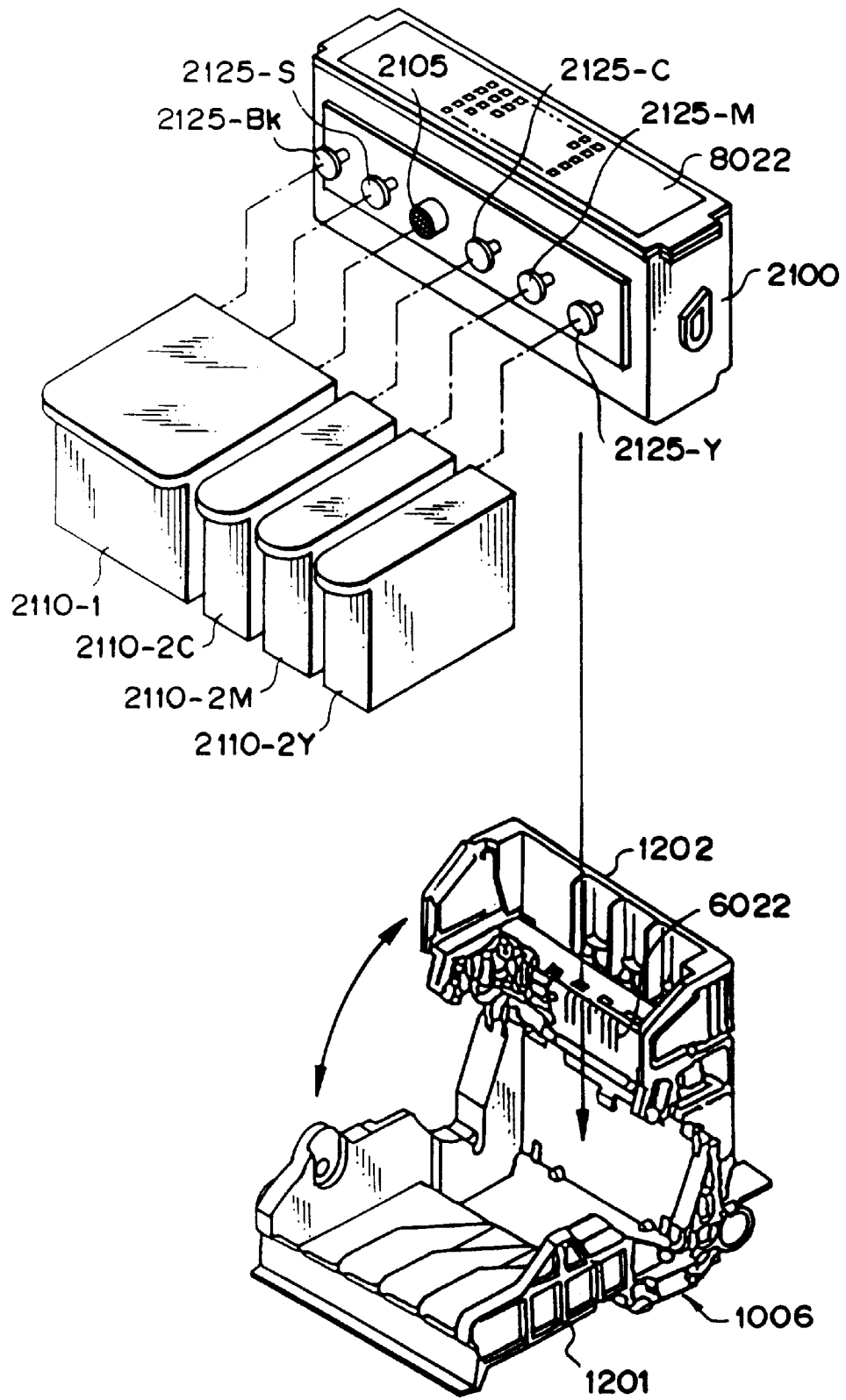
FIG. 13 is a schematic enlarged exploded perspective view showing a carriage portion of the color ink jet printing apparatus used in the embodiment 2.

The color ink jet printing apparatus equipped with a color ink jet head described above will be briefly described. FIG. 12A is a perspective view of the color ink jet printing apparatus. FIG. 12B is a perspective exploded view of the color ink jet printing apparatus. Further, FIG. 13 is an enlarged view in the vicinity of the carriage of the ink jet printing apparatus.

A carriage 1006 can be provided thereon with a print head unit 2100 and an ink tank group 2110-1 and 2110-2 for supplying inks to the print head 2100. The carriage 1006 mainly comprises a carriage base 1201 for putting thereon the print head unit 2100 and the ink tank group 2110, and a head lever 1202 for holding the print head unit 2100 placed thereon. A connector 8022 for receiving a signal or power for drive control of the print head is provided on the top surface of the print head unit 2100. When the print head unit 2100 is mounted on the carriage 1006, the connector 8022 is electrically connected with a connector 6022 provided at the carriage 1006 side. A guide shaft 1004 and a support shaft 1103 for slidably supporting the carriage 1006 are disposed on both side walls of a chassis 1001.

Driving force for reciprocally moving the carriage 1006 on both shafts in the main scanning direction is supplied form a carriage motor 1104 through a drive belt 1010. Further, holding and carrying of the medium to be printed such as paper or the like is made by a platen roller and pinch roller (not shown), and the medium to be printed is carried on a platen 1016. At this moment, the nozzle group of individual print chips 2101–2103 of the print head unit 2100 provided on the carriage 1006 are disposed so that the ink is discharged downward, and to oppose parallel to the medium to be printed on the platen 1016.

In the present embodiment, the recovery unit 1015 is disposed at the home position at the right side of FIG. 12. When the carriage 1006 is at the home position, the individual chips of the print head 2100 and suction/release caps (rubber) 1013-1-3 closely contact to be capped, normally individual suction caps 1013-1 for ink and 1013-2 for print improving liquid and a release cap 1013-3 prevent evaporation of ink in the nozzles of the print chips, an increase in viscosity, and occurrence of sticking, thereby preventing degradation of reliability due to discharge trouble. The print chip 2103 opposing the release cap is moved to the suction cap 1013-1, and then sucked.

Further, when replacing the ink tank or on discharge trouble, the suction caps 1013-1-3 and the print chips 2101–2103 are closely contacted to generate a negative pressure by a pump unit (not shown), and ink replacement or discharge recovery can be carried out by a suction recovery mechanism. Still further, ink and print improving liquid discharged from the pump are separately recovered into waste ink tanks.

Yet further, image signals are transmitted from the host (not shown) through I/F and the like, temporarily stored in the print buffer, developed to data according to the nozzles of the head and the print mode, sent to the head driver as drive signals, and discharged from the print head to form an image.

A control panel 8022 for controlling the print conditions is provided on the top surface of the apparatus.

(Embodiment 3)

Color head unit (Bk1+S+Bk2+CMY)

Head structure for print improving liquid sandwich condition (Head structure)

Figure 14:
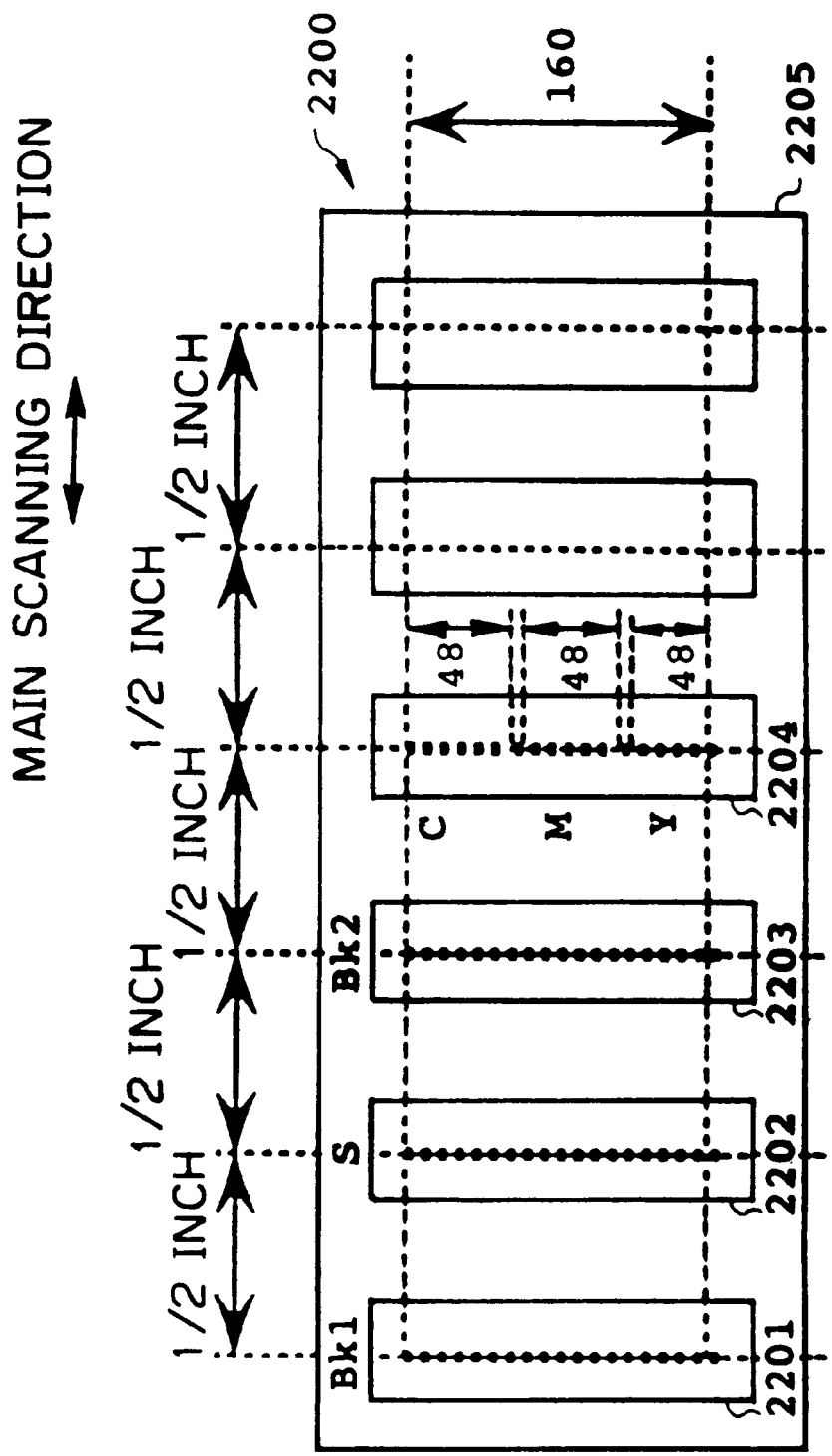
FIG. 14 is a schematic plan view showing a color print head unit used in an embodiment 3.

FIG. 14 shows a color head unit 2200 used in the present embodiment. The head unit comprises a Bk1 chip 2201 (discharge amount: Vd=40 (pl)), an S (print improving liquid) chip 2202 (discharge amount: Vd=40 (pl)), a Bk chip 2303 (discharge amount: Vd=40 (pl)), and a CMY integral chip 2204 (discharge amount: Vd=40 (pl)). The individual chips are inclined relative to a frame 2004 so that they can be corrected according to the drive timing, and the pitch between the individual chips is set to ½ inch. Among the individual chips, Bk1/S/Bk2 are the same as those in the embodiment 1, and CMY is the same as in the embodiment 2. However, the heater size and hole diameters are different. The discharge characteristics of Bk and CMY are shown below.

(Discharge characteristics of Bk1/Bk2/S)
Number of nozzles: 160 (number of divided blocks: 16 blocks)
Reliquid: 360 dpi
Drive frequency: 8.0 (kHz)
Discharge amount: Vd=40±4 (pl/dot)
Discharge speed: 12±0.5 (m/s)
(Drive condition)
Drive voltage: Vop=24.0 (V)
Drive pulse width: Pw=4.5 (µs)
Release time per block: Td=7.5 (µs)
(Discharge characteristics of CMY)
Number of nozzles: corresponding to 160 nozzles, 48 nozzles for each color (48×3)/sealing between colors 8 nozzles (8×2) (number of divided blocks: 16 blocks)
Reliquid: 360 dpi
Drive frequency: 8.0 (kHz)
Discharge amount: Vd=40±4 (pl/dot)
Discharge speed: 12±0.5 (m/s)
(Drive condition)
Drive voltage: Vop=24.0 (V)
Drive pulse width: Pw=4.5 (µs)
Release time per block: Td=7.5 (µs)

Figure 15:
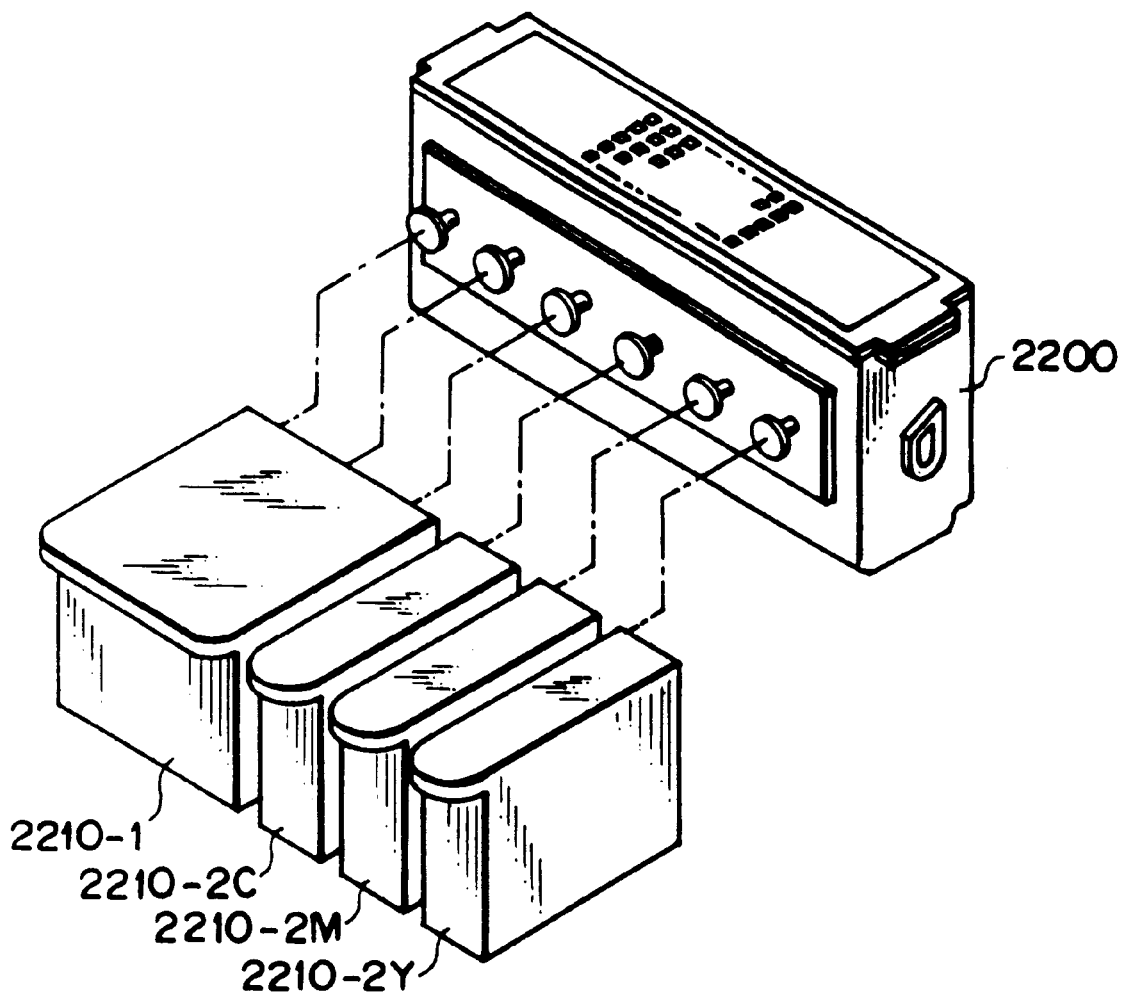
FIG. 15 is a schematic exploded perspective view showing the color print head unit used in the embodiment 3.

FIG. 15 is a perspective view of a color ink jet cartridge comprising the head unit and tank. The head unit 2200, a tank 2210-1(the same as the tank in the embodiment 1), and color ink tanks 2100-2C, 2M, 2Y are detachably structured. When an ink is exhausted, a remaining ink detection mechanism (not shown) prompts the user to replace it through the main unit for each color. The head chips 2201 and 2202 are the same as those described in the embodiment 1 in FIG. 3. The head chip 2203 is the same as described in embodiment 2 in FIG. 8. The tank 2210-1 (for Bk+S) is the same as described in the embodiments 1, 2 and detailed description thereof is omitted. Further, the tanks 2210-2C, 2M, 2Y are the same as those in the embodiment 2, and detailed description thereof is omitted.

<Print mode>

1) Bk print

As the printing method of the present embodiment, when discharge amounts of the Bk chips 2201 and 2203 are both set to 40 pl, an image is formed in the order of Bk1 ink (40 pl)→print improving liquid S (40 pl)→Bk ink (40 pl). At this moment, the total amount of Bk ink applied to the picture element is 80 pl, unchanged from the above described printing. This increases the reaction area (contact area is approximately doubled) of the ink and the print improving liquid to obtain a stable effect of the print improving liquid, without changing the total application amount of the ink and print improving liquid, and the application order of the ink and print improving liquid is unchanged between the outward direction and return direction. Therefore, the above-described uneven density due to a difference in application order does not occur even when bidirectional printing is made at a high speed. As a practical printing method, a print mode is added in which the discharge amount of the Bk print mode of embodiment 1 is decreased to a half so that the print improving liquid is always sandwiched between the Bk ink.

2) Color print

Color print is the same as embodiment 2, and detailed description thereof is omitted.

(Description of the apparatus)

Since the printing apparatus is the same as in the embodiment 2, description thereof is omitted. However, the head chip Bk2 is provided as an extra, signal/control line (not shown) for the chip is included. In this case, the contact surface of the apparatus is commonly used.

(Embodiment 4)

Color head unit (Bk+S (½) shifted+C+M+Y)

Only the print improving liquid is shifted by a half pitch to increase the contact area and decrease the consumption of the print improving liquid.

<Head structure>

Figure 16:
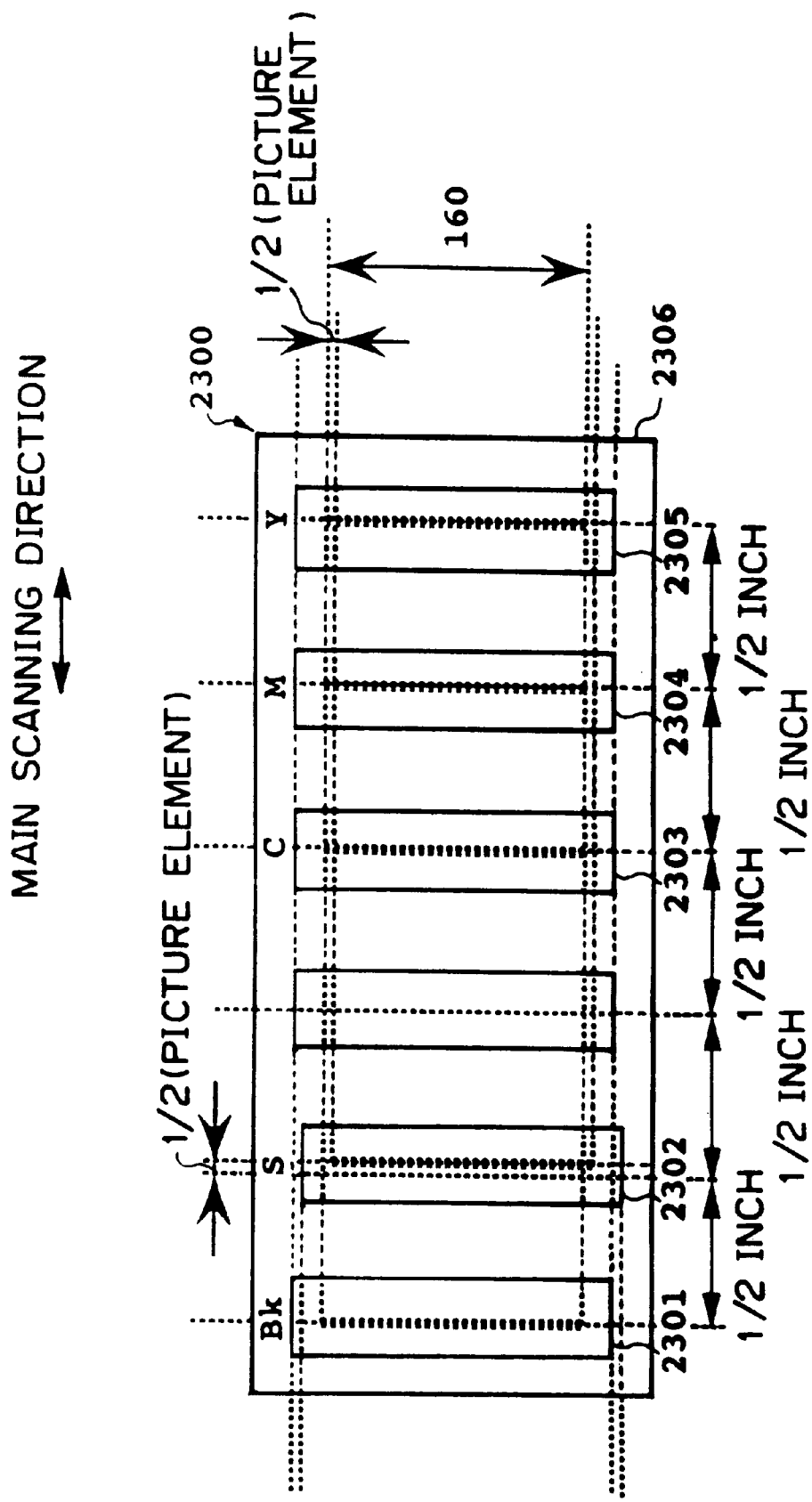
FIG. 16 is a schematic plan view showing a color print head unit used in an embodiment 4.

FIG. 16 shows the structure of a color head unit 2300 used in the present embodiment. The head unit comprises a Bk chip 2301, a print improving liquid S chip 2302, a C chip 2303, an M chip 2304, and a Y chip 2305. The individual chips are inclined relative to a frame 2104 so that they can be corrected for the drive timing, and the pitch between the individual chips is set to ½ inch. However, in this case, only the pitch between the chip S2102 and C 2303 is set to 1 inch for common use of the ink tank 2010 used in the embodiment 1.

Further, the Bk chip 2301 and the print improving liquid chip 2302 are disposed shifted by an odd number times of ½ picture element (about 35 ($\mu$m) at 360 dpi in (x, y) directions on the unit. In the head unit described in the present embodiment, the basic spacing of the individual heads in the x direction (main scanning direction of head) is ½ inch (width of 180 picture elements at 360 dpi), and with respect to this, only the S chip is disposed shifted by ½ picture element. That is, the Bk1 chip and the S chip are disposed shifted by 180.5 picture elements in the x direction, and 0.5 picture element in the y direction (sub-scanning direction of head). Hereinafter this head chip arrangement is conventionally referred to as [half picture element shift], or [½ picture element shift]. The effect of the shift will be described later, the contact area of the Bk ink and CMY ink is increased, by shifting the application position of the print improving liquid by a half picture element in (x, y) directions in the image design to increase an apparent AF (area factor). This generates the reaction by applying a required minimum amount of the print improving liquid to reduce the total consumption of the print improving liquid.

The Bk chip is the same as in the embodiment 1 (80 (pl)), and other S/C/M/Y chips are the same as those in the embodiment 2 (40 (pl)). The discharge characteristics of the individual chips are as shown below.

(Discharge characteristics of Bk)

Number of nozzles: 160 (number of divided blocks: 16 blocks)

Reliquid: 360 dpi

Drive frequency: 10.0 (kHz)

Discharge amount: Vd=80±8 (pl/dot)

Discharge speed: 15±0.5 (m/s)

(Drive condition)

Drive voltage: Vop=24.0 (V)

Drive pulse width: Pw=5.5 ($\mu$s)

Release time per block: Td=6.0 ($\mu$s)

(Discharge characteristics of CMY)

Number of nozzles: corresponding to 160 nozzles, 160 nozzles for each color (number of divided blocks: 16 blocks)

Reliquid: 360 dpi

Drive frequency: 10.0 (kHz)

Discharge amount: Vd=40±4 (pl/dot)

Discharge speed: 12±0.5 (m/s)

(Drive condition)

Drive voltage: Vop=24.0 (V)

Drive pulse width: Pw=4.5 ($\mu$s)

Release time per block: Td=6.0 ($\mu$s)

Figure 17:
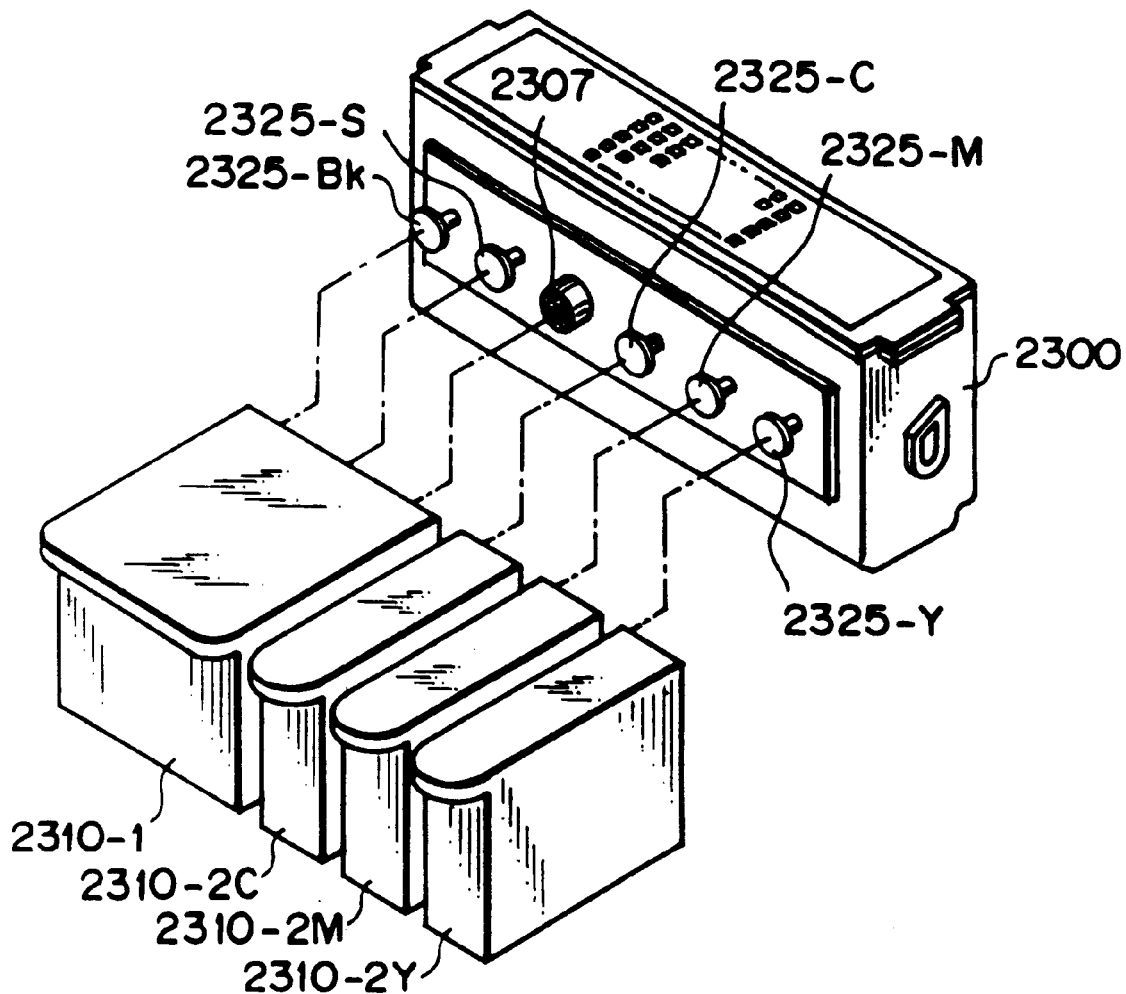
FIG. 17 is a schematic perspective view showing the color print head unit used in the embodiment 4.

FIG. 17 is a perspective view of a color ink jet cartridge comprising the head unit and tank. The head unit 2300, a tank 2310-1(the same as the tank in the embodiment 1), and color ink tanks 2100-2C, 2M, 2Y (the same as those in the embodiment 2) are detachably structured. When an ink is exhausted, a remaining ink detection mechanism (not shown) prompts the user to replace it through the main unit for each color. The head chips 2301 and 2302 are the same as those described in the embodiment 1 as shown in FIG. 3. The head chips 2303, 2304, and 2305 are made possible to print three color inks (C, M, Y) by color chips. In this case, only the head chip 2302 is disposed shifted by a half picture element of 360 dpi in (x, y) directions when mounting on a frame 2306 of the head unit 2300.

The tank 2110-1 (for Bk+S) is the same as in the embodiment 1 and detailed description thereof is omitted. However, because there are three ink supply ports for two chips, the right side Bk2 ink supply port remains as an extra, from which ink leakage or vapor tends to generate. To prevent this, the head unit 2300 is provided with a cover 2307 for closing the hole. The tanks 2310-2C, 2M, 2Y are divided into a plurality of chambers; one is a chamber (including a buffer chamber) for incorporating the sponge, and another is a chamber for incorporating the raw ink. One color uses a tank 2310-2. To supply each ink, the sponge portion of the tank 2310 is contacted close to the filters 2325-Bk, 2124-C, M, Y of the head 2300, and sucked sequentially or simultaneously by the main unit recovery means (not shown).

<Print mode>

Bk/color print mode

The printing method with the head of the present embodiment will be described. The ink types used in the present embodiment are the same as those used in the embodiment 2. In the head structure of the present embodiment, the individual chips are controlled for printing at the same drive timing so that the print improving liquid is applied always shifted by a half picture element in the (x, y) directions between the Bk ink and the color ink without increasing the load of the head drive control in the printer main unit. Therefore, since the contact area with the individual colored ink is increased at the boundary, occurrence of bleeding or white fogging can be prevented while reducing the consumption of the print improving liquid. Further, a printing method for eliminating an uneven density by a change in hue ((Blue) C→M/M→C, (Green) C→Y/Y→C, (Red) M→Y/Y→M) due to a difference in application order of colors, or an uneven density (S→C/C→S, S→C→M/M→C→S or the like) due to a difference in application order of the print improving liquid during color printing will be described.

As an example, in addition to an uneven density due to a difference in application order or application time of the print improving liquid and colored inks during the above-described bidirectional printing, an uneven color due to a difference in application order of color inks will be described.

Figure 18A:
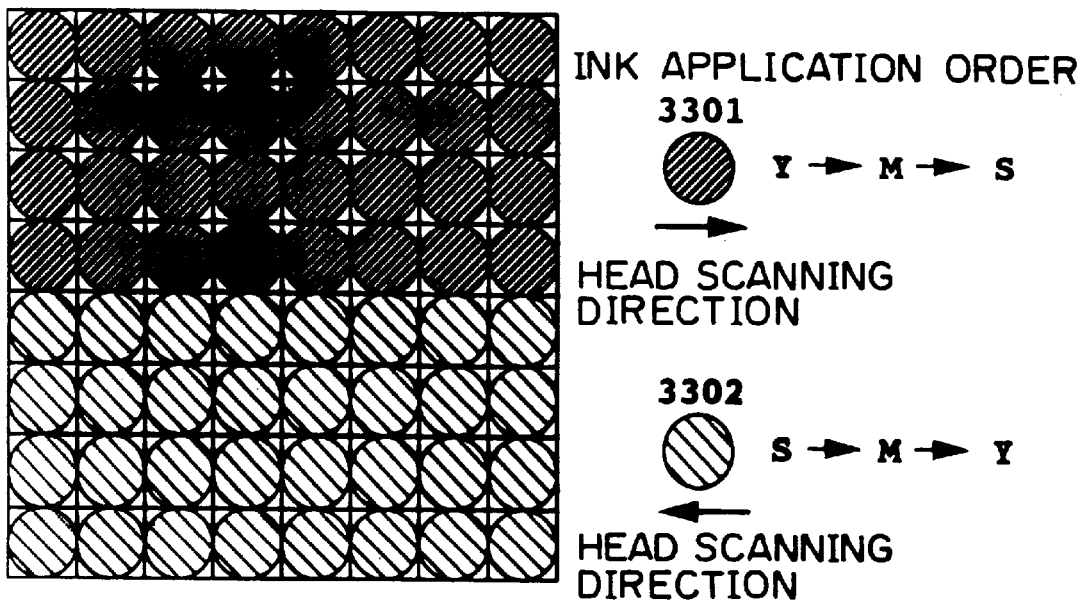
FIG. 18A and FIG. 18B are schematic views comparing bidirectional printing made using the print head of the embodiment 4 with a conventional one.
Figure 18B:
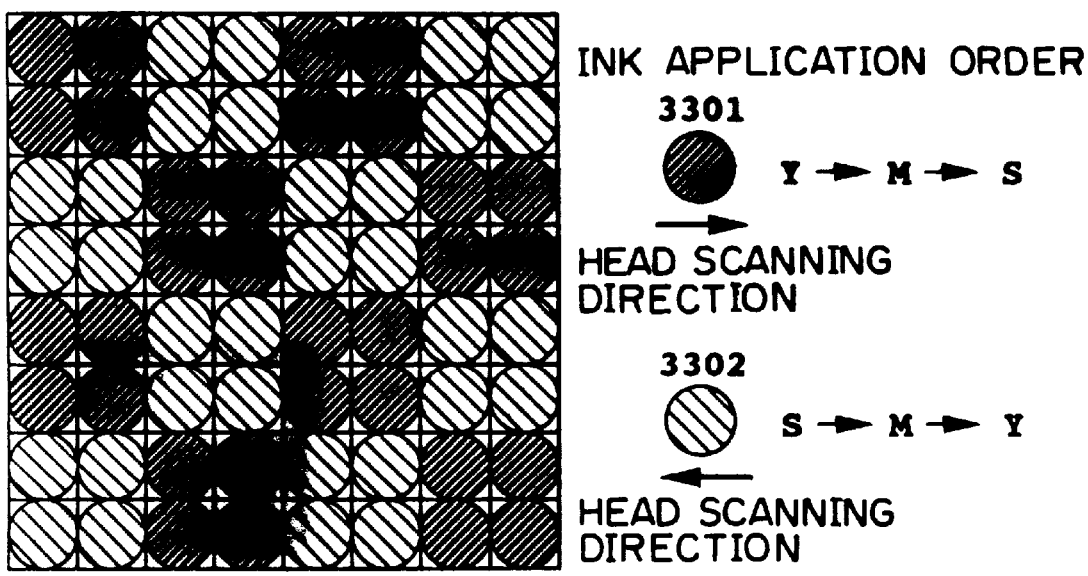

FIG. 18A and FIG. 18B show an example of bidirectional printing in the present embodiment compared with a prior art example. In FIG. 18A and FIG. 18B, for simple understanding of printing the magenta ink, yellow ink, and the print improving liquid when forming a red color, the procedure will be shown with reference to a 4-nozzle head structure. The numeral 3301 indicates a picture element which is printed in the outward direction printing when the head unit moves from the left to the right, applied in the order of Y ink→M ink→print improving liquid on the printing medium. Further, the numeral 3302 indicates a picture element which is printed in the return direction printing when the head unit moves from the right to the left, applied in the order of print improving liquid→M ink→Y ink. In the conventional printing method, as shown in FIG. 18A, the picture element 3301 and the picture element 3302 form bands at an interval of nozzle width with remarkable uneven density in 1-pass bidirectional printing. On the other hand, in the present embodiment, as shown in FIG. 18B, the colored inks are printed in zigzag or reverse zigzag so that the individual picture elements are formed as a group of 2×2. Formation of 2×2 picture elements as a group is a means for preventing a regular bank-like uneven color due to a difference in application order of inks generating in bidirectional printing when an overall print of a neutral tint is made.

Further, the print improving liquid head, as described above, is disposed shifted by a half picture element relative to each of the colored ink head in the (x, y) directions. Therefore, when printing the print improving liquid at the boundary, even printing of only one picture element of the print improving liquid at the boundary is found to have the same effect as described in the embodiment 2. That is, since the print improving liquid is applied at the boundary shifted by a half picture element in the vertical and longitudinal directions, the apparent contact area is increased, bleeding and white fogging generating at the boundary of Bk and color ink can be prevented even when the amount of the print improving liquid is reduced (corresponding to 1 picture element line).

Still further, as in the embodiment 2, similarly to the case where those of the reverse application order of colors are microscopically mixed as picture elements of about (2×2), those of the reverse application order of the print improving liquid and the colored ink can be printed to form macroscopically an even image by microscopically mixing as picture elements of about (2×2).

In the present embodiment, only the print improving liquid is disposed on the head unit shifted by a half picture element of the reliquid in the main/sub-scanning directions to obtain the above effect, however, it is needless to say that, as to the main scanning direction, the electrical discharge timing may be shifted by a half picture element, and as to the sub-scanning direction, paper may be fed by a half picture element to obtain the same effect.

Yet further, it is also possible to increase even further the consumption reduction effect of print improving liquid and image quality improving effect by combining the half picture element shift of the print improving liquid with the thinning/emphasis treatment.

(Embodiment 5)

Color head unit 4 (Bk1+S+Bk2+C+M+Y)

This embodiment considers combination with the printing method of the print improving liquid.

<Head structure>

Figure 19:
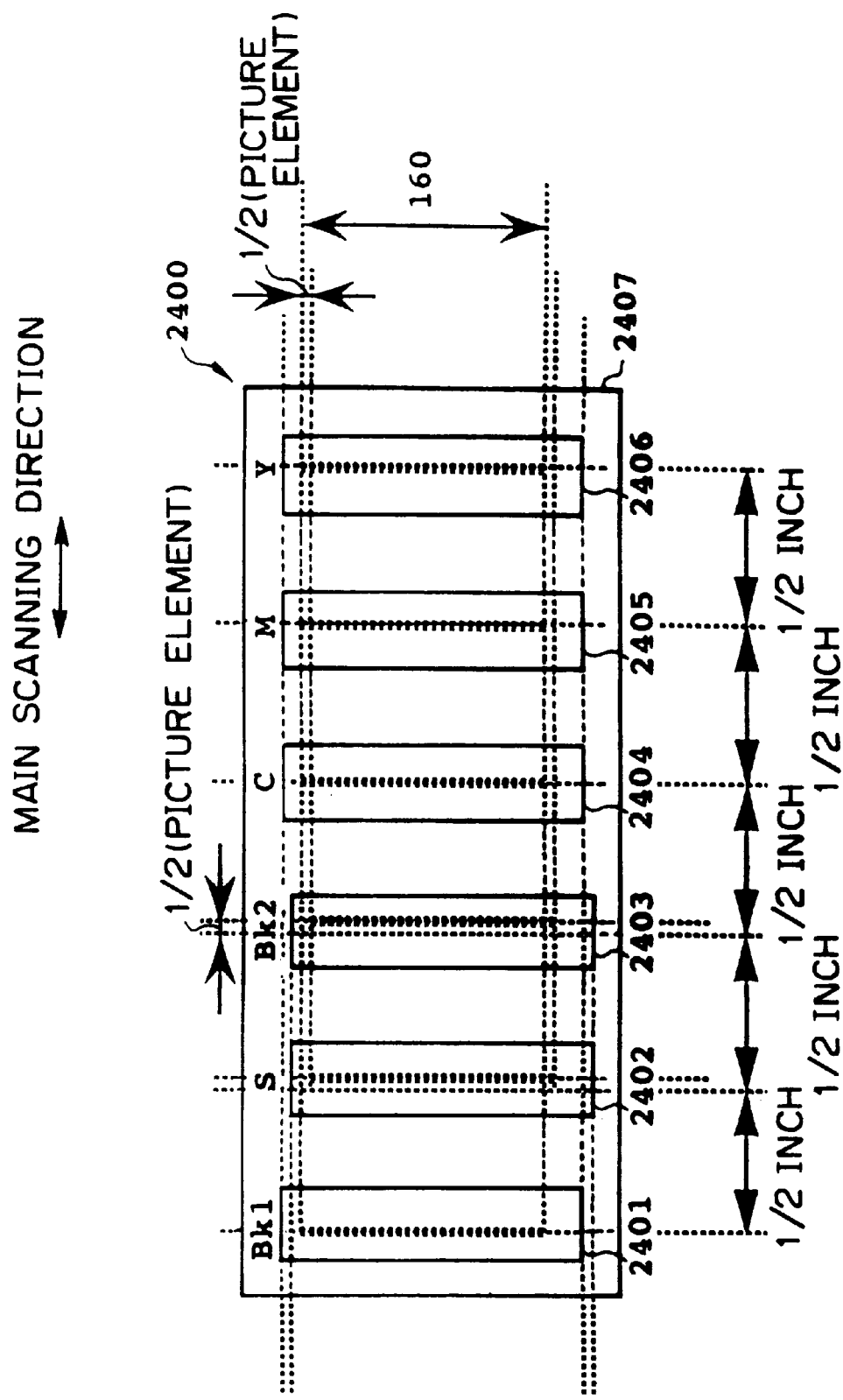
FIG. 19 is a schematic plan view showing a color print head unit used in an embodiment 5.

FIG. 19 shows the structure of a color head unit 2400 used in the present embodiment. The unit comprises a Bk chip 2401, a print improving liquid S chip 2402, a Bk2 chip 2403, a C chip 2404, an M chip 2405, and a Y chip 2406. The individual chips are inclined relative to a frame 2307 so that they can be corrected for the drive timing, and the pitch between the individual chips is set to ½ inch. In this case, the Bk2 chip is disposed shifted by an odd number times of half picture element (about 35 $\mu$m) of 360 dpi relative to the Bk1 chip and other chips in the X, Y directions. In the head unit described in the present embodiment, the basic spacing of the individual chips in the x direction, which is the main scanning direction of the head, is ½ inch, that is, 180 picture element width of 360 dpi. In other words, the Bk1 chip relative to the Bk2 chip is disposed shifted by 360.5 picture element in the x direction and 0.5 picture element in the y direction. This is to achieve 720 dpi printing by 1 pass since the Bk1 and Bk2 are shifted by a half picture element.

Figure 20A:
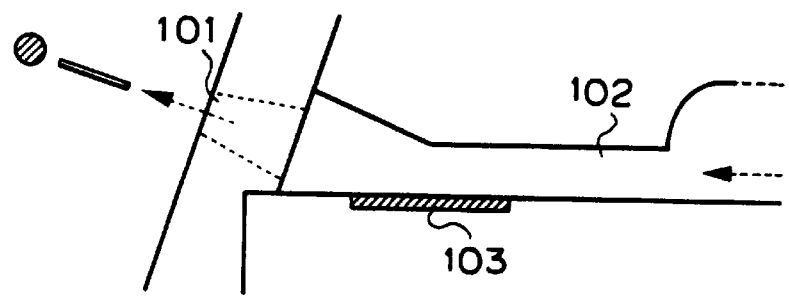
FIG. 20A is a schematic view showing the structure of the print head of the embodiment 5.
Figure 20B:
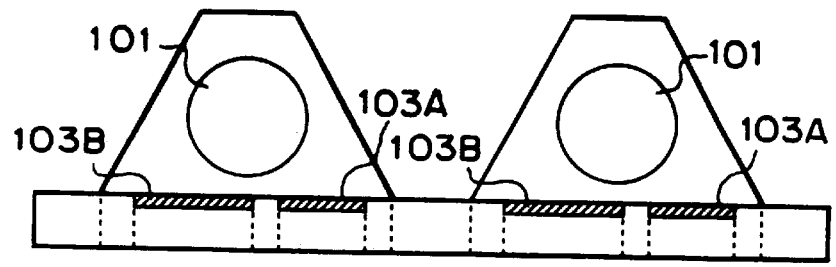
FIG. 20B is a schematic view showing the structure of the print head of the embodiment 5.
Figure 20C:
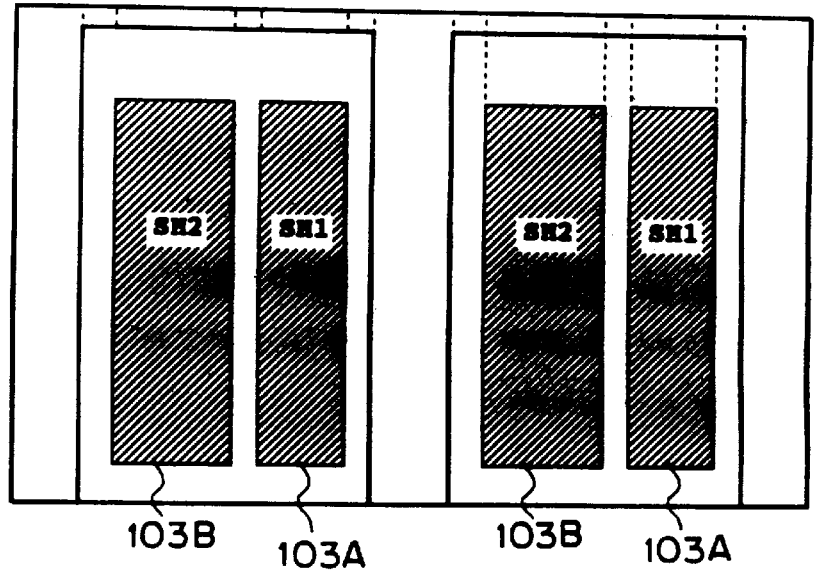
FIG. 20C is a schematic view showing the structure of the print head of the embodiment 5.

Further, to form an optimum image of 360/720 dpi at a high speed, two heaters are disposed in parallel in 1 nozzle, and the individual heaters are independently driven, so that Bk1/Bk2 can discharge three kinds of discharge amounts of 70/45/25 (pl) by a single chip, and S/C/M/Y can discharge three kinds of 40/25/15 (pl) by a single chip. The nozzle structure and the heater structure are as shown in FIG. 20A to FIG. 20C. That is, two types of heaters, large and small, 103A and 103B are provided in juxtaposition in a liquid passage 102 communicating with the individual nozzles 101.

Figure 21:
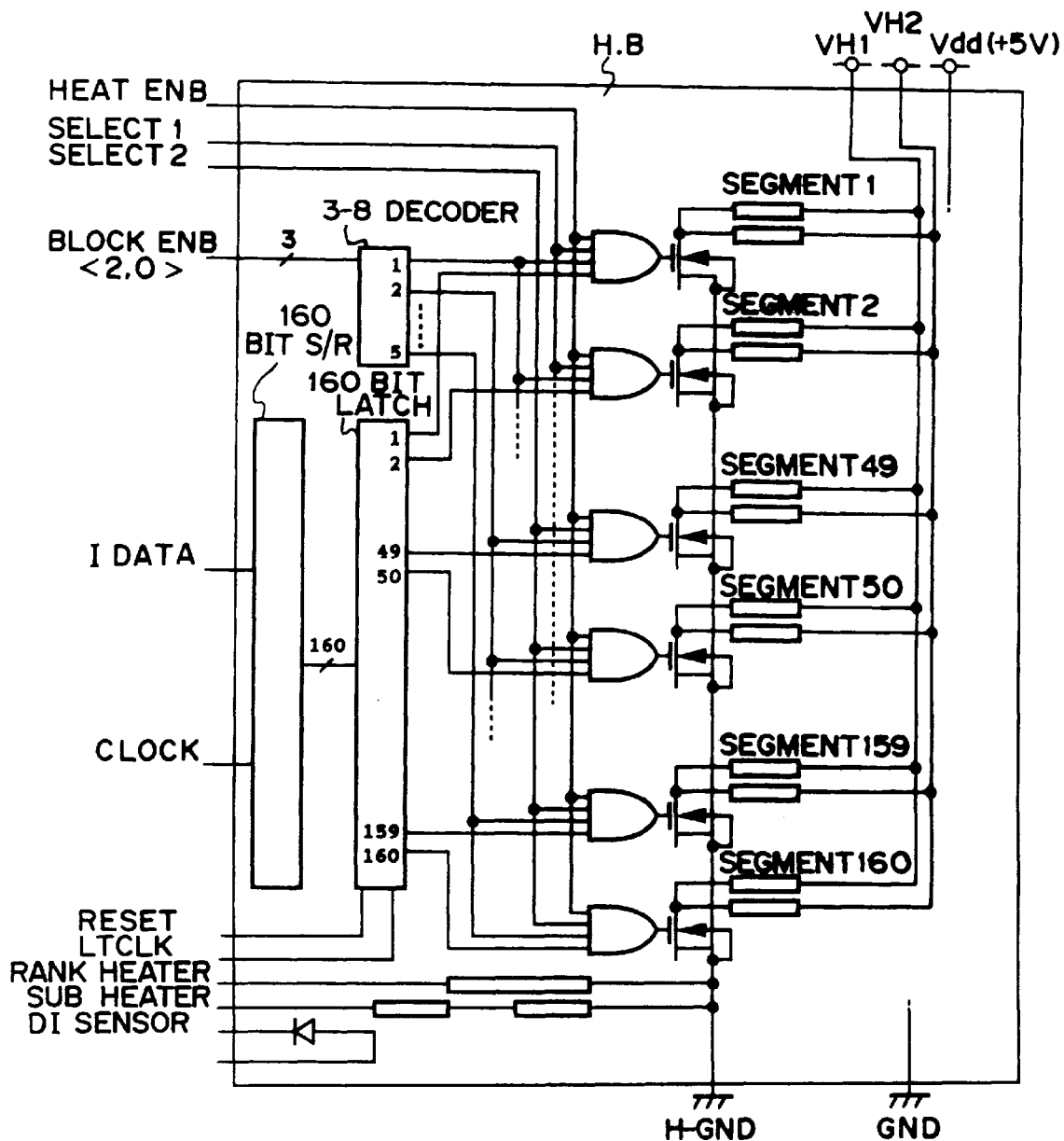
FIG. 21 is a schematic view showing control of HB of the print head of the embodiment 5.
Figure 22:
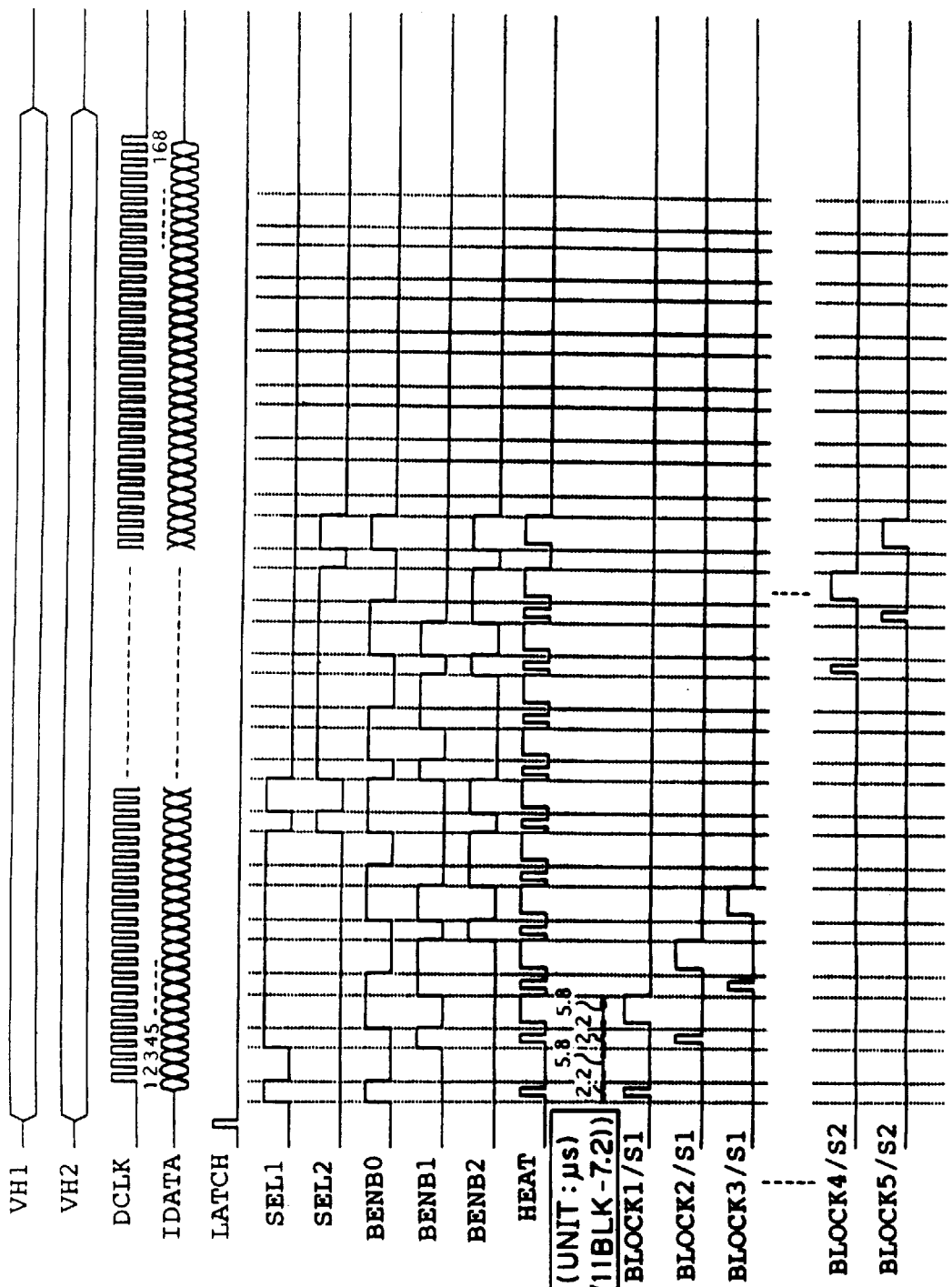
FIG. 22 is a schematic view showing an example of control signal of the print head of the embodiment 5.

In driving the individual heaters 103A and 103B, selection of high/medium/low discharge amounts is possible by transmitting signal waveforms shown in FIG. 22 to the individual signal lines of the heater boards H, B shown in FIG. 21. Specifically, block is selected by Block-Enable 0-2, and the large or small heater is selected by Heat-Enable 1-2. The actual drive pulse waveform is given by Heat-data.

Discharge principle of large/small dots in the present embodiment has no direct relation to the present invention, and detailed description thereof is omitted. Discharge of large/small dots may be achieved by other means such as pulse width modulation. In the present invention, relationship between large/small colored ink dots and large/small print improving liquid dots will be described in detail.

The discharge characteristics of the individual chips are as shown below.

(Discharge characteristics of Bk1/Bk2)

Number of nozzles: 160 (number of divided blocks: 16 blocks)

Reliquid: for both 360/720 (interlace 2-pass printing) dpi

Drive frequency: 10.0 (kHz)

Discharge amount: Vd=70±4/45±2.5/25±1.5 (pl/dot)

Discharge speed: v=16±0.5/13±0.5/10±0.5 (m/s)

(Drive condition)

Drive voltage: Vop=24.0 (V)

Drive pulse width: Pw=5.5 ($\mu$s)

Release time per block: Td=6.0 ($\mu$s)

(Discharge characteristics of S/C/M/Y)

Number of nozzles: 160 nozzles, (number of divided blocks: 16 blocks)

Reliquid: for both 360/720 (interlace 2-pass printing) dpi

Drive frequency: 10.0 (kHz)

Discharge amount: Vd=40±4/25±2.5/15±1.5 (pl/dot)

Discharge speed: v=14±0.5/10±0.5/8±0.5 (m/s)

(Drive condition)

Drive voltage: Vop=24.0 (V)

Drive pulse width: Pw=4.0 ($\mu$s)

Release time per block: Td=6.0 ($\mu$s)

Figure 23:
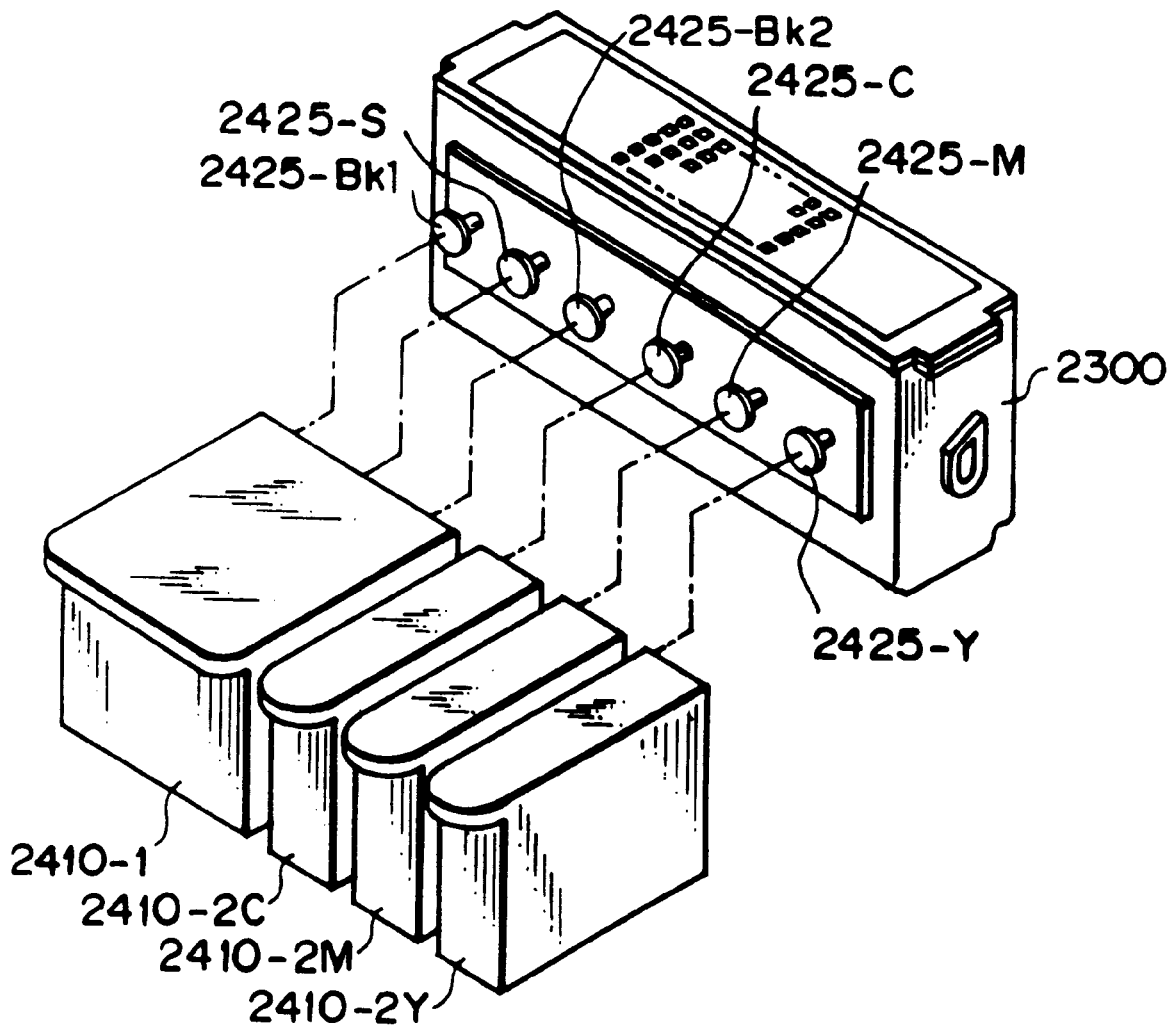
FIG. 23 is a schematic perspective view of a color print head used in the embodiment 5.

FIG. 23 is a perspective view of a color ink jet cartridge comprising the head unit and tank. The head unit 2400, a tank 2410-1(the same as the tank in the embodiment 1), and color ink tanks 2410-2C, 2M, 2Y are detachably structured. When an ink is exhausted, a remaining ink detection mechanism (not shown) prompts the user to replace it through the main unit for each color. The head chips 2401 and 2403 are the same as the Bk chip 2101 described in the embodiment 1 as shown FIG. 3 except for the heater board. The head chips 2402, 2404 to 2406, as shown in FIG. 3, are the same as the S chip 2102 described in embodiment 1 except for the heater board.

The tank 2410-1 (for Bk1+S+Bk2) is the same as described in the embodiment 1, and detailed description thereof is omitted. Further, the tanks 2410-1, 2C, 2M, 2Y are the same as those in the embodiment 2, and detailed description thereof is omitted. To supply each ink, the sponge portion of the tanks 2410-1, 2C, 2M, 2Y is contacted close to the filters 2425-Bk1, S, Bk2, C, M, Y of the head 2400, and sucked sequentially or simultaneously by the main unit recovery means (not shown).

<Print mode>

Figure 24:
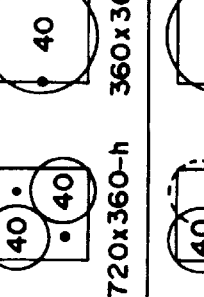
FIG. 24 is a schematic view showing an example of color printing method of the embodiment 5.

The print mode in the present embodiment and an example of actual print dot image are shown in FIG. 24 and FIG. 25.

1) Bk mode
   1. Fast mode: 1-pass bidirectional 360×360 dpi (with/without print improving liquid)
   2. Normal mode: 2-pass bidirectional 720×720 dpi (diagonal)/45 pl (with/without print improving liquid)
   3. High quality mode: 4-pass unidirectional 720×720 dpi (full address)/25 pl (with/without print improving liquid).

2) Color mode
   1. Fast mode: 1-pass bidirectional 360×360 dpi/40 pl (with/without print improving liquid)
   2. Normal mode: 2-pass bidirectional 720×720 dpi (diagonal)/25 pl (with/without print improving liquid)
   3. High quality mode: 4-pass unidirectional 720×720 dpi (full address)/15 pl (with/without print improving liquid).

In the present embodiment, first, (1) for using the print improving liquid in Bk printing, when the print improving liquid dot diameter is smaller than the Bk dot diameter, and (2) when the print improving liquid dot diameter is larger than the Bk dot diameter will be described.

(1) When the print improving liquid dot diameter is smaller than the Bk dot diameter In this case, when printing the print improving liquid in a Bk overall printed portion, normally the Bk ink and an equivalent amount of the print improving liquid are applied in dot-on-dot, and thinning of the print improving liquid is made as necessary. However, in the present embodiment, to reduce the time required for thinning and cost for the hardware processing, instead of printing the print improving liquid and the Bk ink at the same position in dot-on-dot, the discharge amount of the print improving liquid is decreased to be smaller than the Bk ink to obtain the same effect of thinning. This improves the printing speed (processing speed) and reduces the consumption of the print improving liquid to reduce the running cost and the application amount of the ink, thereby achieving cost reduction and stabilization of the image quality.

(2) When the print improving liquid dot diameter is larger than the Bk dot diameter In this case, when printing the print improving liquid at the Bk boundary, normally the print improving liquid in equivalent amount to the Bk ink is applied in dot-on-dot, and the print width of the print improving liquid at the boundary is increased as necessary, in particular, for reducing feathering and improving the line density of letters on plain paper and improving the sharpness. However, in the present embodiment, to reduce the time required for boundary processing and cost for hardware processing, the print improving liquid is also printed at the same position of the Bk ink in dot-on-dot to increase the discharge amount of the print improving liquid to more than the Bk ink, thereby obtaining the same effect as the boundary processing (print width increasing processing). This improves the printing speed (processing speed) and reduces the consumption of the print improving liquid to reduce the running cost and partial application amount of the ink, thereby achieving cost reduction and stabilization of the image quality.

The above described is just an example, and it is needless to say that the printing method of Bk can be improved by another method to reduce the discharge amount of the print improving liquid.

Further, in the present embodiment, (1) in using the print improving liquid in color printing, when the discharge amount of the print improving liquid is varied between the boundary and other positions, and (2) as a printing method to reduce a difference in hue due to the application order of ink, a case where the discharge amount of the print improving liquid is varied according to the application order of ink, will be described.

(1) Processing of color boundary and other images

In this case, when printing the print improving liquid at the boundary of Bk and color ink and the individual colored ink portions, normally the print improving liquid in an equivalent amount to the Bk/color ink is printed at the boundary in dot-on-dot, while thinning is made in other colored ink portions. In particular, to reduce bleeding or white fogging between Bk and color in a graph on plain paper, the printing width of the print improving liquid at the boundary is increased, or thinning is made to reduce the consumption in other portions. However, in the present embodiment, to reduce the time required to boundary processing and the cost for hardware processing and reduce the consumption of the print improving liquid, the discharge amount of he print improving liquid is increased at the boundary portion of the Bk ink and the color ink, and reduced in other portions. Therefore, printing is only made at the same position in dot-on-dot to increase the discharge amount of the print improving liquid to more than colored inks to obtain the thinning effect in other portions while obtaining the same effect as the boundary processing (print width increase processing). This improves the printing speed (processing speed) and reduces the consumption of the print improving liquid to reduce the running cost and partial application amount of the ink, thereby achieving cost reduction and stabilization of the image quality.

(2) Measure for hue variation due to application order of inks

This is for a case where the print improving liquid is printed according to the application order of color inks, normally when bidirectional printing is made to form a secondary color, there occur uneven density (uneven color) due to hue variation in color ((Blue) C→M/M→C, (Green) C→Y/Y→C, (Red) M→Y/Y→M) caused by reversed application order, and uneven density due to application order of the print improving liquid in color printing (S→C/C→S, S→C→M/M→C→S and the like). This occurs because the print improving liquid in an equivalent amount to the colored ink is applied in dot-on-dot. In particular, in 1-pass high-speed color printing on plain paper, to reduce the time required for mask processing and cost for hardware processing when printing in a plurality of passes by the above-described mask pattern of 7-color print such as graphs, the discharge amount of the print improving liquid for an ink color to be emphasized, and the discharge amount of the print improving liquid is decreased when not to be emphasized. Therefore, even if the application order is reversed in bidirectional printing in the same position, only by changing the discharge amount of the print improving liquid when printing in dot-on-dot, the same effect as the mask processing of the print improving liquid and the application order, thereby reducing the consumption of the print improving liquid. This improves the printing speed (processing speed) and reduces the consumption of the print improving liquid to reduce the running cost and partial application amount of the ink, thereby achieving cost reduction and stabilization of the image quality.

As described in the present embodiment, it has been found that by varying the discharge amount of the print improving liquid as necessary, the effect of the print improving liquid can be increased, and an effect which could not be obtained in the past can be obtained. Here, as described above, an example of printing condition when changing the discharge amount at the boundary or shifting the application position is shown in FIGS. 10B to FIG. 10D. FIG. 10C shows a case where the application position of the print improving liquid is shifted at the boundary, and FIG. 10D shows a case where the reliquid of the print improving liquid at the boundary is improved and the application position is shifted.

(Embodiment 6)

Color head unit 6 (2 units of Bk1+S+Bk2, and C+M+Y)

Figure 26:
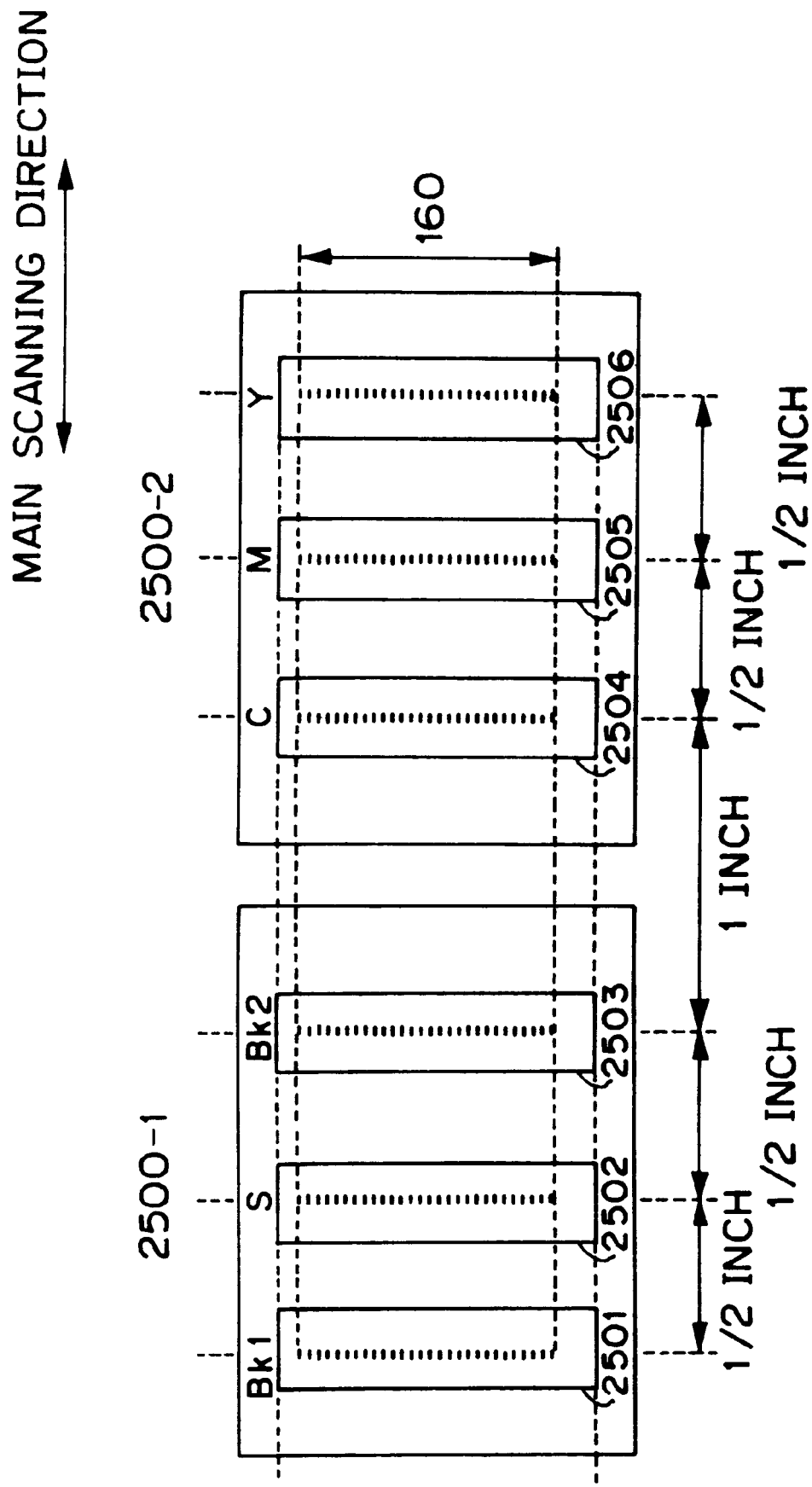
FIG. 26 is a schematic plan view showing the color print head used in the embodiment 5.

Reduction of discharge amount of print improving liquid (thinning effect of simple high-speed processing) and sandwich effect FIG. 26 shows the structure of a 2-unit system of color head units 2500-1 and 2500-2 used in the present embodiment. The unit comprises a unit integrating a Bk1 chip 25001 (discharge amount: Vd=40 pl), a print improving liquid chip 25002 (discharge amount: Vd=20 pl), and a Bk2 chip 2503 (discharge amount: Vd=40 pl), a C chip 2504, an M chip 2505, and a Y chip 2506. The individual chips are inclined by the drive timing, and the pitch between the individual chips is set to ½ inch, and the pitch between units is set to 1 inch. The Bk1/Bk2 chips are the same as those used in the embodiment 1, and the CMY chip is the same as used in the embodiment 2. However, the heater size and hole diameters are different. S has a half of the discharge amount of Bk1/Bk2. The discharge characteristics of Bk1/Bk2/S and C/M/Y are shown below.

(Discharge characteristics of Bk1/Bk2)

Number of nozzles: 160 (number of divided blocks: 16 blocks)

Reliquid: 360 dpi

Drive frequency: 8.0 kHz

Discharge amount: Vd=40±4 pl/dot

Discharge speed: 12±0.5 m/s (Drive condition)

Drive voltage: Vop=24.0 V

Drive pulse width: Pw=4.5 μs (Discharge characteristics of S)

Number of nozzles: 160 nozzles (number of divided blocks: 16 blocks)

Reliquid: 360 dpi

Drive frequency: 8.0 kHz

Discharge amount: Vd=20±2 pl/dot

Discharge speed: 12±0.5 m/s (Drive condition)

Drive voltage: Vop=24.0 V

Drive pulse width: Pw=3.5 μs

Release time per block: Tb=7.5 μs (Discharge characteristics of CMY)

Number of nozzles: corresponding to 160 nozzles, 48 nozzles for each color (48×3)/sealing between colors 8 nozzles (8×2) (number of divided blocks: 16 blocks)

Reliquid: 360 dpi

Drive frequency: 8.0 kHz

Discharge amount: Vd=20±2 pl/dot

Discharge speed: 12±0.5 m/s (Drive condition)

Drive voltage: Vop=24.0 V

Drive pulse width: Pw=4.5 μs

Release time per block: Tb=7.5 μs

Figure 27:
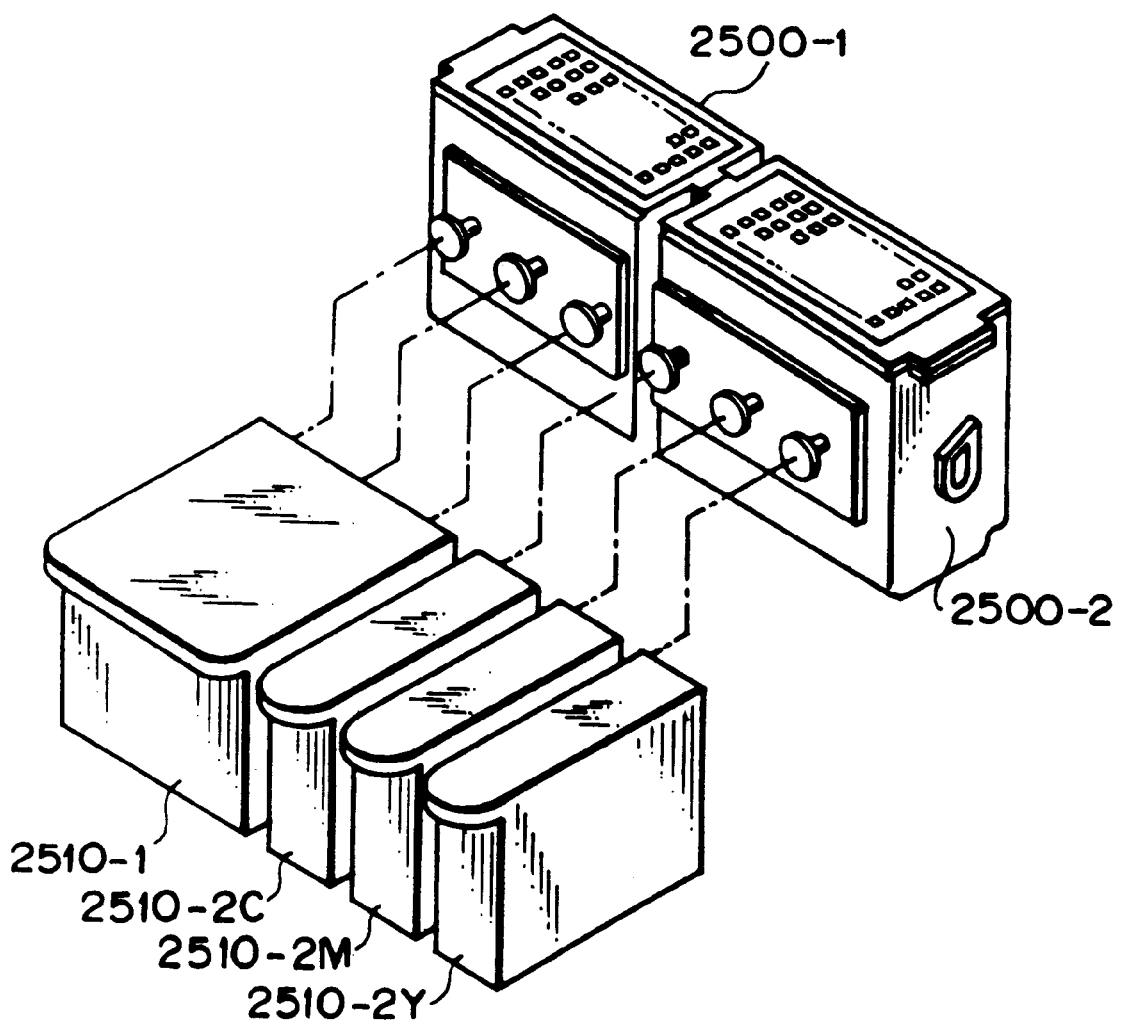
FIG. 27 is a schematic perspective view of a color print head used in an embodiment 6.

FIG. 27 is a perspective view of a color head unit comprising the head and tank. A head 2500-1, a head 2500-2, and a tank 2510-1(the same as the tank in the embodiment 1)/color ink tanks 2510-2C, M, Y are detachably structured. When an ink is exhausted, a remaining ink detection mechanism (not shown) prompts the user to replace it through the main unit for each color. The head chips 2501/2503 to 6 are the same as those described in the embodiment 3. The head chip 2502 has half the discharge amount of Bk to be equal to other chips of Bk and CMY, thereby achieving an exact application position.

The tank 2500-1 (for Bk1+S+Bk2) is the same as in the embodiment 1, and detailed description thereof is omitted. Further, the tanks 2510-2C, M, Y are the same as those in the embodiment 2, and detailed description thereof is omitted. To supply each ink, the sponge portion of the tanks 2510-1, 2510-2C, M, Y is contacted close to the filters 2523-1, 2523-2C, M, Y of the heads 2500-1, 2500-2, and sucked sequentially or simultaneously by the main unit recovery means (not shown).

The present embodiment is characterized in that thinning for reducing the consumption of the print improving liquid is not made, but the discharge amount of the print improving liquid is decreased to a half of the discharge amount of Bk to arrange in dot-on-dot at the Bk dot position, thereby reducing the load of image processing and enabling high-speed recording. In this case, at the Bk dot position, the print improving liquid is always discharged in an amount of half the ink. With this arrangement, the discharge amount of the print improving liquid is reduced to obtain the same effect as thinning. In the present embodiment, the discharge amount is decreased to about a half, however, the discharge amount of the print improving liquid may be selected according to the recording method, ink composition, recording medium, image, and the thinning effect. In this case, the discharge amount is not always halved, for example, according to the image data, the discharge amount may be varied according to various conditions such that the amount is less than a half for a highlight portion, and increased for an overall printing portion. Further, an effect to increase the contact area by sandwiching the print improving liquid with the Bk ink as described in the embodiment 3 to enhance the action of the print improving liquid is also obtained. The above contact area is present both on the upper side and the lower side, about twice the contact area can be obtained to enhance the reaction efficiency. As described above, as an effect of the Bk+S+Bk system, first in Bk+S the Bk ink penetrates into the printing medium to some extent and spreads, a white portion is reduced, and the area factor can be increased. Next, a further effect is obtained that when Bk is overlapped, the secondary discharged Bk ink is difficult to penetrate into the printing medium due to the previous Bk+S reaction, and easy to remain on the surface of the printing medium to improve the image density, and provides water resistance due to the reaction with residual print improving liquid.

(Examples of other head structures)

FIG. 28 to FIG. 31, as other embodiments of the present invention, show examples when the print improving liquid is sandwiched between other colored ink nozzles in a vertical integral head structure. In FIG. 28, the same structure as the embodiment 2 is formed of a nozzle arrangement of vertical heads, in which the Bk chip 2501, the S chip 2502, the C chip 2503, the M chip 2504, and the Y chip 2505 are vertically arranged. Further, FIG. 29 shows a sandwich structure by colored inks (Bk) also in a vertical head structure, in which an S1 chip 2502 is sandwiched between Bk chips 2601 and 2603, and further an S2 chip 2604, a C chip 2605, an M chip 2606, and a Y chip 2607 are vertically arranged. FIG. 30 shows a case where the print improving liquid is sandwiched between all the colored inks, and a Bk chip 2701, an S1 chip 2702, a C chip 2703, an S2 chip 2704, an M chip 2705, an S chip 2706, and a Y chip 2707 are vertically arranged. In FIG. 31, when forming a nozzle by vertically arranging a Bk chip 2801, an S chip 2802, and a Bk chip 2803, the nozzles of the Bk chip 2801 and the S chip 2802 are designed to be shifted by a half picture element, thereby obtaining a shift effect of the print improving liquid while maintaining the paper feed at a constant even with a vertical head structure. Further, since the Bk1 chip 2801 and the Bk2 chip 2803 are individually shifted by a ½ picture element in the reliquid direction, when printing at half the printing speed in the main scanning direction, a 720 dpi printing is possible in 2-pass. It is needless to say that in an integral head structure, the suction cap and the head structure must be devised so that the print improving liquid and colored inks do not mix during suction recovery.

Further, as other embodiments of the present invention, FIG. 32 to FIG. 34 show cases where the head structures of embodiments 1 to 6 are formed of separate type (combination of separate/independent heads) units. Specifically, as shown in FIG. 32, for example, 3-chip integral type (FIG. 32A) of the head of the embodiment 1 can be formed as a unit of a 2-chip integral type and 1 chip (FIG. 32B), or a unit can be formed with three independent chips (FIG. 32C). Further, as shown in FIG. 33, the 3-chip integral type head of the embodiment 2 (FIG. 33A) can be divided into a unit of a 2-chip integral type of Bk and S and a CMY chip (FIG. 33B), or a unit can be formed with three independent chips. Still further, as shown in FIG. 34, the 6-chip integral type head of the embodiment 5 (FIG. 34A) may be formed into a unit by combining two units of 3-chip integral type (FIG. 34B), into a unit by combining a 3-chip integral type with three independent chips (FIG. 34C), or into a unit by combining six independent chips. It is needless to say that even with these head structures, the same effect can be obtained irrespective of the type of head structure if the structure to sandwich the print improving liquid between colored inks is used as in the above description. By using such structures, the chips can be commonly used to reduce the cost.

Yet further, it is needless to say that the same effect can be obtained if the arrangement for sandwiching the print improving liquid between colored inks is used even in prior art printing techniques, such as a head structure equipped with inks of different concentrations such as concentrated/diluted inks, or a multi-droplet printing system (including shifting of application position) for forming an image by a plurality of dots in a single picture element.

(Examples of ink composition)

Composition of the ink and print improving liquid used above is, for example, as follows.

CASE 1: when all the inks are dyestuff inks

| | (parts by weight) |
|---|---|
| Y ink | |
| Glycerin | 5.0 |
| Thiodiglycol | 5.0 |
| Urea | 5.0 |
| Isopropylalcohol | 4.0 |
| Dye C. I. Direct Yellow 142 | 2.0 |
| Water | 79.0 |

-continued

| | (parts by weight) |
|---|---|
| M ink | |
| Glycerin | 5.0 |
| Thiodiglycol | 5.0 |
| Urea | 5.0 |
| Isopropylalcohol | 4.0 |
| Dye C. I. Acid Red 289 | 2.5 |
| Water | 78.5 |
| C ink | |
| Glycerin | 5.0 |
| Thiodiglycol | 5.0 |
| Urea | 5.0 |
| Isopropylalcohol | 4.0 |
| Dye C. I. Direct Blue 199 | 2.5 |
| Water | 78.5 |
| Bk ink | |
| Glycerin | 5.0 |
| Thiodiglycol | 5.0 |
| Urea | 5.0 |
| Isopropylalcohol | 4.0 |
| Dye Food Black 2 | 3.0 |
| Water | 78.5 |
| Print improving liquid | |
| Polyarylamine hydrochloride | 5.0 |
| Benzalconium chloride | 1.0 |
| Diethyleneglycol | 10.0 |
| Acetylenol EH (Kawaken Chemical) | 0.8 |
| Water | 83.5. |

In mixing the individual print improving liquid (here, referred to as treatment liquid (liquid composition)) with ink, in the present invention, the treatment liquid and ink are mixed on the printing medium or at a position penetrated in the printing medium, as a first step of reaction, of the cationic substances contained in the treatment liquid, a low-molecular weight component or a cationic oligomer undergoes association with a water-soluble dye having an anionic group used in the ink or an anionic compound used in the pigment ink due to an ionic interaction, momentarily resulting in separation from the liquid phase. As a result, dispersion destruction occurs in the pigment ink to form a coagulate of pigment.

Next, as a second step of the reaction, the above associate of the dye with the low-molecular weight cationic substance or the cationic oligomer or the coagulate of pigment is adsorbed by a polymer component contained in the treatment liquid, the size of the aggregate of dye or the aggregate of pigment resulting from association becomes even larger, and becomes difficult to come into voids between fibers of the printing medium. As a result, only the liquid part of the solid/liquid separation penetrates into the printing medium, thereby achieving both the print quality and fixing. At the same time, the aggregate formed of the low molecular weight component or the cationic oligomer and the anionic dye and the cationic substance produced by the above mechanism or the aggregate of pigment increases in viscosity, does not move along with movement of the liquid medium, even when the adjacent ink dot is formed of a different color as in full-color image formation, they do not mix up with each other, and no bleeding occurs. Further, the above aggregates are substantially insoluble in water, and the formed image has a perfect water resistance. Still further, light fastness of the image formed is also improved due to a shielding effect of the polymer.

As insolubilization or aggregation used in the present specification, an example is a phenomenon only of the above first step, and another example is phenomena including both the first and second steps.

Further, in executing the present invention, a high molecular weight cationic polymer substance or a polyvalent metal salt is not required to be used as in the prior art, or if required to use, it may be used as auxiliary for even further improving the effect of the present invention, and the amount can be decreased to a minimum. As a result, degradation of color development of dye is eliminated as another effect of the present invention, which has been a problem of using a prior art cationic polymer substance or a polyvalent metal salt to obtain a water resistance.

The printing medium used in using the present invention is not specifically limited, but so-called plain paper such as conventionally used copy paper, bond paper, or the like can be advantageously used. Of course, coated paper specially prepared for ink jet printing or OHP transparent film can also be used to good advantage, and general fine paper or gloss paper can be used.

Further, in executing the present invention, the ink is not specifically limited to dyestuff inks, but pigment inks of dispersed pigment can be used, and the treatment liquid may be one which agglomerates the pigment. The following is shown as an example of pigment ink which is mixed with the colorless liquid A1 to cause agglomeration. That is, colored inks Y2, M2, C2, and K2 of yellow, magenta, cyan, and black containing the individual pigments and an anionic compound can be obtained as follows.

[Black ink K2]

Using an anionic polymer P-1 (styrene-methacrylic acid-ethylacrylate, acid value 400, weight average molecular weight 6,000, aqueous liquid of 20% solid content, neutralizing agent: potassium hydroxide) as a dispersant, the following materials were charged into a batch type vertical sand mill (AIMEX), 1 mm diameter glass beads were added as media, and dispersed for 3 hours under water cooling. The viscosity after dispersion was 9 cps, the pH was 10.0. The dispersion was subjected to a centrifuge to remove coarse particles, to obtain a carbon black dispersion with a weight average particle diameter of 100 nm.

| (Composition of carbon black dispersion) | (parts) |
|---|---|
| P-1 aqueous liquid (20% solid) | 40 |
| Carbon black Mogul L (CABLACK) | 24 |
| Glycerin | 15 |
| Ethyleneglycolmonobutylether | 0.5 |
| Isopropylalcohol | 3 |
| Water | 135 |

Then, the above-obtained dispersion was thoroughly dispersed to obtain a black ink K2 for ink jet printing. The solid content of the final composition was about 10%.

[Yellow ink Y2]

Using an anionic polymer P-2 (styrene-acrylic acid-methylmethacrylate, acid value 280, weight average molecular weight 11000, aqueous liquid of 20% solid content, neutralizing agent: diethanolamine) as a dispersant, the following materials were treated as in the preparation of black ink K2 to obtain a yellow color dispersion with a weight average particle diameter of 103 nm.

| (Composition of yellow dispersion) | (parts) |
|---|---|
| P-2 aqueous liquid (20% solid) | 35 |
| C. I. Pigment Yellow 180 (NOVAPALM YELLOW PH-G Hoechst) | 24 |
| Triethyleneglycol | 10 |
| Diethyleneglycol | 10 |
| Ethyleneglyoclmonobutylether | 1.0 |
| Isopropylalcohol | 0.5 |
| Water | 135 |

Then, the above-obtained dispersion was thoroughly dispersed to obtain a yellow ink Y2 for ink jet printing. The solid content of the final composition was about 10%.

[Cyan ink C2]

Using the anionic polymer P-1 used in the preparation of the black ink K2 as a dispersant, the following materials were treated as in the preparation of the carbon black dispersion to obtain a cyan color dispersion with a weight average particle diameter of 120 nm.

| (Composition of cyan dispersion) | (parts) |
|---|---|
| P-1 aqueous liquid (20% solid) | 30 |
| C. I. Pigment Blue 15:3 (FASTGENBLUE PGF, Dainippon Ink and Chemicals) | 24 |
| Glycerin | 15 |
| Diethyleneglycolmonobutylether | 0.5 |
| Isopropylalcohol | 3 |
| Water | 135 |

The above-obtained cyan dispersion was thoroughly agitated to obtain a cyan ink C2 for ink jet printing containing pigment. The solid content of the final composition was about 9.6%.

[Magenta ink C2]

Using the anionic polymer P-1 used in the preparation of the black ink K2 as a dispersant, the following materials were treated as in the preparation of the carbon black dispersion to obtain a magenta color dispersion with a weight average particle diameter of 115 nm.

| (Composition of magenta dispersion) | (parts) |
|---|---|
| P-1 aqueous liquid (20% solid) | 20 |
| C. I. Pigment Red 122 (Dainippon Ink and Chemicals) | 24 |
| Glycerin | 15 |
| Isopropylalcohol | 3 |
| Water | 135 |

The above-obtained magenta dispersion was thoroughly dispersed to obtain a magenta ink M2 for ink jet printing containing pigment. The solid content of the final composition was about 9.2%.

Here, examples of using dyes as color materials of Y, M, C, Bk inks have been shown, however, the present invention is not limited to the examples, but those which use pigments as color materials, or dyes and pigments in combination, may be used. The same effect can be obtained by using the print improving liquid which is optimum for agglomerating the individual inks containing the color materials.

(Others)

The present invention, particularly among ink jet recording systems, provides advantageous effects in recording heads or recording apparatus equipped with means for generating a heat energy as energy utilized for ink discharge (e.g. electrothermal converter or laser light) to cause state changes of the ink by the heat energy. High density and fine recording is achieved with such systems.

On the typical constructions and principles, it is preferable to use those which operate using the basic principles disclosed, for example, in U.S. Pat. Nos. 4,723,129, and 4,740,796. This system is operable by any of so-called on-demand type and a continuous type, particularly, in the on-demand type, heat energy is generated in an electrothermal converter by applying at least a drive signal for giving a rapid temperature increase exceeding nuclear boiling corresponding to recording information to the electrothermal converter disposed according to the sheet or liquid passage in which a liquid (ink) is maintained, to generate film boiling on the heat applying surface of the recording head, and as a result, to form bubbles in the liquid (ink) one-to-one corresponding to the drive signal. The liquid (ink) is discharged through a discharge opening by growth or contraction of the bubbles to form at least a drop. When the drive signal is formed in pulses, since growth and contraction of the bubbles is made immediately and appropriately, discharge of liquid (ink) of particularly superior in response can be achieved, which is more preferable. As the pulse-formed drive signal, those which are described in U.S. Pat. Nos. 4,463,359 and 4,345,262 are suitable. More superior recording can be made when the condition described in U.S. Pat. No. 4,313,124 which is an invention relating to the temperature increasing rate of the heating surface.

As to the construction of the recording head, constructions using U.S. Pat. Nos. 4,558,333 and 4,459,600 disclosing constructions in which the heat applying portion is disposed on a bending area in addition to combination constructions of the discharge port, liquid passage, and electrothermal converter as disclosed in the above patents are also included in the present invention. In addition, the effect of the present invention is effective for the construction based on Japanese Patent Application Laid-open No. 123670/1984 disclosing a construction in which a common slit is used as a discharge port of the electrothermal converter for a plurality of electrothermal converters or a construction based on Japanese Patent Application Laid-open No. 138461/1984 disclosing a construction in which an opening for absorbing a pressure wave of heat energy is disposed in correspondence to the discharge port. That is, even with any configuration of the recording head, the present invention can provide positive and efficient recording.

Further, the present invention can be effectively applied to a full-line type recording head having a length corresponding to the maximum width of the recording medium that can be recorded by the recording apparatus. Such a recording head may be any of a construction which satisfies the length by combination of a plurality of recording heads, and a construction as an integrally-formed single recording head.

In addition, even with the above serial type, the present invention is also effective when using a recording head mounted on the apparatus main unit, a recording head of a replaceable chip type in which electrical connection with the apparatus main unit and supply of ink from the main unit are possible by mounting on the main unit, or a cartridge type recording head in which the ink tank is integrally provided on the recording head itself.

Further, addition of recovery means or preparative auxiliary means to the recording head, which are provided as components of the recording apparatus is preferable because they can even further stabilize the effect of the present invention. Specifically, capping means for the recording head, cleaning means, pressure or suction means, a heating element separate from the electrothermal converter, preparatory heating means by combining these devices, and preparatory discharge mode for discharging separate from recording are also effective for stable recording.

Still further, as to the type and number of recording heads used, for example, in addition to one which is provided with only one head for a monocolor ink, a plurality of recording heads may be provided according to a plurality of inks of different recording colors or densities. That is, not only a recording mode of only main colors such as black or the like as a recording mode of the recording apparatus, but also the recording head may be integrally structured or a plurality of recording heads may be combined, and the present invention is very effective for an apparatus having at least of a multicolor of different colors and a full-color of mixed colors.

In addition, in the above-described embodiments of the present invention, the ink is described as a liquid, however, since it is usual to use an ink which solidifies at or below room temperature and softens or liquefies at room temperature, or in the ink jet system, the ink itself is temperature controlled in the range from 30° C. to 70° C. so that the ink viscosity is within the stable discharge range, the ink may be in the liquid state when applying the operation recording signal. Further, the present invention is operable when preventing temperature increase due to heat energy by utilizing it as an energy for state change from solid to liquid of the ink, or using an ink which solidifies when being allowed to stand for preventing evaporation of the ink. The present invention can be applied when an ink is used which liquefies for the first time by a heat energy, such as one which liquefies when it reaches the recording medium and a liquid ink is discharged, or which begins to solidify when it reaches the recording medium. An ink usable in such a case may have a state maintained as a liquid or solid in a recess or through-hole in a porous sheet, opposing the electrothermal converter, as described in Japanese Patent Application Laid-open No. 56847/1979 or 71260/1985. In the present invention, the above-described film boiling type is the most effective.

In addition, the configuration of the recording apparatus provided with a recording mechanism using the liquid jet discharge recording head may be one which is used as an image output terminal of information processing apparatus such as a computer, a copier combined with a reader or the like, or a facsimile apparatus having a transmission function.

Figure 35:
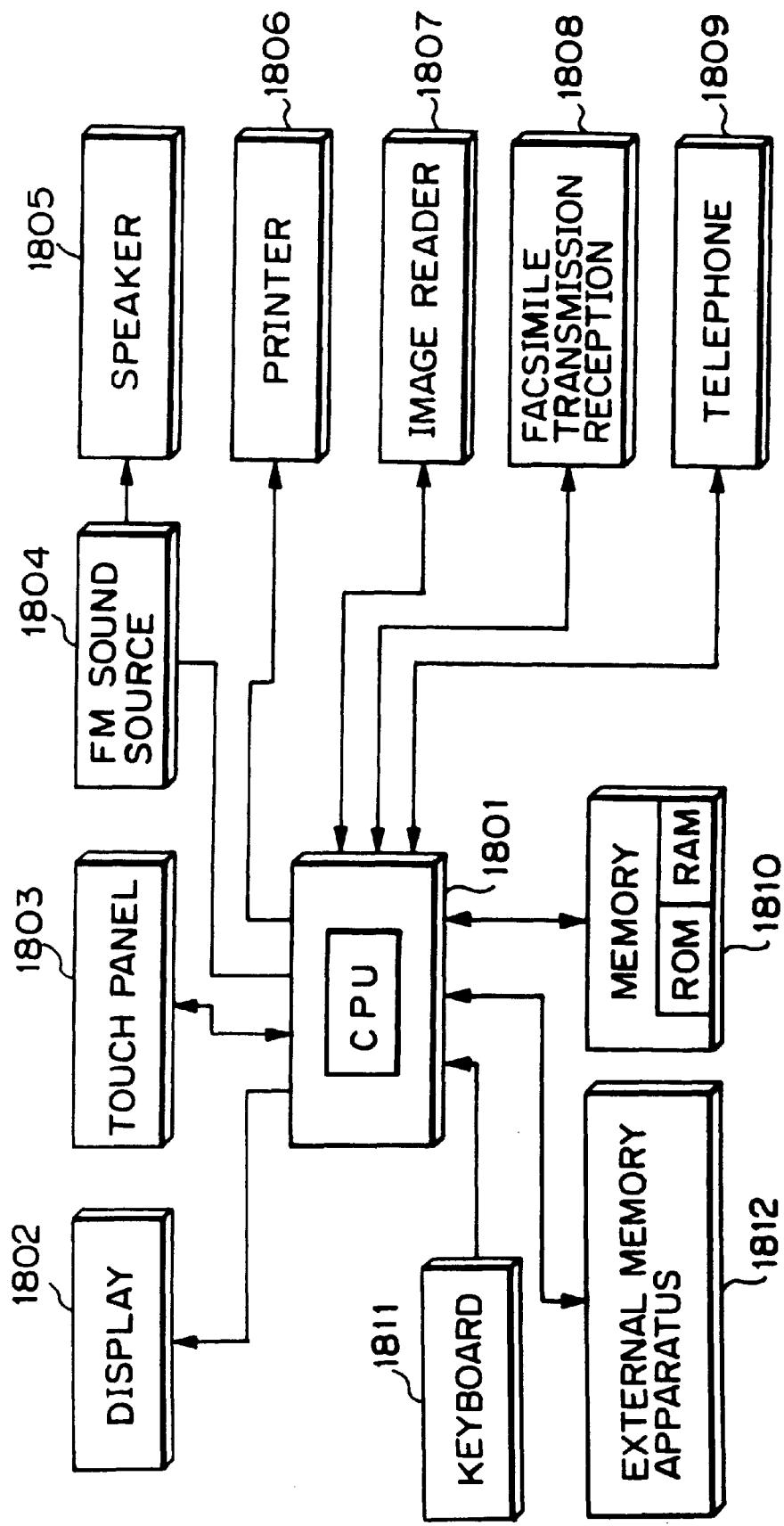
FIG. 35 is a block diagram showing an example of information processing system using the ink jet printing apparatus of the above embodiments.

FIG. 35 is a block diagram showing the construction when the recording apparatus of the present invention is applied to an information processing apparatus having a function as word processor, personal computer, facsimile, or copier.

In the Figure, the numeral 1801 indicates a control unit for controlling the entire apparatus, having a CPU such as a microprocessor or the like or various I/O ports, to output control signals or data signals to various units or receive control signals or data signals from various units to make control. The numeral 1802 indicates a display unit, which displays various menus and image data received by an image reader 1807 on the display screen. The numeral 1803 indicates a transparent pressure-sensitive touch panel provided on the display unit 1802, which by pressing the surface by a finger, makes item input or coordinate input on the display unit 1802.

The numeral 1804 is an FM (Frequency Modulation) sound source unit, which stores music information prepared by a music editor or the like as digital data in a memory unit 1810 or an external recording apparatus 1812, and reads it from the memory or the like to make FM modulation. Electrical signal from the FM sound source unit 1804 is converted to audible sound by a speaker unit 1805. A printer unit 1806 is applied with the recording apparatus of the present invention as an output terminal of the word processor, personal computer, facsimile, or copier.

The numeral 1807 is an image reader unit which optoelectrically reads document data to input it, and reads a facsimile document, copying document, or other documents. The numeral 1808 is a transmission/reception unit of facsimile (FAX) which receives and decodes a facsimile signal, and has an interface function with external apparatus. The numeral 1809 is a telephone unit having an ordinary telephone function or a caretaking function.

The numeral 1810 is a memory unit including ROM for storing a system program, a manager program, other application programs, character fonts, and a dictionary, or application programs, document information, and video RAM loaded from an external memory apparatus 1812.

The numeral 1811 is a keyboard unit for inputting document information or various commands.

The external memory apparatus 1812, which uses recording media such as a floppy disk or hard disk, stores document information, music or voice information, user application programs or the like.

Figure 36:
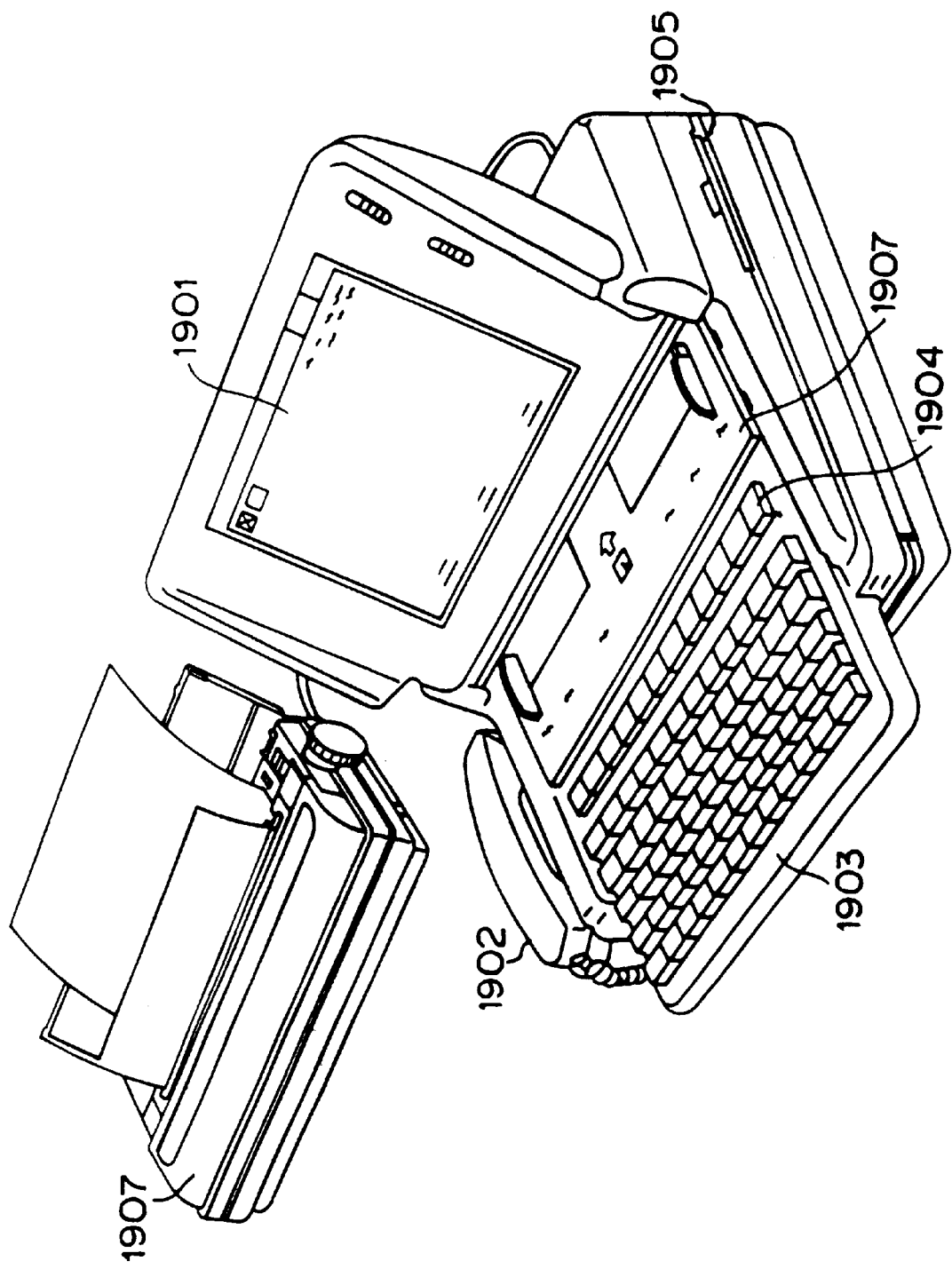
FIG. 36 is a schematic perspective view of the above system.

FIG. 36 is a schematic outer view of an information processing apparatus shown in FIG. 35.

In the Figure, the numeral 1901 indicates a flat panel display utilizing liquid crystals or the like for displaying various menus, figure information, and document information. The display 1901 is provided thereon with the touch panel 1803, which can be pressed on the surface by a finger for making coordinate input or item designation input. The numeral 1902 is a hand set used when the apparatus functions as a telephone. A keyboard 1903 is detachably connected to the main unit through a cord for inputting various document information and various data. Further, the keyboard 1903 is provided with various keys 1904 and the like.

The numeral 1905 is a floppy disk insertion port to an external memory apparatus 212.

The numeral 1906 is a paper piling unit for placing an original to be ready by the image reader unit 1807, and the read original is discharged from the rear of the apparatus. In facsimile reception, the output is recorded by an ink jet printer 1907.

The display unit 1802 may be a CRT, but it is preferable to use a flat panel such as liquid crystal display utilizing a ferroelectric liquid crystal, which is compact, thin-formed, and lightweight.

When the information processing apparatus is functioned as a personal computer or a word processor, various information input from a keyboard unit 211 is processed according to a predetermined program by the control unit 1801 and output as an image to the printer unit 1806.

When the information processing apparatus is functioned as a facsimile receiver, facsimile information input from the FAX transmission/reception unit 1808 through a communication line is processed according to a predetermined program by the control unit 1801, and output as a reception image to the printer unit 1806.

When it functions as a copier, the original is read by the image reader unit 1807, the read original data is output as a copy image to the printer unit 1806 through the control unit 1801. When it functions as a facsimile receiver, original data read by the image reader unit 1807 is transmission processed according to a predetermined program by the control unit 1801, and transmitted to the communication line through the FAX transmission/reception unit 1808.

Figure 37:
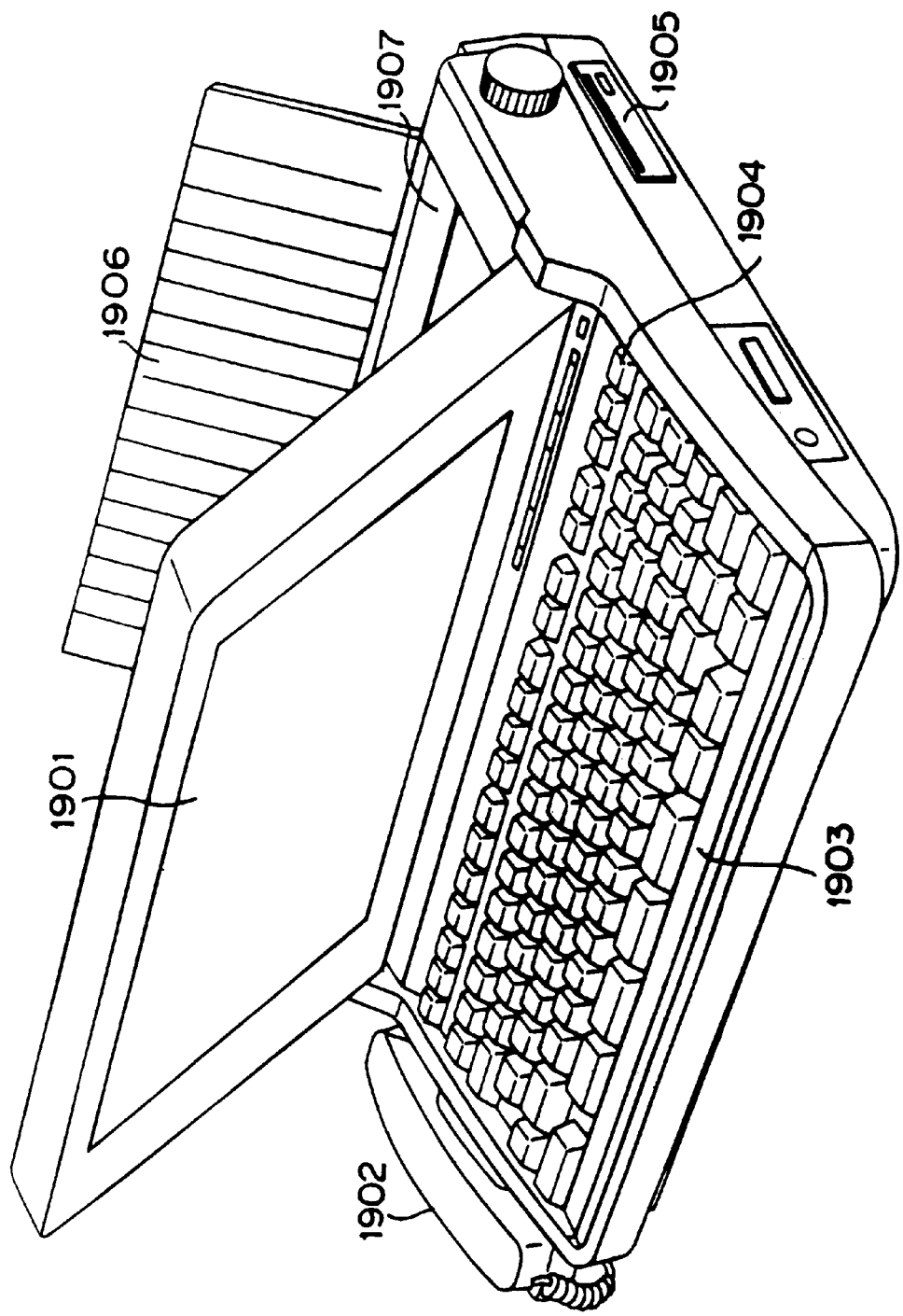
FIG. 37 is a schematic perspective view showing another example of the above system.

The above information processing apparatus may be structured as an integrated type in which the ink jet printer is incorporated in the main unit as shown in FIG. 37. This enhances the portability. In the Figure, parts having similar functions to FIG. 35 are indicated by similar reference numerals.

Since, by applying the recording apparatus of the present invention to the above-described multifunctional information processing apparatus, the functions of the information processing apparatus can be improved even further.

As described above, the present invention can provide how to arrange and control the head structure and printing method for making pre-feed/follow feed, in order to sufficiently provide the effects of pre-feed/follow feed (penetration control, blotting prevention, improvement of fixing, elimination of feathering, reduction of bleeding, reduction of unevenness/stripes). In particular, the present invention can provide a head structure suitable for optimally utilizing the pre-feed/follow feed in ink jet printing, and a print control method (including image improving techniques applying head control/image processing) for optimally utilizing the pre-feed/follow feed in ink jet printing. Further, it can provide optimum combinations of inks (CMY/K/print improving liquid) for optimally utilizing the pre-feed/follow feed in ink jet printing and ink compositions thereof, and an ink jet printing apparatus capable of achieving both high speed/high image quality by the pre-feed/follow feed at a low cost. Further, the present invention can provide an effect of reducing the ink consumption and improvement of printing speed in combination with the effect of the conventional pre-feed/follow feed technique.

The present invention has been described in detail with respect to preferred embodiments, and it will now be that changes and modifications may be made without departing from the invention in its broader aspects, and it is intention, therefore, in the appended claims to cover all such changes and modifications as fall within the true sprint of the invention.

What is claimed is:

1. An ink jet head assembly comprising:

a first discharge portion being a first black ink discharge portion having an ink discharge nozzle from which black ink is discharged;

a second discharge portion having a liquid discharge nozzle from which print improving liquid is discharged;

a third discharge portion being a second black ink discharge portion having an ink discharge nozzle from which black ink is discharged; and a color ink discharge portion having ink discharge nozzles from which inks other than black are discharged;

wherein said first, second, third, and color ink discharge portions are arranged in the order as listed in a scanning direction, penetration of the black ink from said first and third discharge portions into a printing medium is lower than that of the inks from said color ink discharge portion, a black image is formed on the printing medium by applying the black ink discharged from said first discharge portion nozzle, the liquid discharged from said second discharge portion nozzle, and the black ink discharged from said third discharge portion nozzle in this order onto the printing medium, overlappedly, and the liquid contains a component which insolubilizes or flocculates a coloring material in the black ink from said first and third discharge portions.

2. The ink jet head assembly as claimed in claim 1, wherein, said color ink discharge portion includes a cyan ink discharge portion, a magenta ink discharge portion, and a yellow ink discharge portion.

3. The ink jet head assembly as claimed in claim 1, wherein said first and third ink discharge portions of said ink jet head assembly are arranged shifted from one another, in at least one of a main scanning direction and a sub-scanning direction, by an odd number of times of ½ picture elements.

4. The ink jet head assembly as claimed in any one of claims 1, 2, and 3, said ink jet head assembly having a head unit structure incorporating head chips constituting said first, second, and third discharge portions in an integral frame.

5. The ink jet head assembly as claimed in any one of claims 1, 2, and 3, said ink jet head assembly having a plurality of head unit structures incorporating head chips constituting said first, second, and third discharge portions in an integral frame which are combined.

6. The ink jet head assembly as claimed in any one of claims 1, 2, and 3, said ink jet head assembly having an energy generating element generating heat energy for said first, second, third, and color ink discharge portion nozzles to discharge the black ink from said first discharge portion, the black ink from said third discharge portion, the inks from said color ink discharge portion, and the print improving liquid from said second discharge portion.

7. The ink jet head assembly as claimed in any one of claims 1, 2, and 3, wherein the print improving liquid contains a cationic substance of a low molecular weight component and a high molecular weight component having a molecular weight higher than that of the low molecular weight component, and the black ink from said first discharge portion, the black ink from said third discharge portion, and the inks from said color ink discharge portion contain an anionic coloring material.

8. The ink jet head assembly as claimed in any one of claims 1, 2, and 3, wherein the print improving liquid contains a cationic substance of a low molecular weight component and a high molecular weight component having a molecular weight higher than that of the low molecular weight component, and the black ink from said first discharge portion, the black ink from said third discharge portion, and the inks from said color ink discharge portion contain at least an anionic compound and a pigment.

9. An ink jet printing apparatus for making a print using an ink jet head assembly having a plurality of discharge portions arranged in a predetermined direction, said ink jet head assembly comprising:

a first discharge portion being a first black ink discharge portion having an ink discharge nozzle from which black ink is discharged;

a second discharge portion having a liquid discharge nozzle from which print improving liquid is discharged;

a third discharge portion being a second black ink discharge portion having an ink discharge nozzle from which black ink is discharged; and a color ink discharge portion having ink discharge nozzles from which inks other than black are discharged;

wherein said first, seconds third, and color ink discharge portions are arranged in the order as listed in a scanning direction, penetration of the black ink from said first and third discharge portions into a printing medium is lower than that of the inks from said color ink discharge portion, a black image is formed on the printing medium by applying the black ink discharged from said first discharge portion nozzle, the liquid discharged from said second discharge portion nozzle, and the black ink discharged from said third discharge portion nozzle in this order onto the printing medium, overlappedly, and the liquid contains a component which insolubilizes or flocculates a coloring material in the black ink from said first and third discharge portions.

10. The ink jet printing apparatus as claimed in claim 9, further comprising means for performing facsimile functions, said performing means generating signals for said ink jet head assembly to control discharge of ink.

11. The ink jet printing apparatus as claimed in claim 9, further comprising means for performing copier functions, said performing means generating signals for said ink jet head assembly to control discharge of ink.

12. The ink jet printing apparatus as claimed in claim 9, further comprising means for performing computer functions, said performing means generating signals for said ink jet head assembly to control discharge of ink.

13. An ink jet printing apparatus comprising:

a main unit including a mounting section detachably mounting an ink jet head assembly, the ink jet head assembly including, (a) a first discharge portion being a first black ink discharge portion having an ink discharge nozzle from which black ink is discharged, (b) a second discharge portion having a liquid discharge nozzle from which print improving liquid is discharged, (c) a third discharge portion being a second black ink discharge portion having an ink discharge nozzle from which black ink is discharged, and (d) a color ink discharge portion having ink discharge nozzles from which inks other than black are discharged, wherein said first, second, third, and color ink discharge portions are arranged in the order as listed in a scanning direction, penetration of the black ink from said first and third discharge portions into a printing medium is lower than that of the inks from said color ink discharge portion, a black image is formed on the printing medium by applying the black ink discharged from said first discharge portion nozzle, the liquid discharged from said second discharge portion nozzle, and the black ink discharged from said third discharge portion nozzle in this order onto the printing medium, overlappedly, and said liquid contains a component which insolubilizes or flocculates a coloring material in the black ink from said first and third discharge portions.

14. The ink jet printing apparatus as claimed in claim 13, further comprising a head unit structure incorporating head chips constituting said first, second, and third discharge portions in an integral frame.

15. The ink jet printing apparatus as claimed in claim 13 or claim 14, further comprising print control means for forming an image so that the print improving liquid discharged from said second discharge portion nozzle is sandwiched between inks discharged from at least said first and third discharge portion nozzles.

16. The-ink jet printing apparatus as claimed in claim 15, wherein the black ink from said first discharge portion, the black ink from said third discharge portion, and the inks from said color ink discharge portion and the print improving liquid are discharged at picture elements arranged in main and sub-scanning directions, and the print improving liquid discharged from said second discharge portion nozzle is disposed at a position shifted by ½ picture element relative to an ink picture element on the printing medium in at least one of the main scanning direction and the sub-scanning direction.

17. The ink jet printing apparatus as claimed in claim 16, wherein said print control means is capable of 1-pass bidirectional printing.

18. The ink jet printing apparatus as claimed in claim 16, wherein said print control means is capable of 1-pass unidirectional printing.

19. The ink jet printing apparatus as claimed in claim 16, wherein said print control means is capable of 2-pass bidirectional printing.

20. The ink jet printing apparatus as claimed in claim 16, wherein said print control means is capable of 2-pass unidirectional printing.

21. The ink jet printing apparatus as claimed in claim 16, wherein said print control means is capable of N (N being a positive number)-pass bidirectional printing.

22. The ink jet printing apparatus as claimed in claim 16, wherein said print control means is capable of N (N being a positive number)-pass unidirectional printing.

23. The ink jet printing apparatus as claimed in claim 16, wherein the print improving liquid contains a cationic substance of a low molecular weight component and a high molecular weight component having a molecular weight higher than that of the low molecular weight component, and the black ink from said first discharge portion, the black ink from said third discharge portion, and the inks from said color ink discharge portion contain an anionic coloring material.

24. The ink jet printing apparatus as claimed in claim 16, wherein the print improving liquid contains a cationic substance of a low molecular weight component and a high molecular weight component having a molecular weight higher than that of the low molecular weight component, and the black ink from said first discharge portion, the black ink from said third discharge portion, and the inks from said color ink discharge portion contain at least an anionic compound and a pigment.

25. The ink jet printing apparatus as claimed in claim 16, wherein the inks sandwiching the print improving liquid have different compositions.

26. The ink jet printing apparatus as claimed in claim 25, wherein, in the different compositions, one is a super-penetrating solvent composition penetrating rapidly into the printing medium, and one is an overlaying solvent composition penetrating more gradually into the printing medium than the super-penetrating solvent.

27. An ink jet cartridge comprising:

an ink jet head assembly; and an ink tank provided detachably on said ink jet head assembly, said ink jet head assembly including:

(a) a first discharge portion being a first black ink discharge portion having an ink discharge nozzle from which black ink is discharged, (b) a second discharge portion having a liquid discharge nozzle from which print improving liquid is discharged, (c) a third discharge portion being a second black ink discharge portion having an ink discharge nozzle from which black ink is discharged, and (d) a color ink discharge portion having ink discharge nozzles from which inks other than black are discharged, wherein said first, second, third, and color ink discharge portions are arranged in the order as listed in a scanning direction, penetration of the black ink from said first and third discharge portions into a printing medium is lower than that of the inks from said color ink discharge portion, a black image is formed on the printing medium by applying the black ink discharged from said first discharge portion nozzle, the liquid discharged from said second discharge portion nozzle, and the black ink discharged from said third discharge portion nozzle in this order onto the printing medium, overlappedly, and the liquid contains a component which insolubilizes or flocculates a coloring material in the black ink from said first and third discharge portions.

* * * * *

UNITED STATES PATENT AND TRADEMARK OFFICE
CERTIFICATE OF CORRECTION

PATENT NO. : 6,089,697

DATED : July 18, 2000

INVENTOR(S) : HIROSHI TAJIKA, ET AL.

It is certified that error appears in the above-identified patent and that said Letters Patent is hereby corrected as shown below:

COLUMN 7:
 Line 66, "so-called an" should read --a so-called--.

COLUMN 11:
 Line 64, "revere" should read --reverse--.

COLUMN 13:
 Line 4, "40" should read --by 40--.

COLUMN 18:
 Line 48, "macaroscopically" should read --macroscopically--.

COLUMN 21:
 Line 14, "35(µm)" should read --35µm)--.

COLUMN 23:
 Line 11, "of the" should be deleted.

COLUMN 26:
 Line 20, "to" should read --for--.
 Line 58, "effect" should read --effect is achieved--.

COLUMN 27:
 Line 19, "25001" should read --2501--.
 Line 20, "25002" should read --2502--.

COLUMN 31:
 Line 6, "use," should read --be used,--.

UNITED STATES PATENT AND TRADEMARK OFFICE
CERTIFICATE OF CORRECTION

PATENT NO. : 6,089,697

DATED : July 18, 2000

INVENTOR(S) : HIROSHI TAJIKA, ET AL.

It is certified that error appears in the above-identified patent and that said Letters Patent is hereby corrected as shown below:

COLUMN 33:
  Line 24, "of" should be deleted.
  Line 28, "when the condition" should read --under the conditions--.

COLUMN 34:
  Line 17, "of" should read --one of--.

COLUMN 35:
  Line 52, "is functioned" should read --functions--.
  Line 57, "is functioned" should read --functions--.

COLUMN 36:
  Line 10, "Since," should read --Thus,--.
  Line 36, "now be" should read --now be understood--.

COLUMN 37:
  Line 64, "seconds" should read --second,--.

Signed and Sealed this

Twenty-second Day of May, 2001

Attest:

NICHOLAS P. GODICI

Attesting Officer       Acting Director of the United States Patent and Trademark Office